United States Patent
Plekhanov et al.

(10) Patent No.: US 10,097,046 B2
(45) Date of Patent: Oct. 9, 2018

(54) WIRELESS POWER ASSEMBLY

(71) Applicant: Global Energy Transmission, Co., Woodland, WA (US)

(72) Inventors: Sergey Plekhanov, Moscow (RU); Leonid Plekhanov, Moscow (RU)

(73) Assignee: Global Energy Transmission, Co., Woodland, MA (US)

( * ) Notice: Subject to any disclaimer, the term of this patent is extended or adjusted under 35 U.S.C. 154(b) by 0 days.

(21) Appl. No.: 15/609,030

(22) Filed: May 31, 2017

(65) Prior Publication Data
US 2017/0271926 A1    Sep. 21, 2017

Related U.S. Application Data

(63) Continuation-in-part of application No. 15/461,793, filed on Mar. 17, 2017.
(Continued)

(51) Int. Cl.
*H02J 50/12* (2016.01)
*H02J 50/40* (2016.01)
(Continued)

(52) U.S. Cl.
CPC ............. *H02J 50/12* (2016.02); *H01Q 1/248* (2013.01); *H01Q 7/00* (2013.01); *H01Q 21/061* (2013.01);
(Continued)

(58) Field of Classification Search
CPC ............................... H01Q 21/061; H02J 50/40
See application file for complete search history.

(56) References Cited

U.S. PATENT DOCUMENTS

2008/0266748 A1    10/2008 Lee
2009/0072628 A1    3/2009 Cook et al.
(Continued)

FOREIGN PATENT DOCUMENTS

WO    2010096917 A1    9/2010
WO    2012040548 A1    3/2012
(Continued)

OTHER PUBLICATIONS

Kim, et.al., "Efficiency Analysis of Magnetic Resonance Wireless Power Transfer with intermediate Resonant Coil," IEEE Antenna and Wireless Propagation Letter, vol. 10, 2011, pp. 389-392.*
(Continued)

*Primary Examiner* — Thienvu Tran
*Assistant Examiner* — Pinping Sun
(74) *Attorney, Agent, or Firm* — Kolisch Hartwell, P.C.

(57) ABSTRACT

A wireless power transfer system may include a transmitter transducer assembly, a signal generator and one or more power receivers. The transmitter transducer assembly may include at least one transmitter transducer. The signal generator may be operationally configured to generate an alternating current transmission signal. The one or more power receivers may be electrically connected to one or more respective loads. Each of the one or more power receivers may include a receiver transducer assembly. The receiver transducer assembly may include at least one receiver transducer. Each receiver transducer of the at least one receiver transducer may receive a time varying electromagnetic flux of the electromagnetic field transmitted from the transmitter transducer assembly and produce a second power signal. The power processor may convert the second power signal to a third power signal appropriate for the respective one or more loads.

2 Claims, 24 Drawing Sheets

Related U.S. Application Data

(60) Provisional application No. 62/343,776, filed on May 31, 2016, provisional application No. 62/348,640, filed on Jun. 10, 2016, provisional application No. 62/310,557, filed on Mar. 18, 2016.

(51) Int. Cl.

| | | |
|---|---|---|
| *H02J 50/80* | (2016.01) | |
| *H01Q 21/22* | (2006.01) | |
| *H01Q 1/24* | (2006.01) | |
| *H01Q 21/20* | (2006.01) | |
| *H01Q 7/00* | (2006.01) | |
| *H01Q 21/06* | (2006.01) | |

(52) U.S. Cl.
CPC ............. *H01Q 21/20* (2013.01); *H01Q 21/22* (2013.01); *H02J 50/40* (2016.02); *H02J 50/80* (2016.02)

(56) References Cited

U.S. PATENT DOCUMENTS

| | | | |
|---|---|---|---|
| 2009/0096413 A1* | 4/2009 | Partovi | H01F 5/003 |
| | | | 320/108 |
| 2009/0243397 A1 | 10/2009 | Cook et al. | |
| 2009/0302688 A1 | 12/2009 | Boys | |
| 2010/0117454 A1* | 5/2010 | Cook | G06K 7/0008 |
| | | | 307/104 |
| 2011/0080054 A1 | 4/2011 | Urano | |
| 2011/0151789 A1* | 6/2011 | Viglione | H04B 5/0037 |
| | | | 455/42 |
| 2011/0254377 A1 | 10/2011 | Wildmer et al. | |
| 2012/0086281 A1* | 4/2012 | Kanno | H02J 5/005 |
| | | | 307/82 |
| 2012/0098485 A1* | 4/2012 | Kang | H02J 7/025 |
| | | | 320/108 |
| 2012/0217816 A1* | 8/2012 | Wang | H02J 5/005 |
| | | | 307/104 |
| 2012/0217818 A1* | 8/2012 | Yerazunis | H02J 5/005 |
| | | | 307/104 |
| 2012/0248890 A1 | 10/2012 | Fukushima | |
| 2012/0326660 A1* | 12/2012 | Lu | H02J 17/00 |
| | | | 320/108 |
| 2013/0009462 A1 | 1/2013 | Amano et al. | |
| 2013/0076306 A1 | 3/2013 | Lee et al. | |
| 2013/0119778 A1* | 5/2013 | Jung | H01F 38/14 |
| | | | 307/104 |
| 2013/0134794 A1* | 5/2013 | Lee | H02J 17/00 |
| | | | 307/104 |
| 2013/0181539 A1 | 7/2013 | Muratov et al. | |
| 2013/0207468 A1 | 8/2013 | Wu et al. | |
| 2014/0062395 A1 | 3/2014 | Kwon et al. | |
| 2014/0176082 A1* | 6/2014 | Visser | H01Q 1/248 |
| | | | 320/137 |
| 2014/0339923 A1 | 11/2014 | Simopoulos et al. | |
| 2014/0368053 A1 | 12/2014 | Lee et al. | |
| 2015/0108849 A1 | 4/2015 | Robertson | |
| 2015/0311728 A1* | 10/2015 | Yun | H02J 5/005 |
| | | | 307/104 |
| 2016/0079794 A1 | 3/2016 | Cho et al. | |
| 2016/0087458 A1 | 3/2016 | Grbic et al. | |
| 2016/0094082 A1* | 3/2016 | Ookawa | H01F 38/14 |
| | | | 320/108 |
| 2016/0243949 A1* | 8/2016 | Merkel | H02J 7/025 |
| 2017/0098964 A1 | 4/2017 | Sakata et al. | |
| 2017/0271925 A1 | 9/2017 | Plekhanov et al. | |
| 2017/0294941 A1* | 10/2017 | Long | H04B 5/0031 |

FOREIGN PATENT DOCUMENTS

| | | |
|---|---|---|
| WO | 2014152004 A1 | 9/2014 |
| WO | 2014195143 A1 | 12/2014 |

OTHER PUBLICATIONS

Enpuku, K. et al., "Performance of Pickup Coil Made of Litz Wire and Coupled to HTS SQUID", SciVerse ScienceDirect, Physics Procedia, vol. 36, (2012), pp. 400-404.

Gupta, Vikram et al., "Energy Harvesting from Electromagnetic Energy Radiating from AC Power Lines", 2010, 5 pgs.

PhysicsNet, "Electromotive Force and Internal Resistance", Apr. 6, 2013, 5 pgs.

Si, Ping et al., "A Frequency Control Method for Regulating Wireless Power to Implantable Devices", IEEE Transactions on Biomedical Circuits and Systems, vol. 2, No. 1, Mar. 2008, pp. 22-29.

Sullivan, C.R., "Optimal Choice for Number of Strands in a Litz-Wire Transformer Winding", IEEE Transactions on Power Electronics, vol. 14, No. 2, Mar. 1999, pp. 283-291.

Wang, Xin et al., "Retro-Directive Beamforming Versus Retro-Reflective Beamforming with Applications in Wireless Power Transmission," Progress in Electromagnetics Research, vol. 157, 79-91, 2016, 13 pgs.

Le Guay, Philippe, Authorized Officer, European Patent Office, "International Search Report" in connection with International Application No. PCT/US2017/035084, dated Aug. 9, 2017, 4 pages.

Le Guay, Philippe, Authorized Officer, European Patent Office, "Written Opinion of the International Searching Authority" in connection with International Application No. PCT/US2017/035084, dated Aug. 9, 2017, 10 pages.

* cited by examiner

WIRELESS POWER ASSEMBLY

CROSS-REFERENCES TO RELATED APPLICATIONS

The present application claims the benefit under 35 U.S.C. § 119(e) of U.S. Provisional Patent Application Ser. No. 62/343,776, filed May 31, 2016 and titled DISTANT WIRELESS POWER TECHNOLOGY and U.S. Provisional Patent Application Ser. No. 62/348,640, filed Jun. 10, 2016 and titled DISTANT WIRELESS POWER TECHNOLOGY. The present application is also a continuation-in-part of U.S. patent application Ser. No. 15/461,793, filed Mar. 17, 2017 and titled SYSTEMS AND METHODS FOR WIRELESS POWER TRANSFERRING, which application claims priority to U.S. Provisional Patent Application Ser. No. 62/310,557, filed Mar. 18, 2016 and titled DISTANT WIRELESS POWER TECHNOLOGY. Each of these patent applications are hereby incorporated by reference in their entirety for all purposes.

TECHNICAL FIELD

The disclosure relates to wireless power transferring. More particularly, the disclosure relates to methods and systems for wirelessly transferring power for use by power-consuming devices.

BACKGROUND

Portable electronic devices and electrical devices rely on battery power for uninterrupted operation. These portable electronic devices and electrical devices include smart phones, tablets, laptops, personal digital assistants, electric vehicles, cameras, robots, medical devices and the like. The frequency that the batteries of these devices need to be charged is constantly increasing due to increased functionalities of these devices and the corresponding increase in the load put on the battery. Such devices are typically charged by wired connection to a power source. Technology also exists for wirelessly charging electronic devices by placing the devices to be charged on or in close proximity to inductive charging pads. The inductive charging pads employ magnetic induction for inductively charging these devices.

SUMMARY

In a first example, a wireless power assembly is provided. The wireless power assembly may include a signal generator and a transmitter transducer. The signal generator may be configured to generate an alternating current transmission signal having a transmission frequency of at least 500 Hz. The transmitter transducer assembly may be operatively coupled to the signal generator. The transmitter transducer assembly may produce an electromagnetic field in a power transfer region by conducting the transmission signal. The electromagnetic field may be produced for transferring power wirelessly to a power receiver when the power receiver is located in the power transfer region. The transmitter transducer assembly may include a plurality of transmitter transducers that each produces a respective electromagnetic field.

In a second example, a wireless power assembly is provided. The wireless power assembly may include a signal generator and a dipole antenna. The signal generator may be configured to generate an alternating current transmission signal having a transmission frequency of at least 500 Hz. The dipole antenna may be operatively coupled to the signal generator. The dipole antenna may produce an electromagnetic field in a power transfer region by conducting the transmission signal. In addition, the dipole antenna may have two oppositely extending elongate electrically conductive elements.

In a third example, a wireless power assembly is provided. The wireless power assembly may include a signal generator and a transmitter transducer assembly. The signal generator may be configured to generate an alternating current transmission signal having a transmission frequency of at least 500 Hz. The transmitter transducer assembly may be operatively coupled to the signal generator. The transmitter transducer assembly may produce an electromagnetic field in a power transfer region by conducting the transmission signal. In addition, the transmitter transducer assembly may include at least a first loop of electrical conductor extending back and forth along a sinuous path.

In a fourth example, a wireless power assembly is provided. The wireless power assembly may include a signal generator, a flexible dielectric substrate and at least a first loop of flexible planar electrical conductor. The at least a first loop of flexible planar electrical conductor may be supported on the flexible dielectric substrate. The signal generator may be configured to generate an alternating current transmission signal having a transmission frequency of at least 500 Hz. The at least a first loop of flexible planar electrical conductor may be operatively coupled to the signal generator. The least a first loop of flexible planar electrical conductor may produce an electromagnetic field in a power transfer region by conducting the transmission signal.

In a fifth example, a wireless power receiver is provided. The wireless power receiver may be configured to be electrically connected to an electrical load. The wireless power receiver may include a dipole antenna and a power processor. The dipole antenna may have two oppositely extending conductive elements. The dipole antenna may be configured to receive a time varying electromagnetic flux in a power transfer region of an electromagnetic field transmitted from a transmitter transducer when the dipole antenna is disposed in the power transfer region. In addition, the dipole antenna may convert the time varying electromagnetic flux to a time-varying first power signal having a transmission frequency of at least 500 Hz. The power processor may be electrically connected to the dipole antenna. The power processor may be configured to convert the first power signal to a second power signal appropriate for the electrical load.

In a sixth example, a wireless power receiver is provided. The wireless power receiver may be configured to be electrically connected to an electrical load. The wireless power receiver may include a receiver transducer assembly and a power processor. The receiver transducer assembly may be configured to receive a time varying electromagnetic flux in a power transfer region of an electromagnetic field transmitted from a transmitter transducer assembly when the receiver transducer assembly is disposed in the power transfer region. In addition, the receiver transducer assembly may convert the time varying electromagnetic flux to a time-varying first power signal having a transmission frequency of at least 500 Hz. The receiver transducer assembly may include a plurality of receiver transducers. The power processor may be electrically connected to the receiver transducer assembly. The power processor may be configured to convert the first power signal to a second power signal appropriate for the electrical load.

In a seventh example, an aerial vehicle is provided. The aerial vehicle may include a body, a propulsion mechanism, an electrical energy storage device, receiver transducer, and a power processor. The body may have an exterior. The propulsion mechanism may be mounted to the body. The electrical energy storage device may be operatively coupled to the propulsion mechanism. The electrical energy storage device may provide propulsion energy to the propulsion mechanism for enabling aerial operation of the aerial vehicle. The receiver transducer may be configured to receive a time varying electromagnetic flux in a power transfer region of an electromagnetic field transmitted from a transmitter transducer when the receiver transducer is disposed in the power transfer region. In addition, the receiver transducer may convert the time varying electromagnetic flux to a time-varying first power signal having a transmission frequency of at least 500 Hz. The transmitter transducer may include at least a first loop of electrical conductor mounted along the exterior of the body of the aerial vehicle. The power processor may be electrically connected to the receiver transducer. The power processor may be configured to convert the first power signal to a second power signal appropriate for charging the electrical energy storage device.

In an eighth example, a wireless power transfer system is provided. The wireless power transfer system may include a transmitter transducer assembly, a signal generator and one or more power receivers. The transmitter transducer assembly may include at least one transmitter transducer. Each transmitter transducer of the at least one transmitter transducer may be configured to produce an electromagnetic field in a power transfer region during conduction of a transmission signal. The signal generator may be electrically configured to be connected to the transmitter transducer assembly. The signal generator may be operationally configured to generate an alternating current transmission signal having a transmission frequency of at least 500 Hz. In addition, the signal generator may transmit the transmission signal to the transmitter transducer assembly at the transmission frequency. The one or more power receivers may each be configured to be electrically connected to respective one or more loads. Each of the one or more power receivers may include a receiver transducer assembly. The receiver transducer assembly may include at least one receiver transducer. Each receiver transducer of the at least one receiver transducer may be configured to receive a time varying electromagnetic flux of the electromagnetic field transmitted from the transmitter transducer assembly when the receiver transducer assembly is disposed in the power transfer region. In addition, the receiver transducer assembly may convert the time varying electromagnetic flux to a second power signal. The second power signal may be a time varying power signal having the transmission frequency of the transmission signal. The power processor may be electrically connected to the receiver transducer assembly. The power processor may be configured to convert the second power signal to a third power signal appropriate for the respective one or more loads. At least one of the transmitter transducer and the receiver transducer may include a dipole antenna having two oppositely extending conductive elements.

In a ninth example, a method for charging a battery of an aerial vehicle is provided. The method may include generating an alternating current transmission signal having a transmission frequency of at least 500 Hz, producing a first electromagnetic field in a first power transfer region by transmitting the transmission signal to a transmitter transducer assembly at the transmission frequency, receiving a time varying electromagnetic flux of the first electromagnetic field transmitted from the transmitter transducer assembly when the receiver transducer assembly is disposed in the power transfer region, converting the time varying electromagnetic flux to a second power signal having the transmission frequency of the transmission signal and converting the second power signal to a third power signal appropriate for charging the aerial-vehicle battery.

In a tenth example, a method for wireless power transmission is provided. The method may include detecting a presence of at least one power receiver of one or more power receivers in a power transfer region, generating an alternating current transmission signal having a transmission frequency of at least 500 Hz in response to detecting the presence of the at least one power receiver of the one or more power receivers in the power transfer region, and producing an electromagnetic field in the power transfer region by transmitting the transmission signal to a transmitter transducer assembly at the transmission frequency for transferring power to a receiver transducer assembly of the at least one power receiver of the one or more power receivers located in the electromagnetic field in the power transfer region.

BRIEF DESCRIPTION OF THE DRAWINGS

Figure 1:
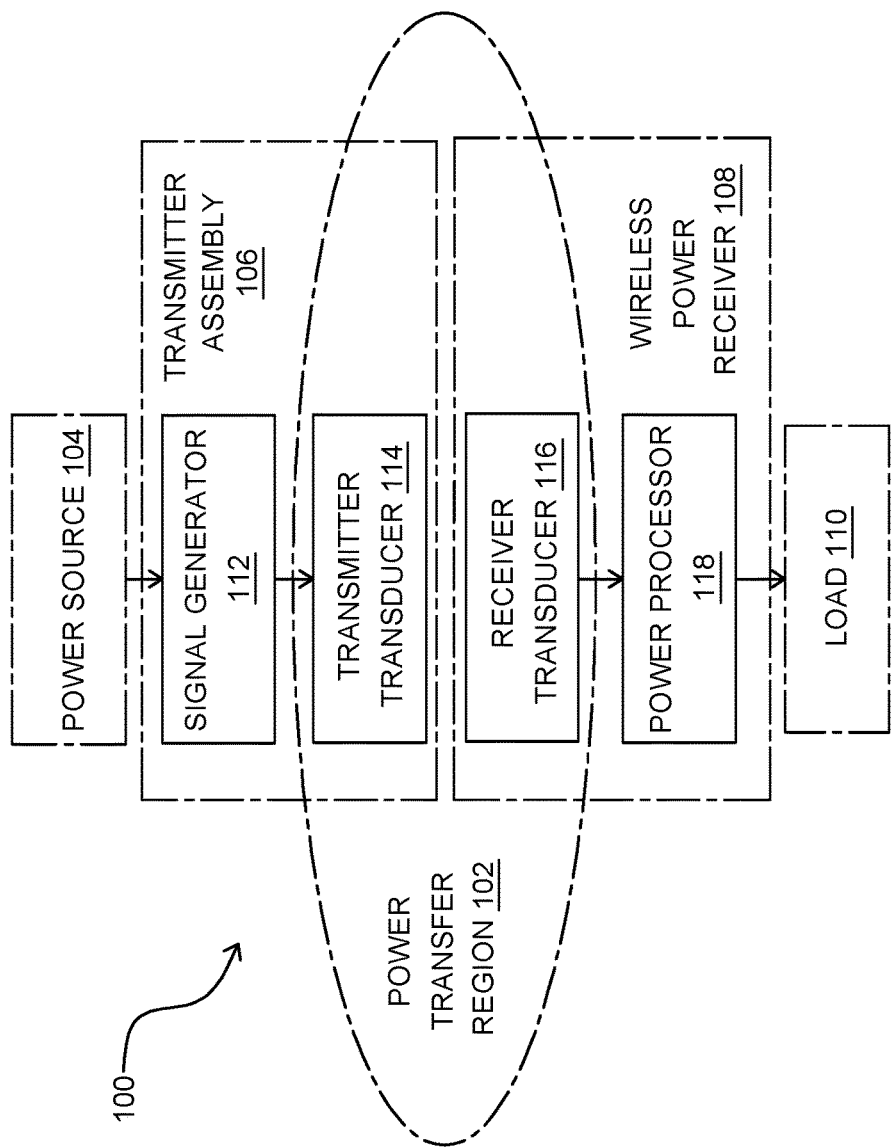
Figure 2:
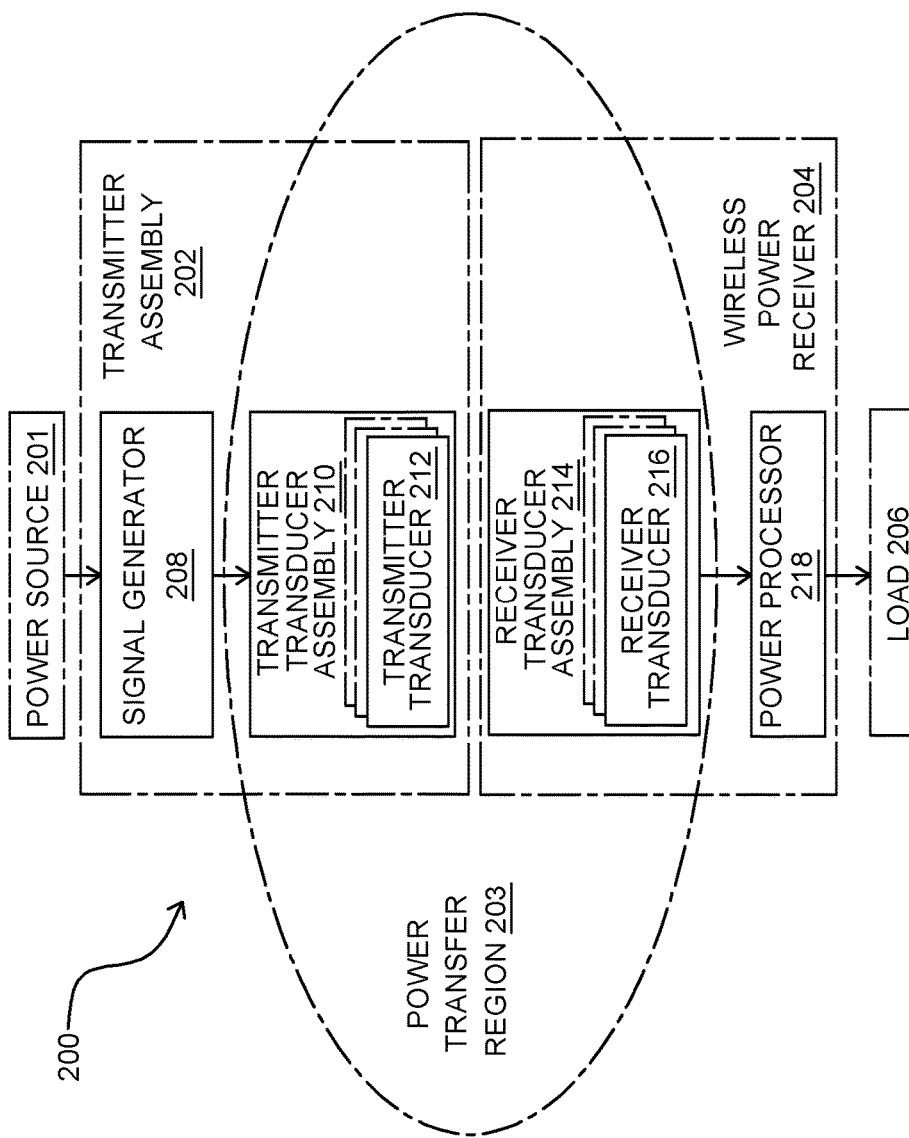
Figure 3:
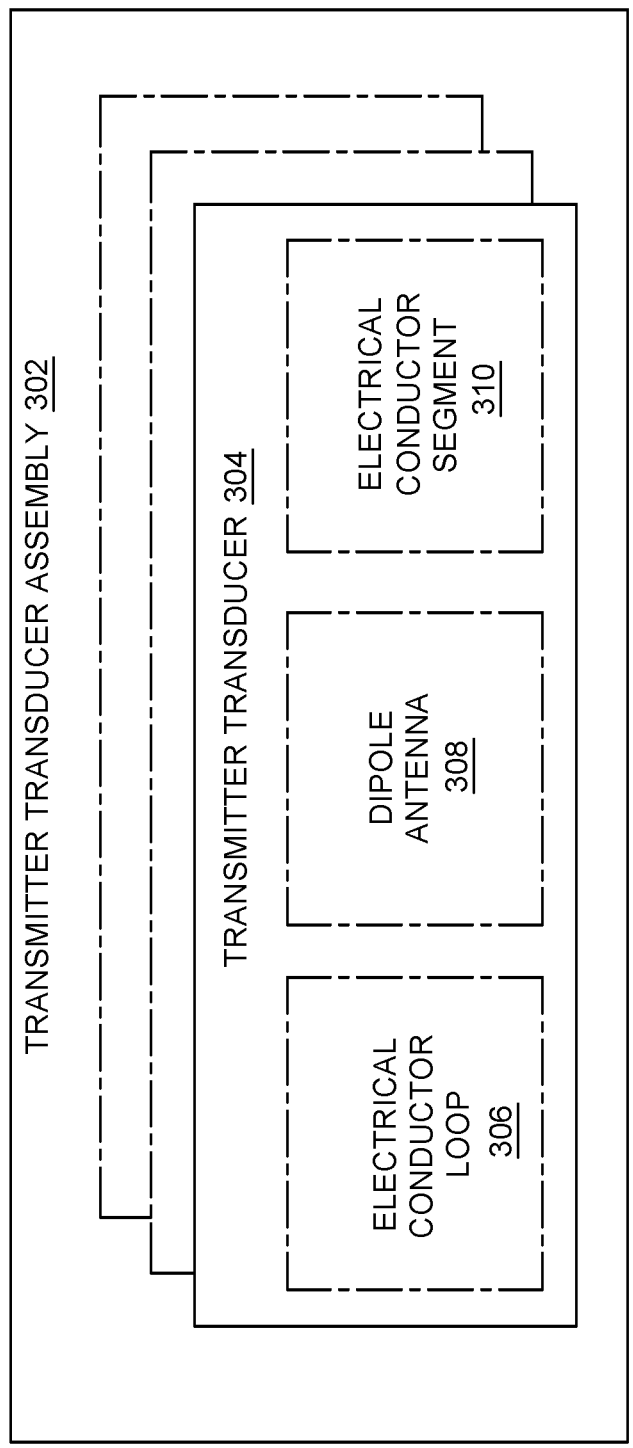
Figure 4:
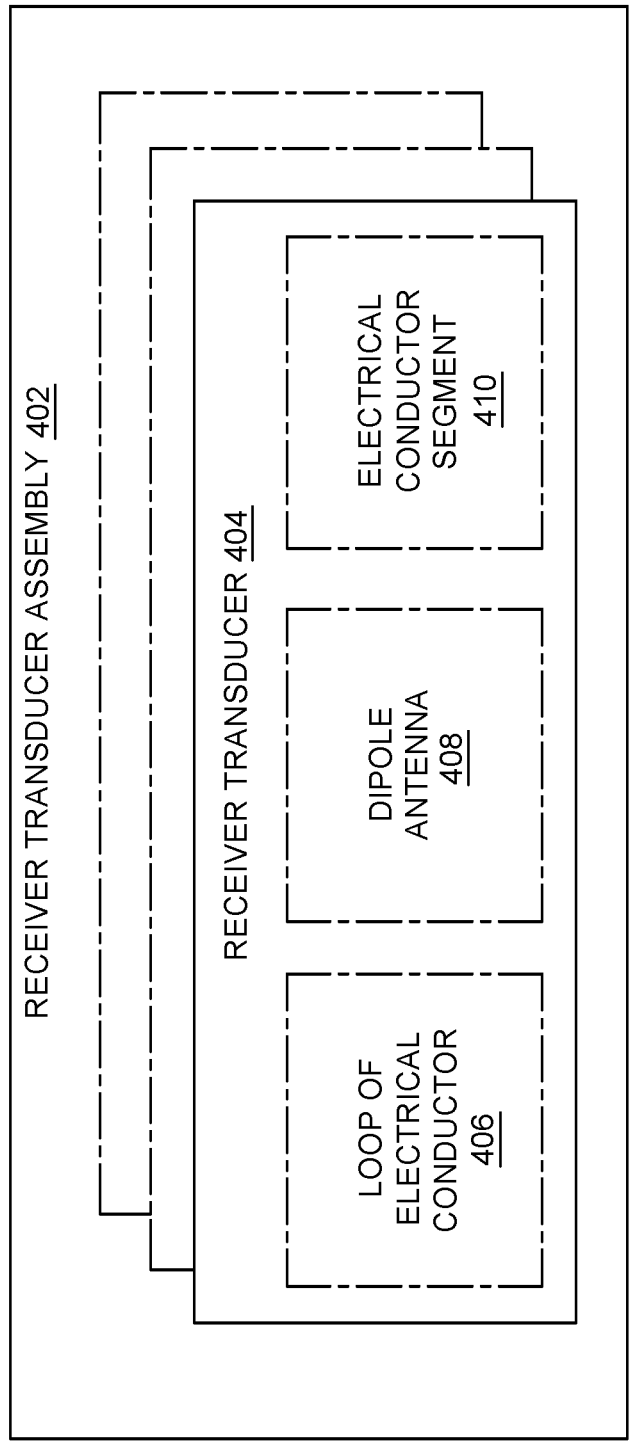
Figure 5:
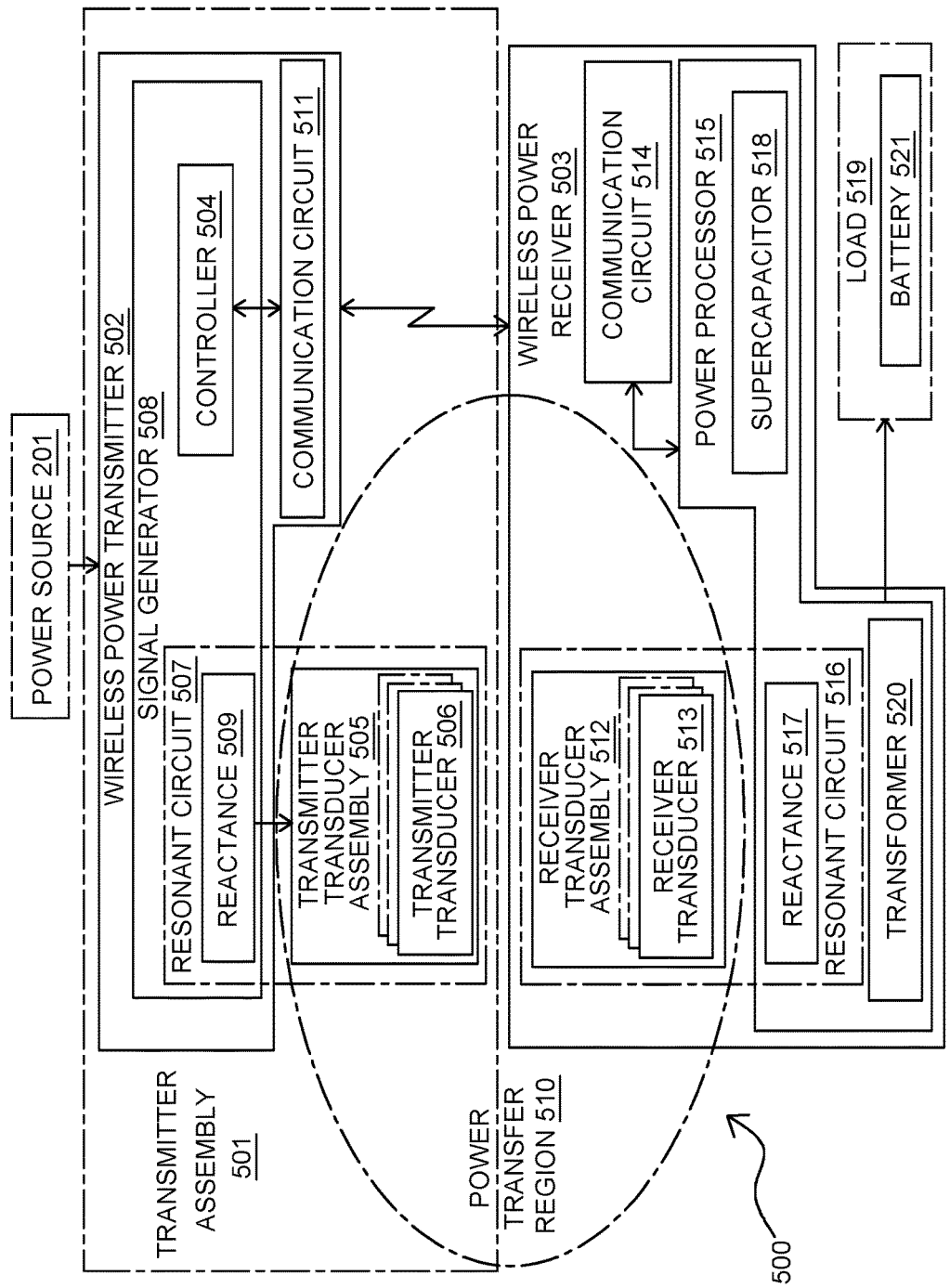
Figure 6:
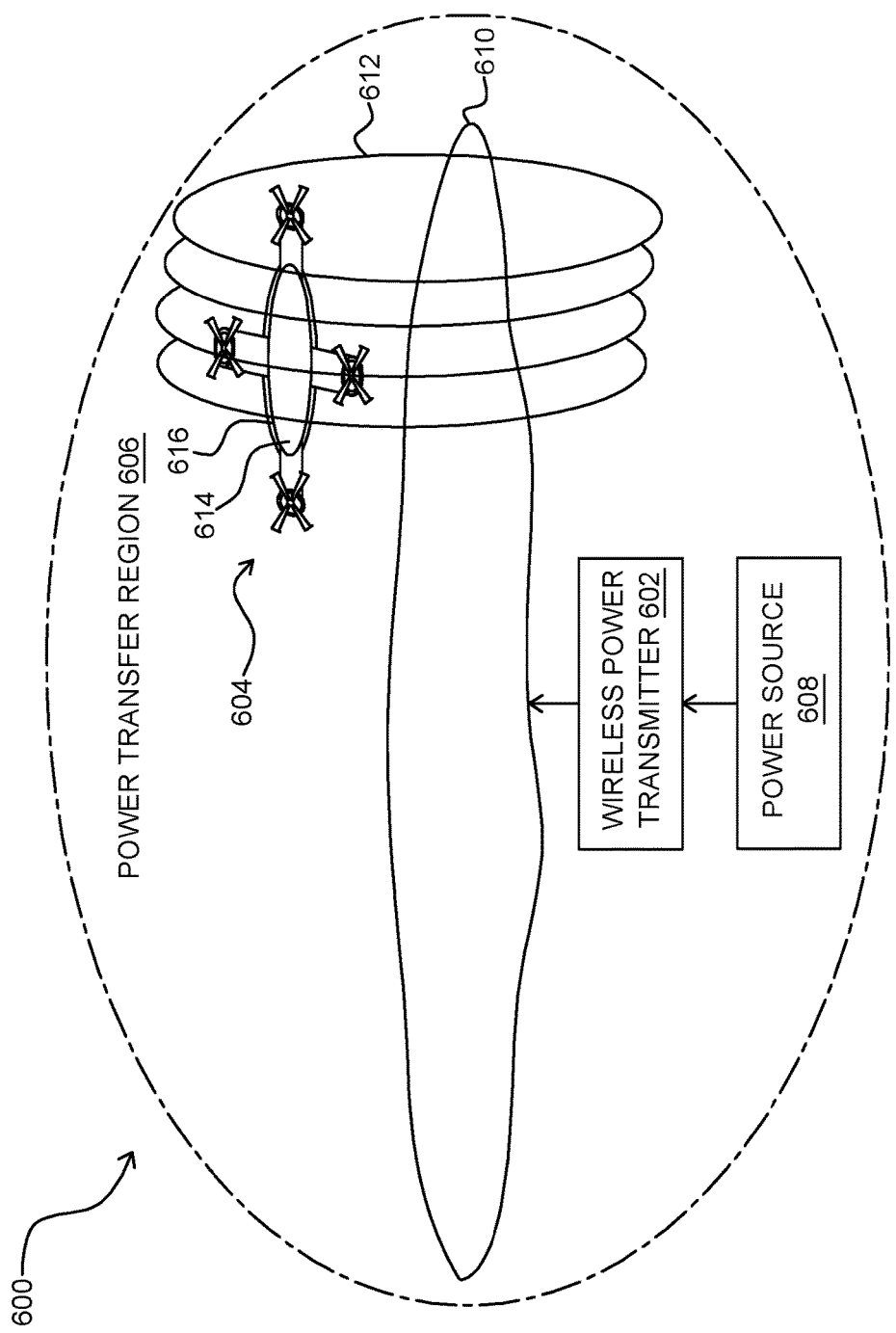
Figure 7:
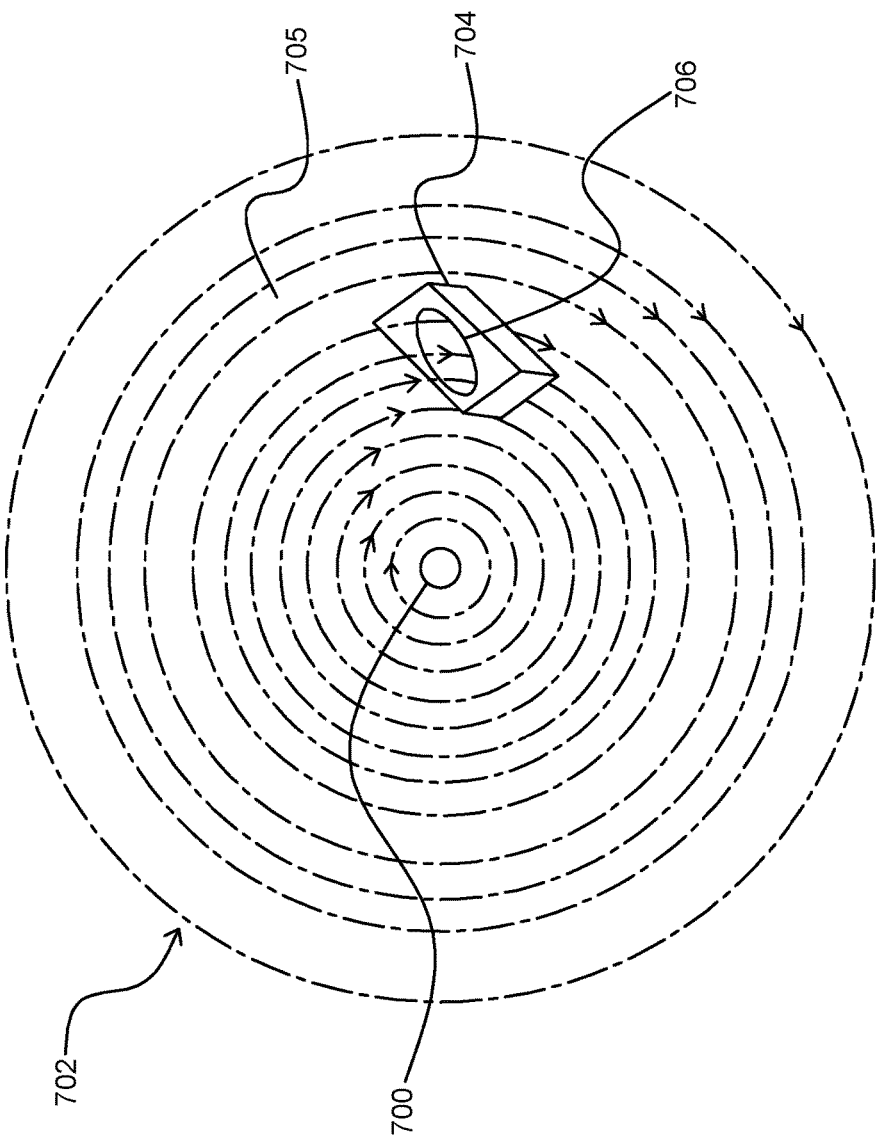
Figure 8:
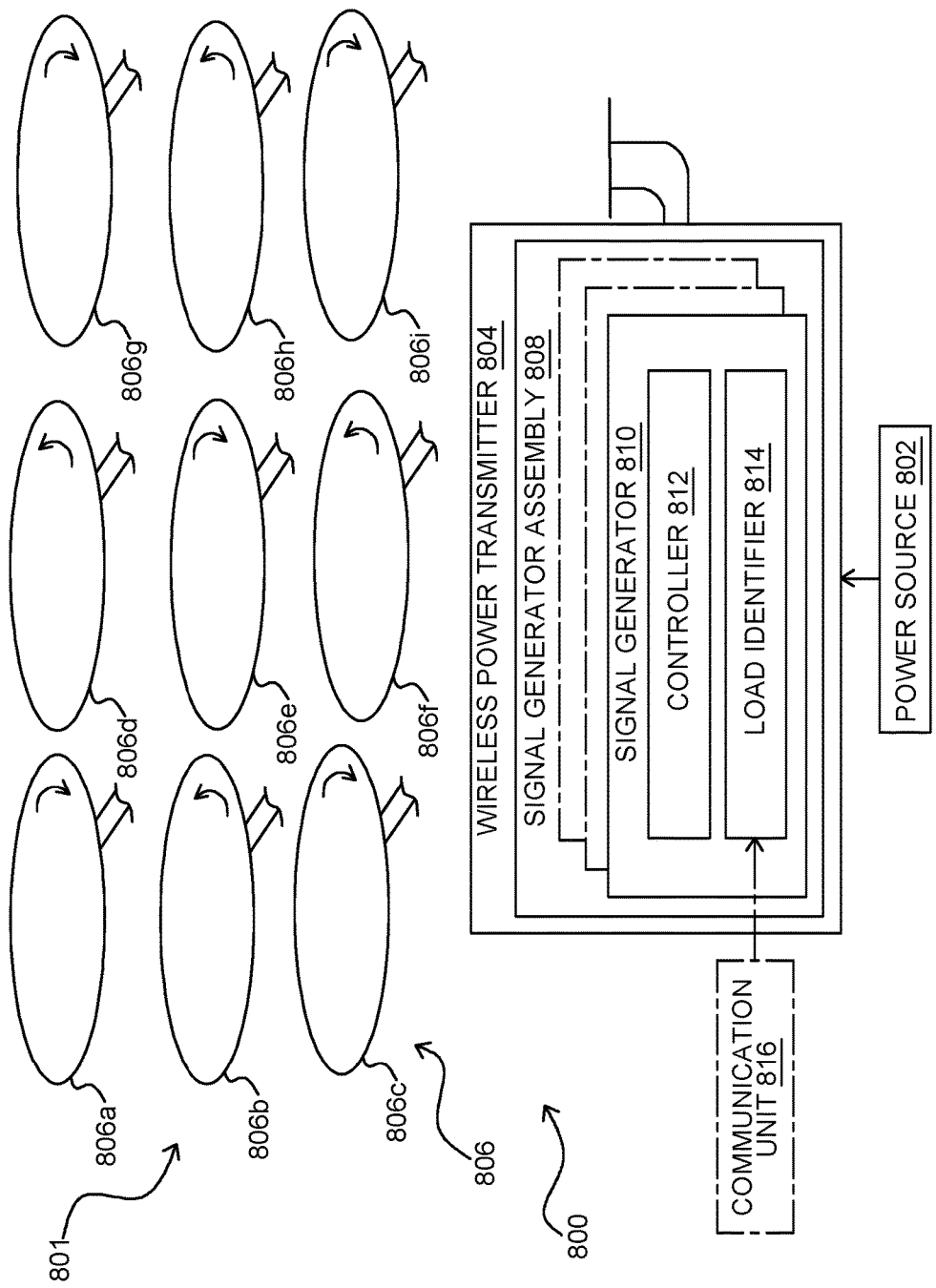
Figure 9:
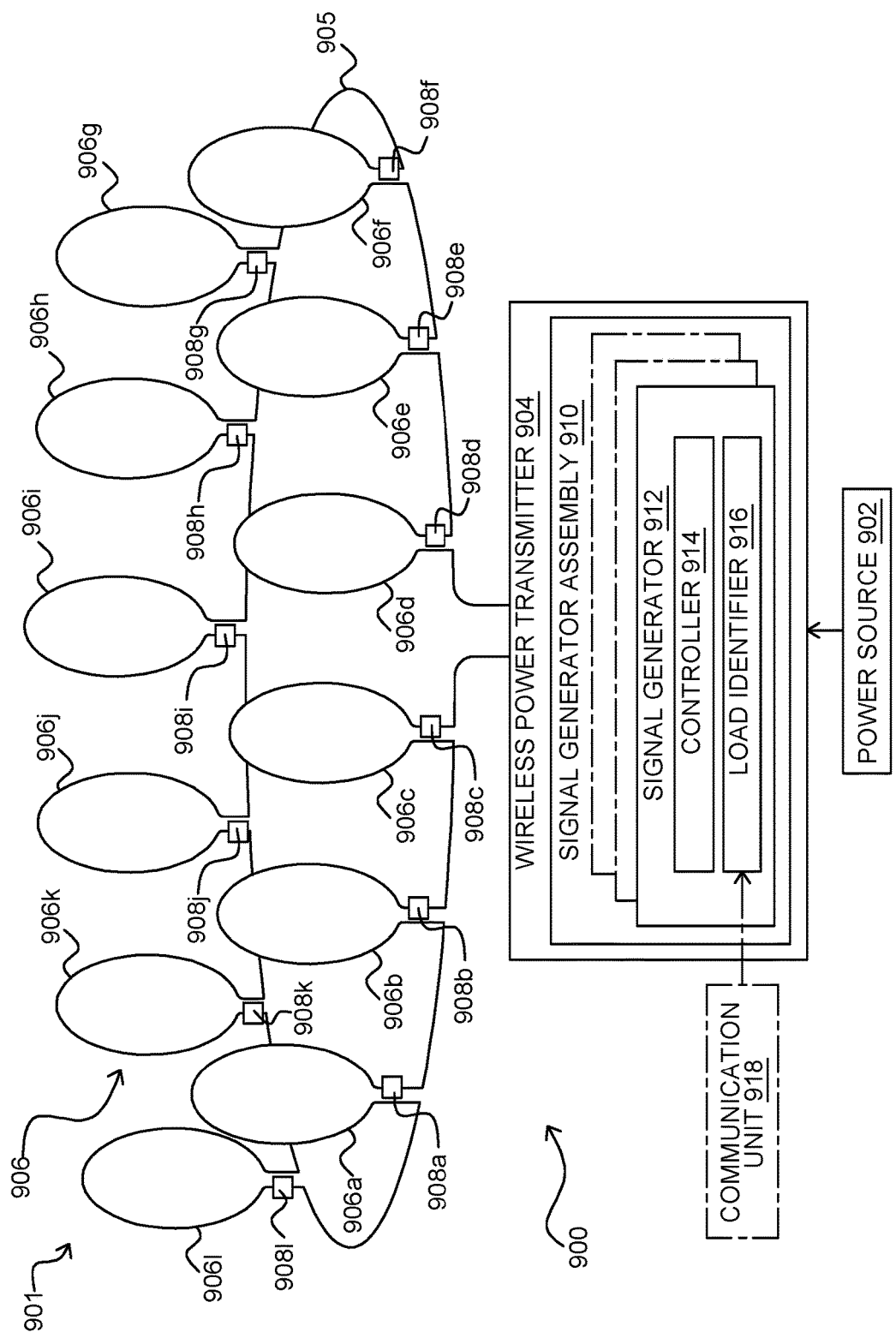
Figure 10:
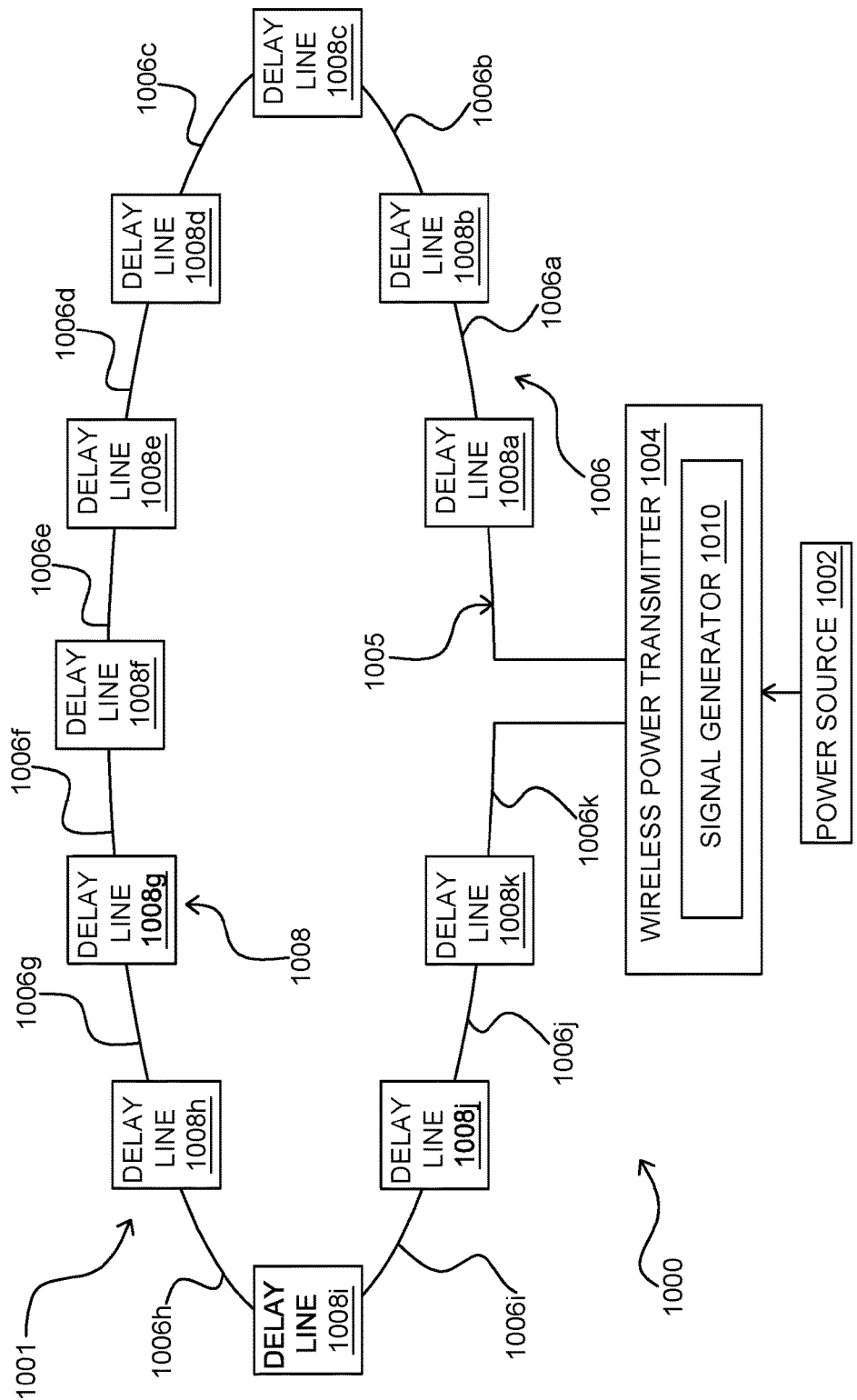
Figure 11:
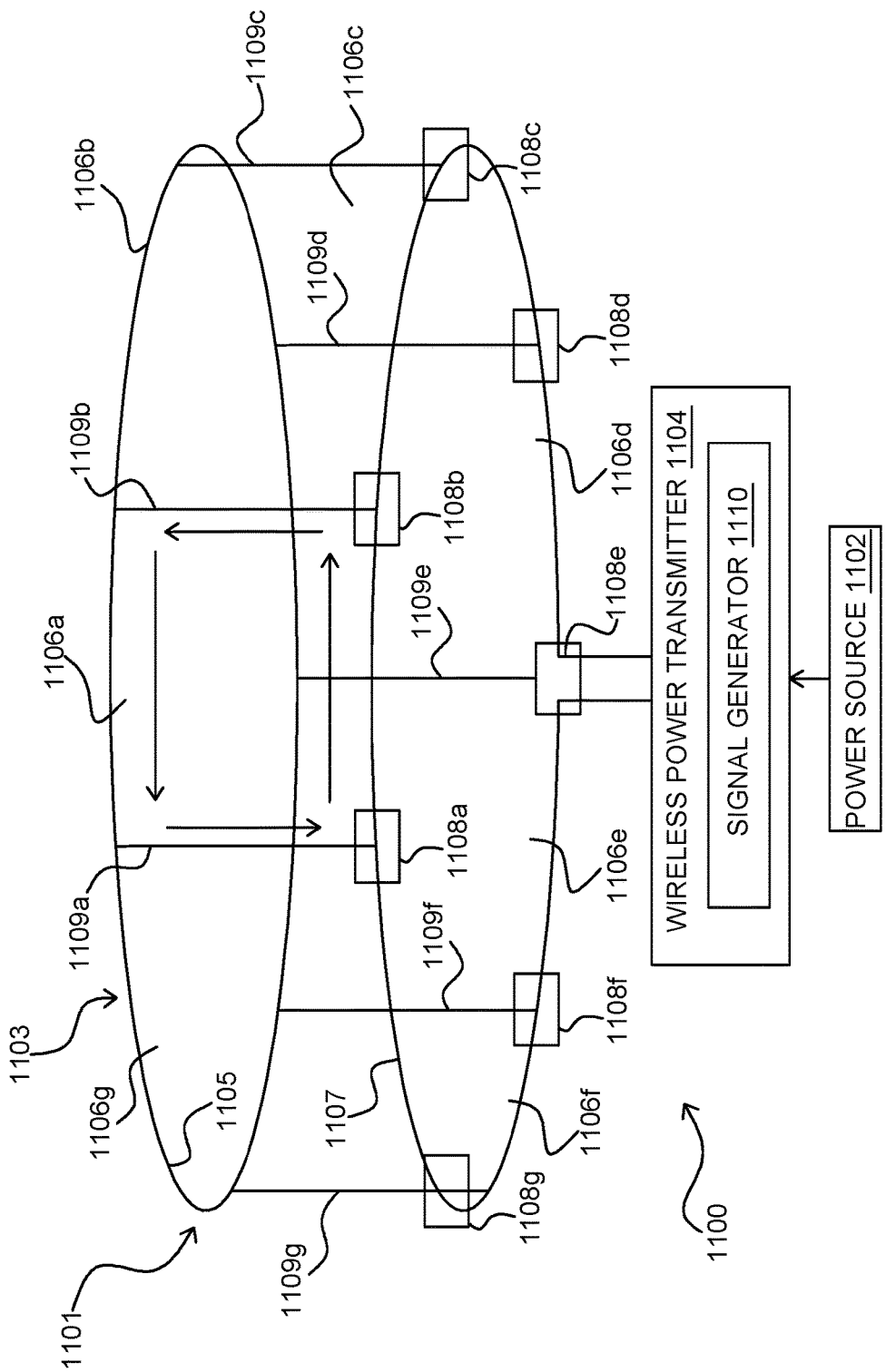
Figure 12:
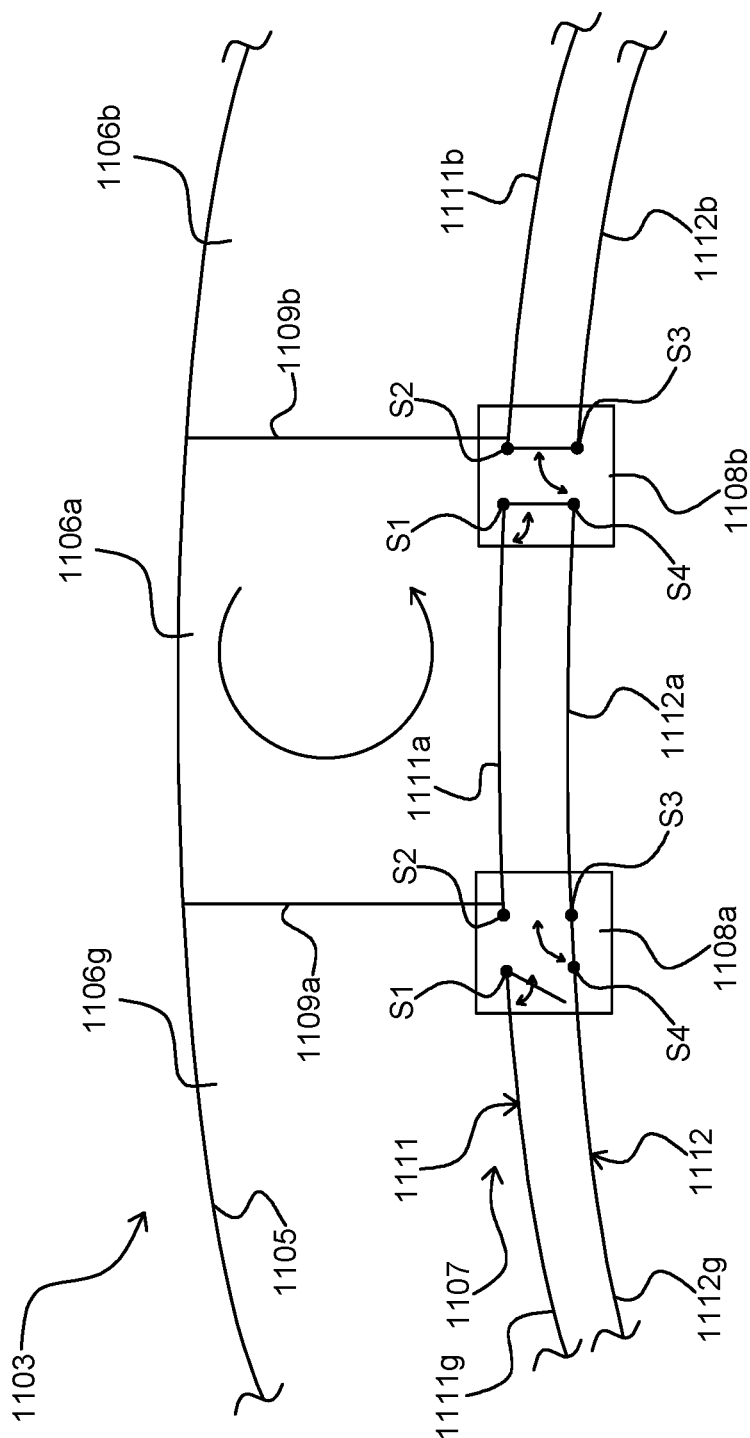
Figure 13:
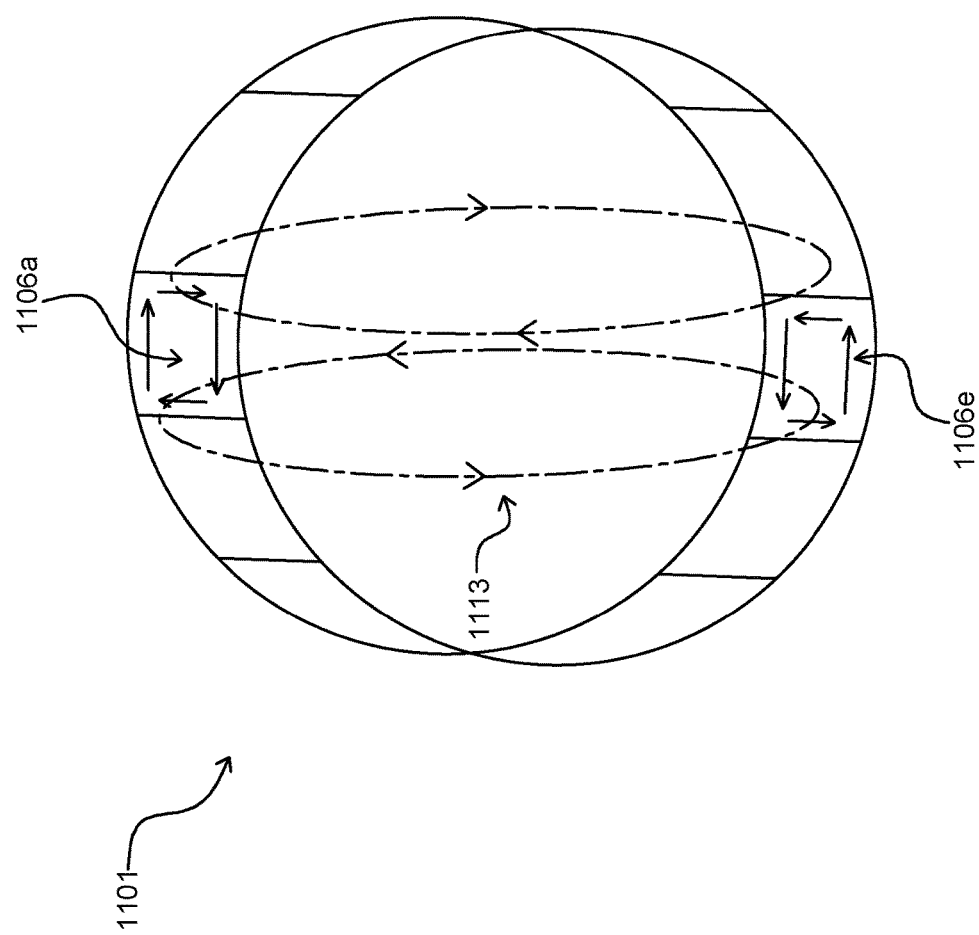
Figure 14:
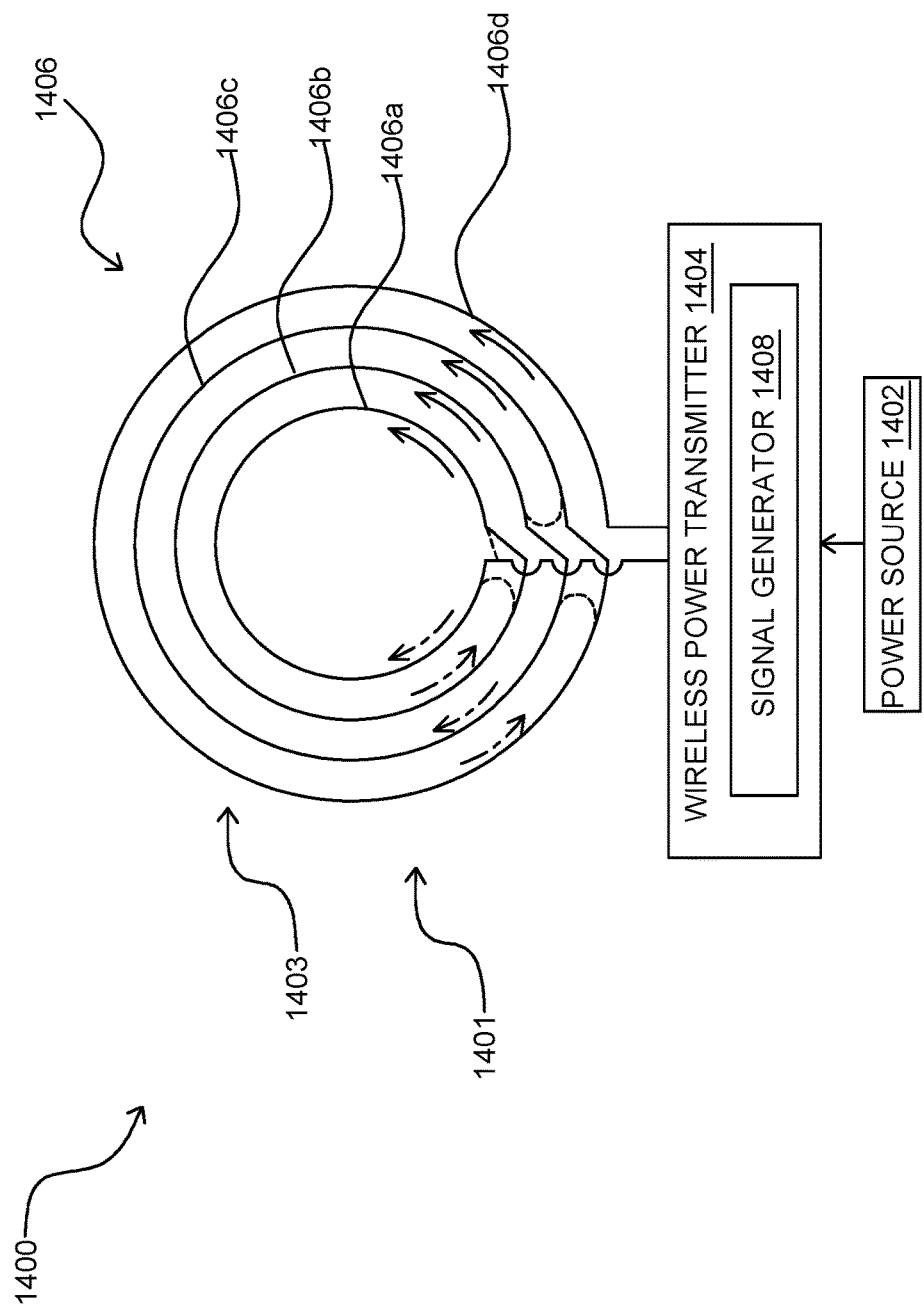
Figure 15:
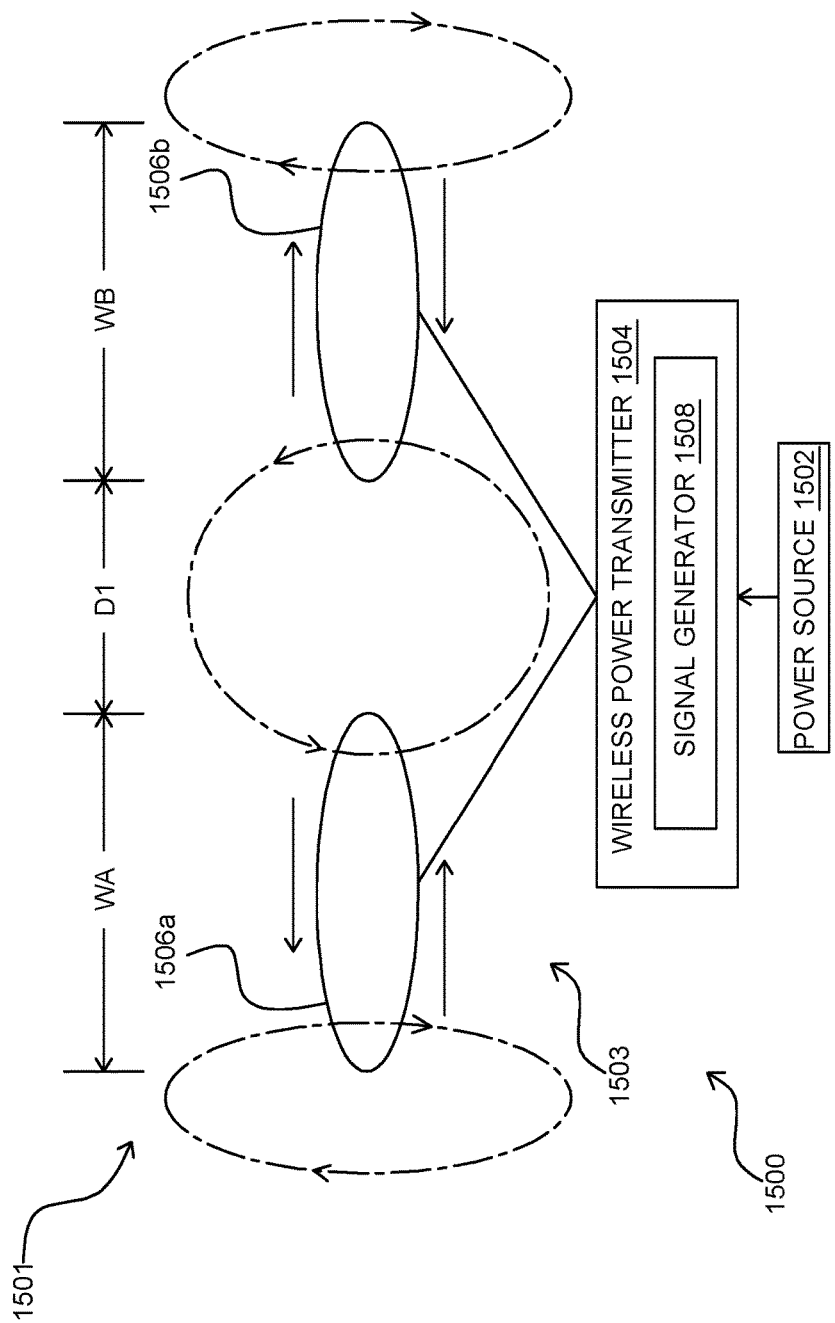
Figure 16:
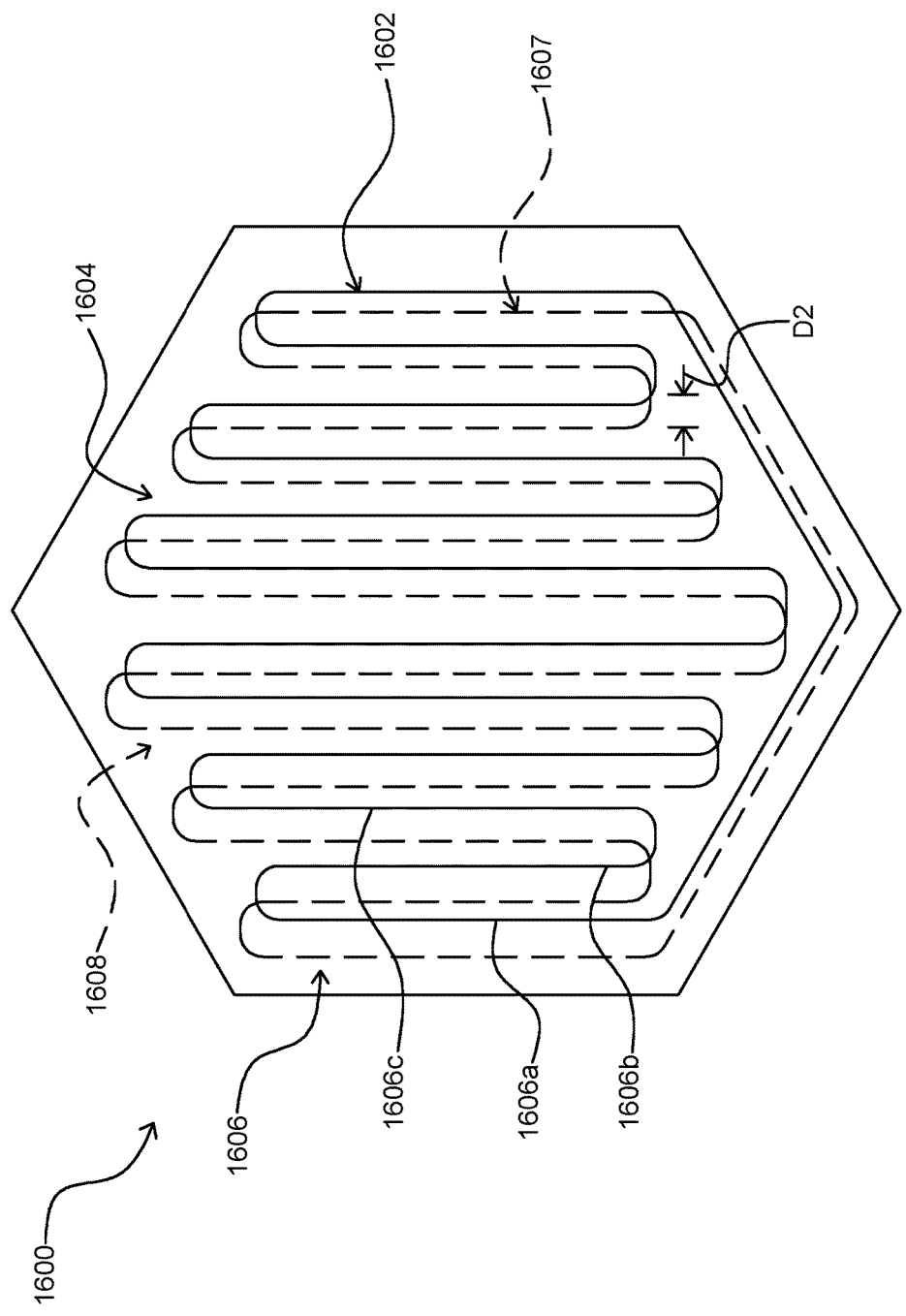
Figure 17:
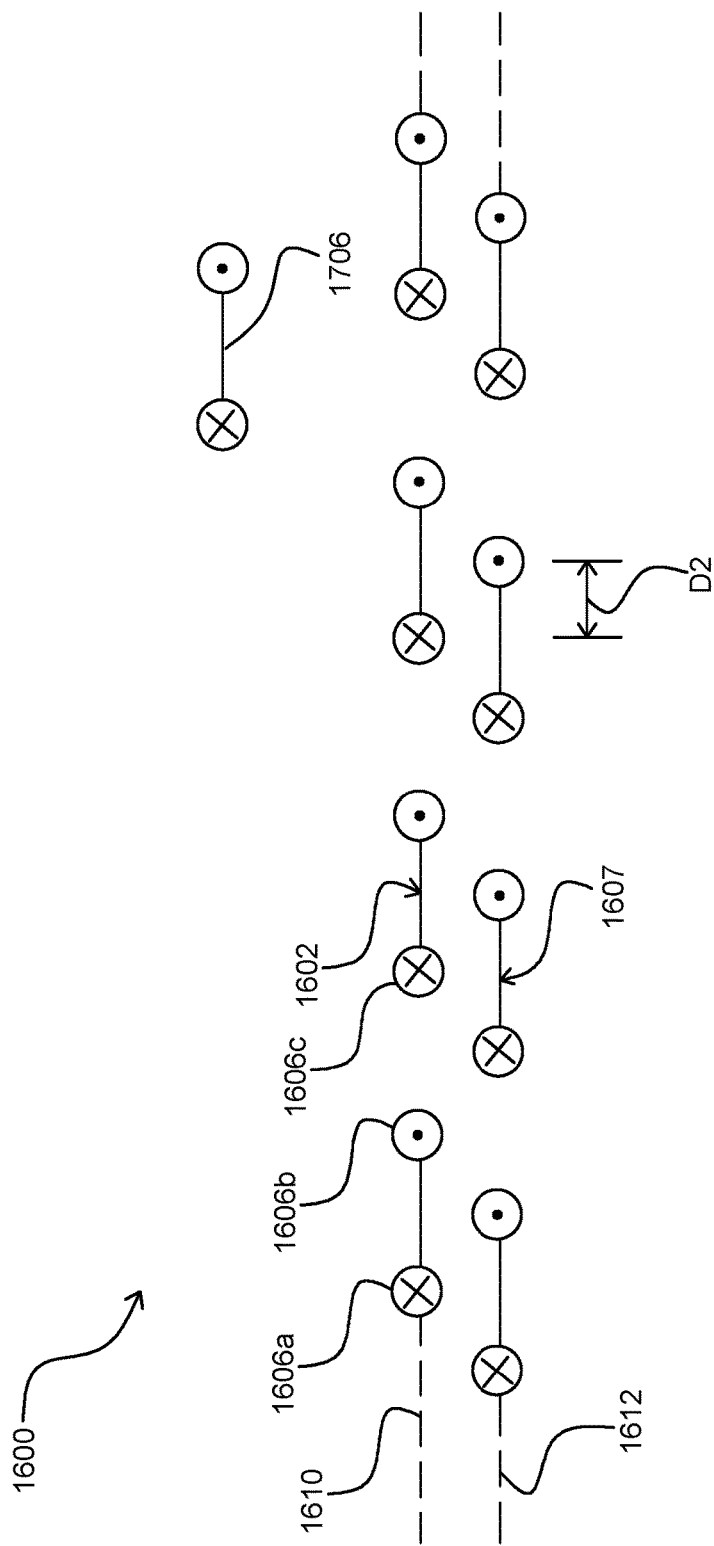
Figure 18:
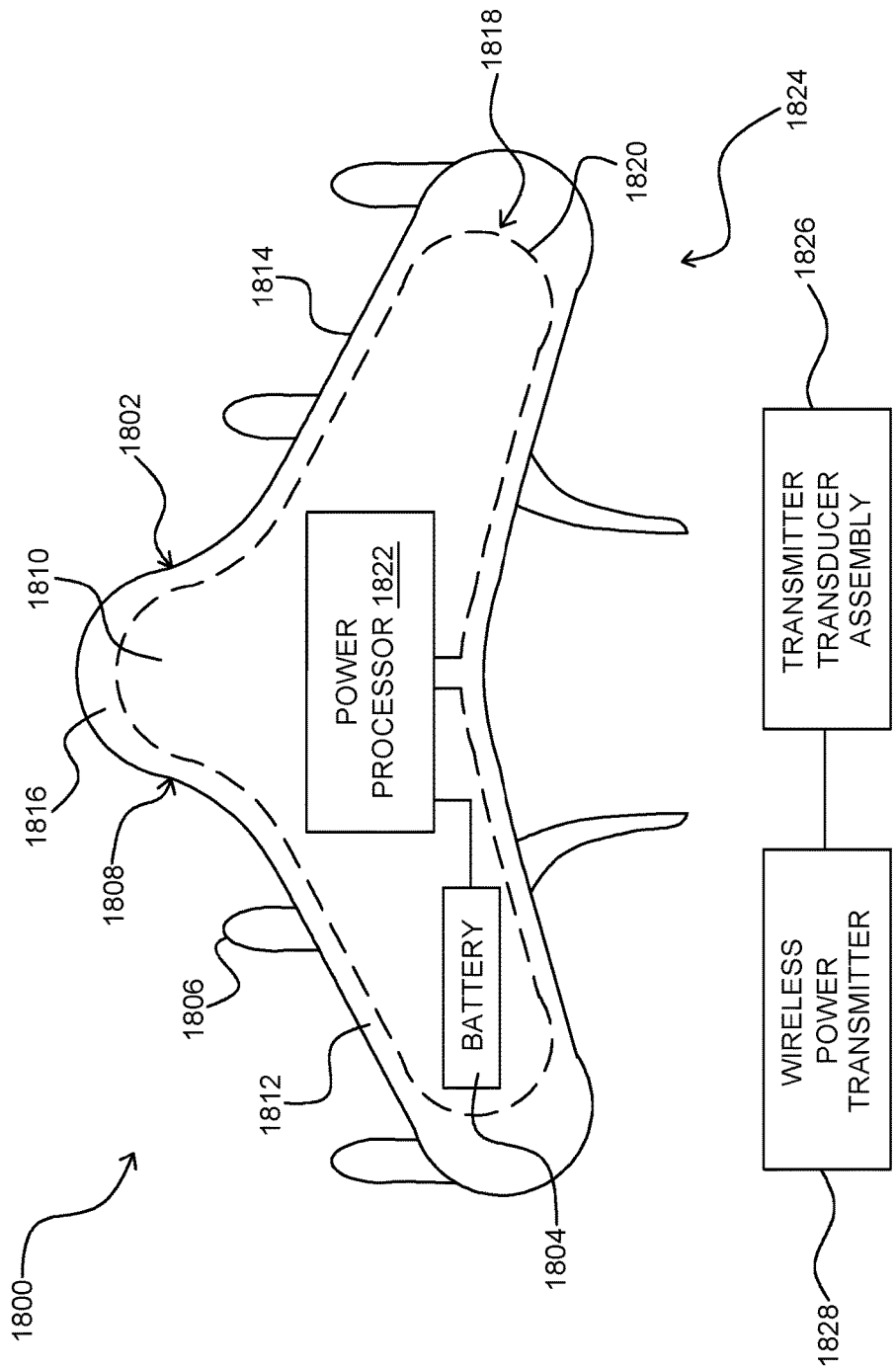
Figure 19:
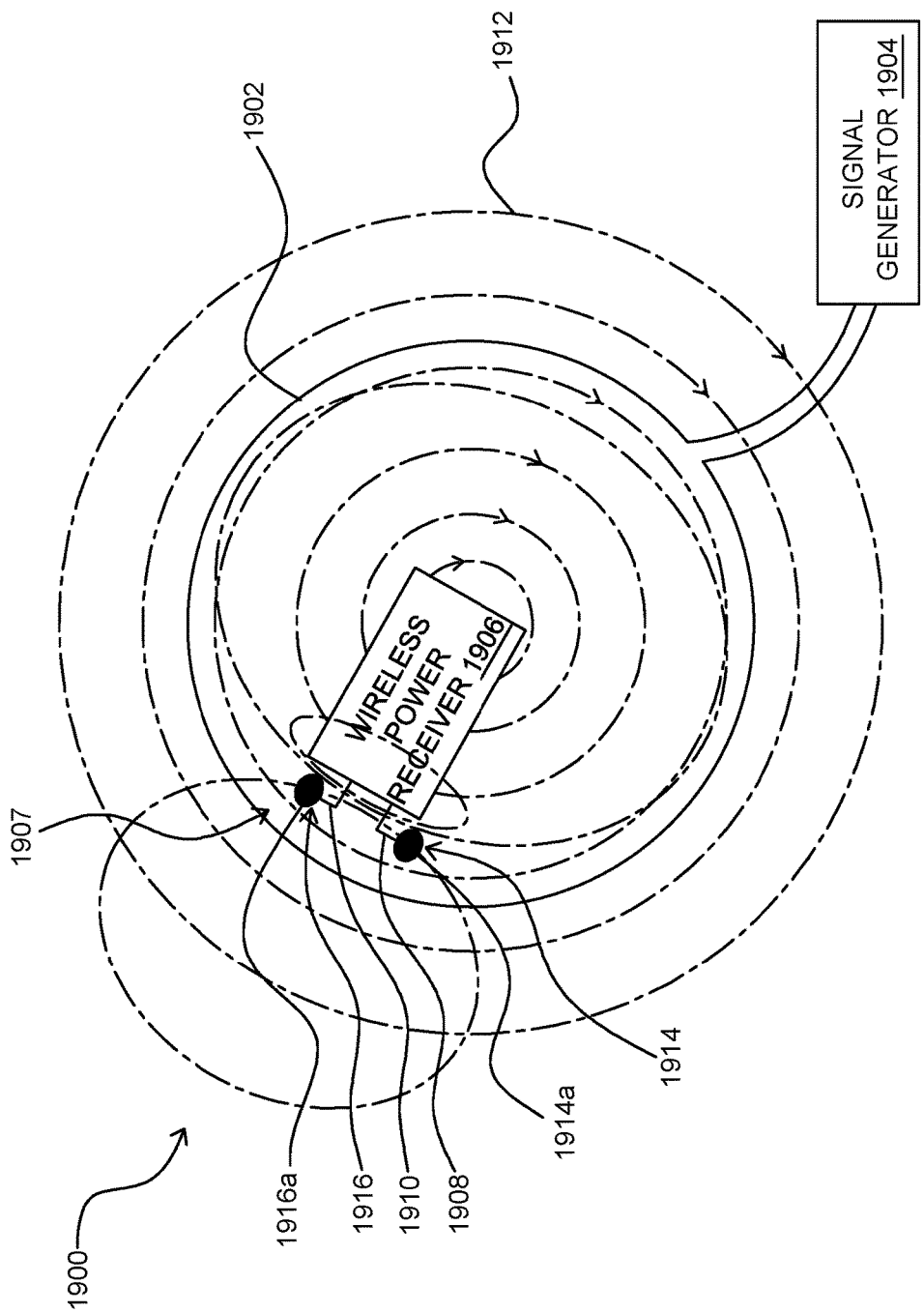
Figure 20:
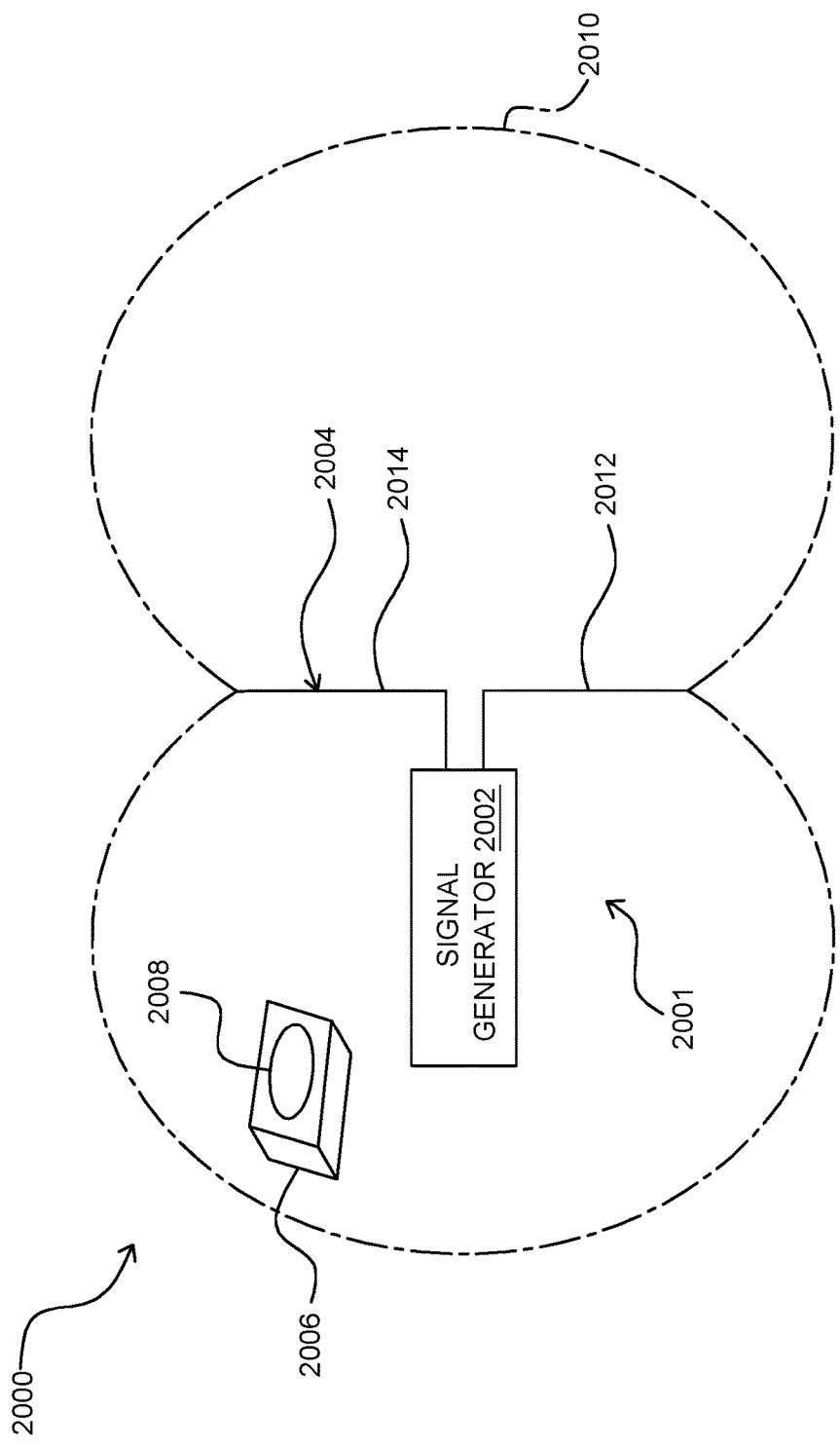
Figure 21:
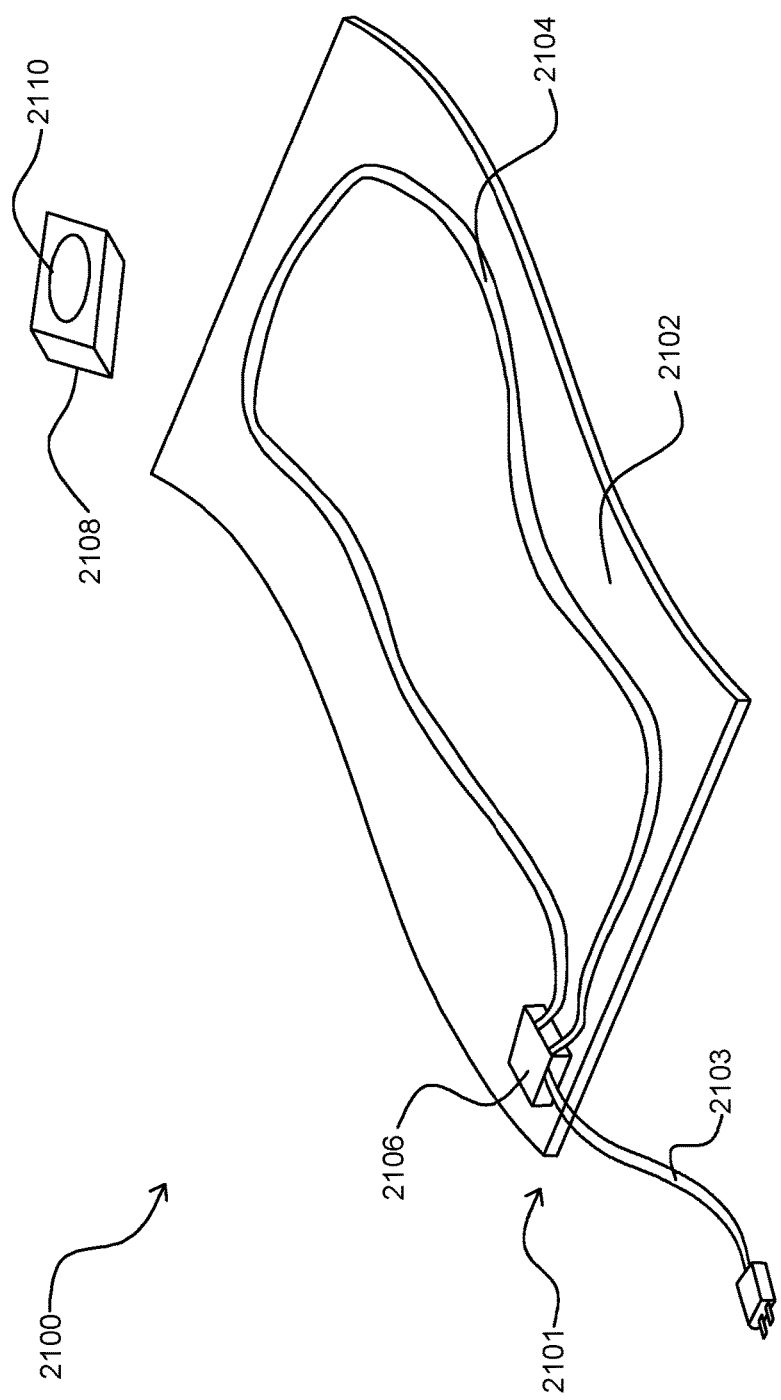
Figure 22:
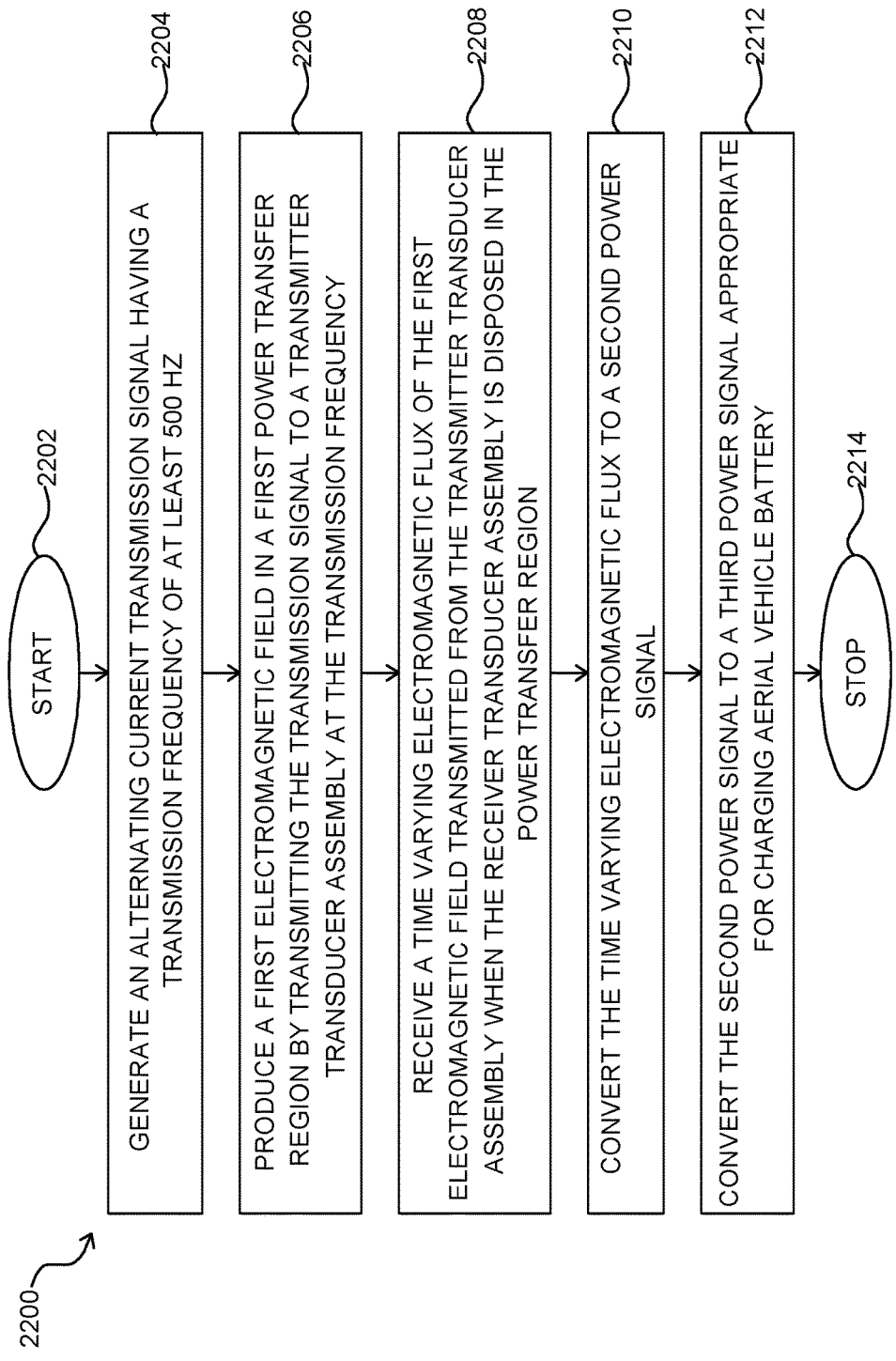
Figure 23:
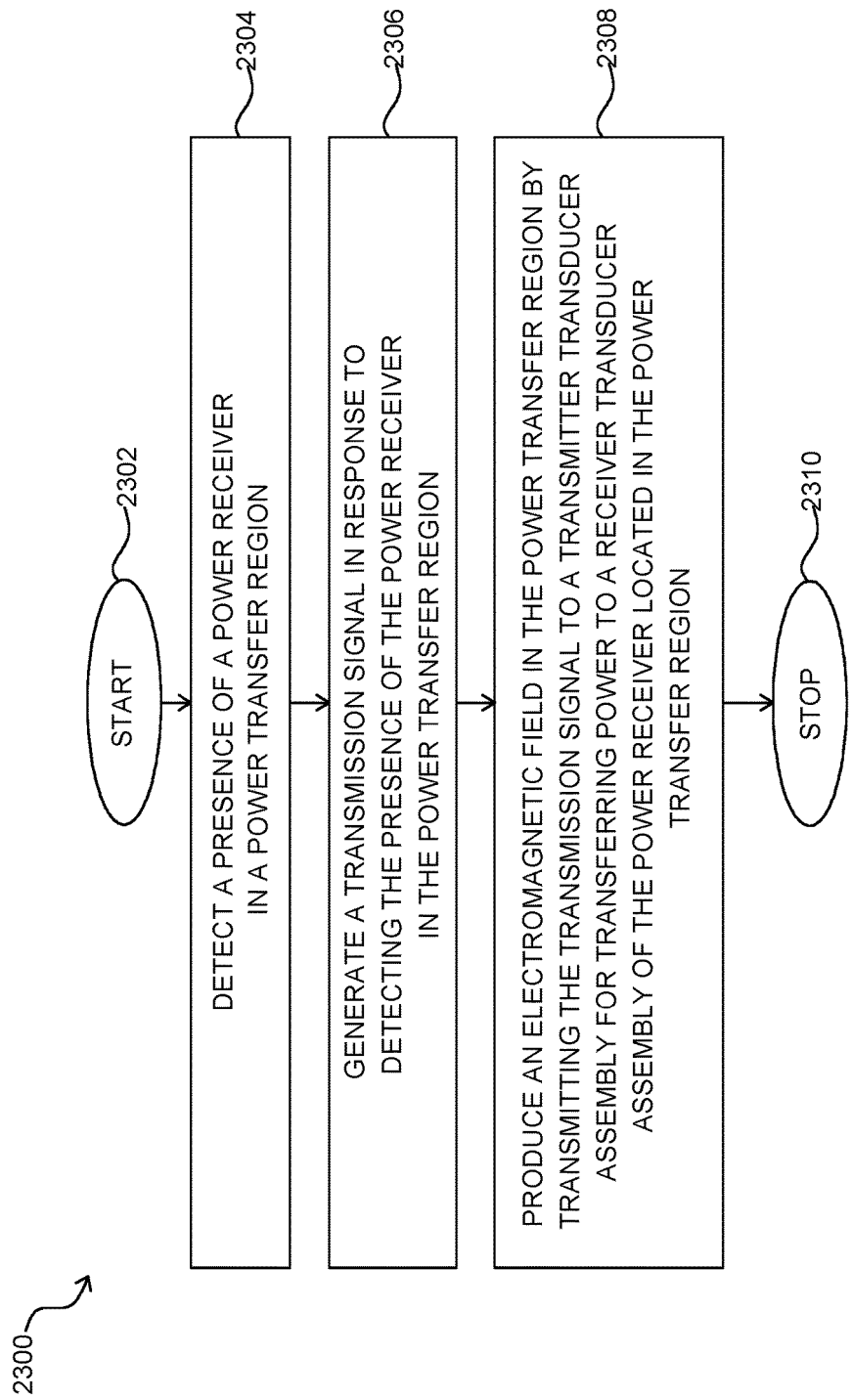
Figure 24:
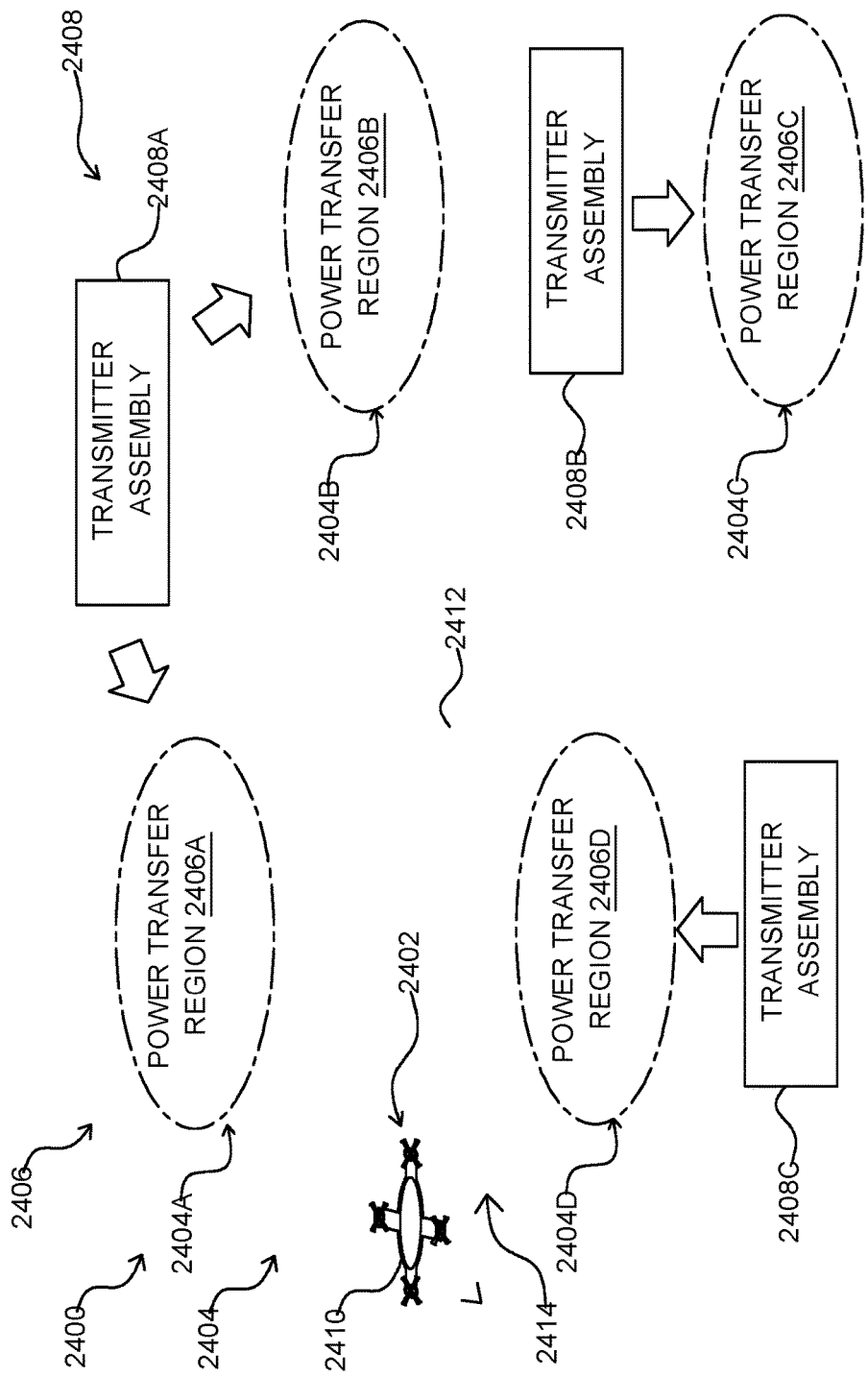

Having thus described the invention in general terms, reference will now be made to the accompanying drawings, which are not necessarily drawn to scale, and wherein:

FIG. 1 illustrates a block diagram of an example of a wireless power transfer system for wireless power transferring;

FIG. 2 illustrates a block diagram of another example of a wireless power transfer system for wireless power transferring;

FIG. 3 illustrates a block diagram of an example of a transmitter transducer assembly;

FIG. 4 illustrates a block diagram of an example of a receiver transducer assembly;

FIG. 5 illustrates different components of a further example of a wireless power transfer system;

FIG. 6 shows an example of a wireless power transfer system including a wireless power transmitter for powering a drone flying in a power transfer region;

FIG. 7 shows a cross-section view of a transmitter conductor with a magnetic field around the conductor and a wireless power receiver receiving power from the magnetic field;

FIG. 8 is an illustration of an example of a multi loop configuration for a transmitter transducer assembly;

FIG. 9 is an illustration of another example of a multi loop configuration for a transmitter transducer assembly;

FIG. 10 is an illustration of an example of a segmented cable design for a transmitter transducer assembly;

FIG. 11 is an illustration of yet another example of a multi-loop configuration for a transmitter transducer assembly;

FIG. 12 is an illustration of an example of switching between selectable frames of electrical conductor in a distributed frame configuration;

FIG. 13 illustrates a top view of an example of a transmitter conductor conducting a transmission signal in opposing complementary frames in the transmitter transducer assembly of FIG. 11;

FIG. 14 is an illustration of yet another example of a multi-loop configuration for a transmitter transducer assembly;

FIG. 15 is an illustration of another example of a multi-loop configuration of a transmitter transducer assembly;

FIG. 16 is an illustration of yet another example of a multi-loop configuration of a transmitter transducer assembly;

FIG. 17 is an illustration of a side view of the multi-loop configuration of FIG. 16;

FIG. 18 is an illustration showing different components of a wireless power receiver of an aerial vehicle;

FIG. 19 illustrates a plan view of an example of a wireless power transfer system including a transmitter transducer for powering a dipole receiver;

FIG. 20 illustrates a cross-sectional view of an example of a wireless power transfer system including a dipole transmitting antenna for powering a wireless power receiver;

FIG. 21 illustrates an application of a wireless power transfer system for powering one or more power receivers;

FIG. 22 illustrates an example of a method for the wireless transfer of power to an aerial vehicle;

FIG. 23 illustrates an example of a method for the wireless transfer of power; and FIG. 24 illustrates an example of a distributed power transfer system through which an aerial vehicle may travel.

There may be additional structures described in the description that are not depicted in the drawings, and the absence of such a depictions should not be considered as an omission of such design from the specification.

DETAILED DESCRIPTION

Before describing embodiments in detail, it should be observed that the embodiments may utilize system components and method steps related to wireless power transmission, reception, and transfer. Accordingly, the system components have been represented where appropriate by conventional symbols in the drawings, showing specific details that are pertinent for an understanding of the embodiments so as not to obscure the description with details that will be readily apparent to those with ordinary skill in the art having the benefit of the description herein.

Detailed embodiments are disclosed herein; however, it is to be understood that the disclosed embodiments are merely exemplary of the claimed inventions, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure or method. Further, the terms and phrases used herein are not intended to be limiting but rather to provide an understandable description of the subject matter.

FIG. 1 illustrates a block diagram of an example of a wireless power transfer system 100 for wireless power transferring. The wireless power transfer system 100 enables transferring of electrical power to one or more devices in real time. The wireless power transfer system 100 can be implemented in a closed environment. In an example, the wireless power transfer system 100 can be implemented in offices, homes or any other type of indoor location. The indoor location may include a room, a corridor, a conference room or any other area inside a building.

The wireless power transfer system 100 also can be implemented in an open environment. For example, the wireless power transfer system 100 may be implemented outside a building. The area outside the building may include a covered area with an opening to the open environment proximate the covered area. In yet another example, the wireless power transfer system 100 may enable transferring power a distance of 10 meters or more inside the closed environment. The wireless power transfer system 100 may enable transferring power a distance of 20 meters or more in the open environment. These distances are based on expected power delivery capabilities of the systems rather than any characteristics of the open or closed environments.

The wireless power transfer system 100 may facilitate wireless power transferring to one user device or to a plurality of user devices simultaneously or serially. In an example, the wireless power transfer system 100 may provide power to an aerial vehicle, such as unmanned aerial vehicles (UAVs), including drones, in the open environment which require power of more than 500 watts. In some examples, drones can be powered a distance of 20 meters or more from a wireless power transmitter transducer 114. The wireless power transfer system 100 can concurrently or sequentially power multiple numbers of devices. The wireless power transfer system 100 may include a wireless power assembly, or transmitter assembly, 106, configured to be connected to a power source 104, and a wireless power receiver 108 configured to be connected to a load 110. The transmitter assembly 106 includes a signal generator 112 and a transmitter transducer 114. The wireless power receiver 108 includes a receiver transducer 116 and a power processor 118.

In this example, the signal generator 112 transmits a transmission signal to transmitter transducer 114. Transmitter transducer 114 may be an antenna. For example, transmitter transducer may be a conductive coil or loop formed by an electrical conductor that conducts the transmission signal. In some examples, the conductor may extend in any appropriate configuration, with part or the entire conductor being unshielded and ungrounded for producing a magnetic field in power transfer region 102. The portion of the conductor producing the magnetic field may be in a configuration other than a continuous loop, and may produce one or more power transfer regions along its length. The conduction of the transmission signal along a length of the electrical conductor may form a power transfer region along the conductor length. The power transfer region may extend to a shielded conductor disposed a distance away from signal generator 112 as appropriate for a particular application.

When the wireless power receiver 108 is disposed in a power transfer region 102, the wireless power receiver 108 can draw power from the magnetic field. In addition, the magnetic field produced by the electrical conductor induces a voltage on terminals of receiver transducer 116.

The wireless power transfer system 100 facilitates wireless power transfer when the wireless power receiver 108 is positioned in the power transfer region 102. The power transfer region 102 is an area inside which the wireless power receiver 108 is able to draw power from the magnetic field produced by the transmitter transducer 114. Further, as mentioned, the wireless power receiver 108 may be electrically coupled with one or more loads of a corresponding one or more devices. The one or more devices can be one or more electrical devices, one or more electronic devices, electromechanical devices, like a UAV, and the like. Examples of these one or more devices include smartphones, tablets, laptops, personal digital assistants, cameras, unmanned aerial vehicles, and the like. The one or more devices may be any device using a battery as its power supply such as a wearable computing device, a wearable medical device, a portable MP3 player and the like. The battery of each device acts as the load 110. The load 110 is electrically coupled with the wireless power receiver 108. In addition, the load 110 may be any device which uses electrical power to operate. In some examples, devices may operate directly from power received from wireless power transfer system 100, with or without also charging a battery.

The wireless power receiver 108 can include one or more components which enable reception of the transmission signal and delivery of the power to the load of each corresponding device. The wireless power transfer system 100 performs wireless powering of the one or more devices that may be placed at large distances from the transmitter assembly 106, as appropriate for particular applications. The one or more devices need not be in close proximity to the transmitter assembly 106 to wirelessly receive power. The wireless power transmitter is inductively or capacitively interlinked with the wireless power receiver 108 when the wireless power receiver 108 is disposed in the power transfer region 102. The inductive or capacitive interlinking is based on an electromagnetic field coupling the wireless power transmitter and the wireless power receiver 108. In an embodiment, the wireless power transmitter may be electrically connected with one or more power receivers for purposes other than transfer of power. Each power receiver is configured to be electrically connected to a corresponding device. The wireless power receiver 108 is positioned or located in a vicinity of the transmitter assembly 106. The transmitter assembly performs wireless transmission of electrical power for load 110 when connected to receiver 108. When load 110 includes a rechargeable battery, the power transferred may be used to charge in real time the battery of the one or more user devices having receiver 108 or when connected to receiver 108.

Going further, the signal generator 112 is configured to be connected to the power source 104. The power source 104 supplies an electrical first power signal to the signal generator 112. For example, the power source 104 may be electrically connected to a receiving port of the signal generator 112. In an embodiment, the power source 104 is an AC power source having a pre-determined voltage and a pre-determined frequency. Examples of commercially available voltages and frequencies include 110 Volts at 50 Hertz, 110 Volts at 100 Hertz, 220 Volts at 50 Hertz, 110 Volts at 60 Hertz, 120 Volts at 60 Hertz, or 230 Volts 50 Hertz. The power source 104 may be a three phase power source.

For example, the signal generator 112 may simply be plugged into a standard 110 Volt or 220 Volt power source, if available. In another embodiment, the power source 104 is a DC power source. The DC power source supplies direct current to the signal generator 112. An AC or DC power source may be provided by a generator, a renewable energy source, such as a solar, wind, or hydro power source, or other available power source.

The signal generator 112 is configured to receive the first power signal from the power source 104. The signal generator 112 is an electronic device that generates an alternating current transmission signal from the first power signal. In some embodiments, the signal generator 112 is a power and frequency adjustable signal generator.

Moreover, the alternating current transmission signal has a transmission frequency of at least 500 Hz. Higher frequency transmission signals may facilitate the use of receiver structures having dimensions corresponding to devices receiving wireless power. In an embodiment, the signal generator 112 generates the transmission signal with a frequency in a range of 10 kHz-500 kHz. In another embodiment, the signal generator 112 generates the transmission signal with a frequency in a range of 5 kHz-1000 kHz. In yet another embodiment, the signal generator 112 generates the transmission signal with a frequency in a range of 500 kHz-100 MHz. The signal generator 112 may be disposed inside or outside the power transfer region 102. The signal generator 112 is configured to transmit the transmission signal to the transmitter transducer 114 at a transmission frequency.

The signal generator 112 is configured to be electrically connected to the transmitter transducer 114. In addition, the transmitter transducer 114 may extend to a position disposed an appropriate distance from the signal generator 112. The appropriate distance may be a pre-determined distance such that the signal generator 112 lies outside the power transfer region 102. In an embodiment, terminals of the transmitter transducer 114 are connected to corresponding ports of the signal generator 112.

In some embodiments, the transmitter transducer 114 is an elongate transmitter conductor that extends along the power transfer region 102. The transmitter conductor is an electrical conductor of a suitable length for the particular application. The transmitter may be a stranded or non-stranded conductor. A stranded conductor may be made of a plurality of individually insulated wires stranded together. The number of strands may vary from 2-50,000 strands, with the number and size of strands being selected as appropriate or suitable for each particular application. In an embodiment, the plurality of individually insulated wires is in a range of 2-1000 individual strands. The use of multiple insulated relatively thin wires may reduce ohmic losses due to skin effect.

In some embodiments, the transmitter transducer 114 is in the form of a primary inductance coil. In an embodiment, the transmitter transducer 114 is a loop of non-shielded electrical conductor. In another embodiment, the transmitter transducer 114 includes a plurality of concentric loops of electrical conductors. The plurality of concentric loops may include loops of different sizes. In an embodiment, each concentric loop of electrical conductor includes multiple individually insulated wires stranded together. In another embodiment, each concentric loop of electrical conductor includes a single conductor wire.

Going further, the transmitter transducer 114 has a length and position suitable to provide power in a desired or pre-determined power transfer region 102. The power transfer region 102 occupies a volume of space determined by the configuration of the conductor loop. In an example, the conductor loop extends from 5 meters to 100 meters inside a building and in another example, extends several kilometers, such as 5 kilometers, in an open environment. The transmitter transducer 114 has a largest dimension, such as a length of transmission conductor, or a conductive loop having a distance between opposite loop sections. The transmitter transducer 114 is preferably flexible, although it may be made or one or more substantially rigid elements. In an example, the transmission conductor or loop can be placed inside a wall, along a ceiling, on or in a floor, or in or on any other suitable support structure. The transmission conductor can be supported in any suitable way in a building or in an open environment.

In an embodiment, the transmitter transducer 114 includes silver mica capacitors or any other type of capacitors. The silver mica capacitors may provide improved precision, stability and reliability, particularly at higher frequencies, compared to other types of capacitors. In addition, silver mica capacitors may help achieve lower resistive and inductive losses with a Q factor above 1000.

As described above, the transmitter transducer 114 may be an antenna in the form of a current carrying conductor that produces a magnetic field when transmission-signal current flows along a length of the conductor.

The magnetic field is characterized by a time varying magnetic flux that defines the power transfer region 102, which has a magnetic field strength that is sufficient for transferring power to the wireless power receiver 108. In addition, in embodiments in which the transmitter transducer is a conductive loop, the configuration of the loop determines the configuration of the power transfer region 102. As mentioned above, the power transfer region 102 can be defined as a space containing the magnetic field where wireless power transfer is realizable by means of the wireless power transmitter assembly 106 and the wireless power receiver 108. The wireless power transfer is realizable where the magnetic field has sufficient strength for the wireless power receiver 108 to obtain useable amounts of power.

In an embodiment, the wireless power receiver 108 is configured to be internally connected to the load 110, such as when receiver 108 and load 110 are part of a common device. In another embodiment, the wireless power receiver 108 is configured to be externally connected to the load 110. The load 110 may be an electrical load of a user device, such as a battery which needs to be charged and/or operating electrical circuits. The wireless power receiver 108 may thus be housed in a housing separate from the load device, or may be part of the load device. When separate, the wireless power receiver 108 may include a cover conforming to a cover of the device associated with the load 110.

The wireless power receiver 108 includes the receiver transducer 116. The receiver transducer 116 may be a receiver antenna, such as a secondary coil forming a secondary inductance loop. The coil may have a pre-determined length appropriate to produce a desired level of inductance. The receiver transducer 116 may have dimensions of comparable size or smaller than corresponding dimensions of the transmitter transducer 114. In addition, the length of the receiver transducer 116 in the form of a coil may be less than the length of the transmitter transducer 114 when in the form of a conductive loop or elongate transmission conductor. In an embodiment, the receiver transducer 116 has a largest dimension between 1 and 0.00001 times the largest dimension of the transmitter transducer 114. In another embodiment, the receiver transducer 116 has a largest dimension between 0.1 and 0.00001 times the largest dimension of the transmitter transducer 114, such as when the transmitter transducer extends in a region many times larger than receiver transducer 116.

As is discussed further with reference to FIG. 2, the transmitter transducer 114 and the receiver transducer 116 may be configured to operate in a resonance state at a resonant frequency. In addition, the transmitter transducer 114 and the receiver transducer 116 may be impedance matched. The impedance matching may allow improved transfer of power from the wireless power transmitter to the wireless power receiver 108.

In an embodiment, the wireless power transmitter assembly 106 is configured to continuously transmit a transmitter communication signal to detect the presence of a wireless power receiver 108 in power transfer region 102. In an embodiment, the wireless power receiver 108 may send a receiver communication signal to the wireless power transmitter in response to receipt of the transmitter communication signal.

In addition or alternatively, the wireless power receiver 108 may detect the magnetic field produced by the transmitter transducer 114. In some embodiments, the signal generator 112 automatically initiates the generation of the transmission signal in response to detection of the presence of the one or more power receivers 108 in the power transfer region 102. In response to the detection of a wireless power receiver 108 in the magnetic field of the power transfer region 102, the signal generator 112 may supply increased power in the transmission signal appropriate to power a load 110 associated with the power receiver 108.

Accordingly, the receiver transducer 116 receives the time varying magnetic flux of the magnetic field transmitted from the transmitter transducer 114 when the receiver transducer 116 is disposed in the power transfer region 102. The receiver transducer 116 converts the time varying magnetic flux to a second power signal having the transmission frequency of the transmission signal, which frequency is at least 500 Hz.

The receiver transducer 116 is electrically connected with the power processor 118. In addition, the power processor 118 is configured to be electrically connected to the load 110.

The power processor 118 converts the second power signal to a third power signal appropriate for the respective one or more loads 110. More specifically, the power processor 118 converts a voltage level of the second power signal to a pre-determined voltage level of the third power signal appropriate for the load. A transformer (as shown in FIG. 5) may be used to provide the requisite change in voltage level. In addition, the second power signal is converted by the wireless power receiver 108 to the third power signal based on or in response to detection of the magnetic field produced by the transmitter transducer 114.

The wireless power receiver 108 detects the presence of the magnetic field and the power processor 118 may be configured to automatically initiate the conversion of the second power signal to the third power signal. For example, the wireless power receiver may detect the presence of the magnetic field when the receiver transducer 116 produces a detectable amount or a threshold amount of electromotive force.

It may be noted that in FIG. 1, the wireless power transfer system 100 enables power transfer to a single device having a wireless power receiver 108 with the receiver transducer 116; however, those skilled in the art will appreciate that a transmitter assembly 106 may provide power concurrently to a plurality of wireless power receivers 108.

FIG. 2 illustrates a block diagram of another example of a wireless power transfer system 200 for wireless power transferring. The wireless power transfer system 200 enables transferring of electrical power to one or more devices in real time (as explained above in the detailed description of FIG. 1).

The wireless power transfer system 200 may be configured to be capable of powering various flying vehicles simultaneously or serially. In an example, the wireless power transfer system 200 may be configured to provide power to a passenger drone used for delivery and security application. The wireless power transfer system 200 can be configured to be used as a charging system for urban air transportation. The wireless power transfer system 200 can be configured to be used to charge multiple aerial vehicles at the same time. In addition, the wireless power transfer system 200 can be configured to be capable of delivering several hundreds of kilowatts of power to each aerial vehicle. In an example, the wireless power transfer system 200 can be configured to charge a fixed wing drone.

The wireless power transfer system 200 may include a transmitter assembly 202 configured to be connected to a power source 201, and a wireless power receiver 204 configured to be connected to a load 206. The transmitter assembly 202 includes a signal generator 208 and a transmitter transducer assembly 210. The transmitter transducer assembly 210 includes one or more transmitter transducers 212. The wireless power receiver 204 includes a receiver transducer assembly 214 and a power processor 218. The receiver transducer assembly 214 includes one or more receiver transducer 216. Further, in some examples, the transmitter assembly 202 includes a wireless power transmitter 502 (shown in FIG. 5) that includes signal generator 208.

The signal generator 208 is configured to be electrically connected to the transmitter transducer assembly 210. In addition, the transmitter transducer assembly 210 may extend to a position disposed an appropriate distance from the signal generator 208. The appropriate distance may be a pre-determined distance such that the signal generator 208 lies outside the power transfer region 203. The signal generator 208 transmits the transmission signal to the transmitter transducer assembly 210. The transmitter transducer assembly 210 produces an electromagnetic field in the power transfer region 203 by conducting the transmission signal. The electromagnetic field transfers power wirelessly to the wireless power receiver 204 when the wireless power receiver 204 is located in the power transfer region 203.

In this example, the signal generator 208 transmits a transmission signal to the transmitter transducer assembly 210. The transmitter transducer assembly 210 includes the transmitter transducer 212. In an embodiment, the transmitter transducer assembly 210 includes multiple transmitter transducers positioned alongside each other. The transmitter transducer assembly 210 may be an assembly of one or a plurality of transmitter transducers. In an embodiment, a plurality of transmitter transducers may include a plurality of loops of electrical conductors. In another embodiment, the transmitter transducer assembly 210 may include at least one loop of electrical conductor extending back and forth along a sinuous path (explained below with reference to FIG. 16). In yet another embodiment, the transmitter transducer assembly 210 may include a dipole antenna electrically coupled with the signal generator 208 (explained with reference to FIG. 20). The signal generator 208 may be configured to generate a single transmission signal or a plurality of transmission signals. Each transmission signal of the plurality of transmission signals may be applied to a single transmitter transducer or to a group of transmitter transducers. In an example in which a transmitter transducer is a loop of electrical conductor, a transmission signal may be applied to a respective loop of electrical conductor of a plurality of loops of electrical conductors or to a group of electrical conductors in the plurality of loops. Each loop of the plurality of loops of electrical conductors may conduct a respective one of the plurality of transmission signals.

Loops of electrical conductors may be positioned at a pre-determined distance from each other (explained below with reference to FIG. 8). In another embodiment, plural loops of electrical conductor may be formed from a single electrical conductor (described with reference to FIG. 9). In yet another embodiment, a transmitter transducer assembly may include a plurality of conductor segments (explained below with reference to FIG. 10). In yet another embodiment, loops of electrical conductors may be arranged in a plurality of concentric loops (described below with reference to FIG. 14). Each of a plurality of transmitter transducers produces a respective electromagnetic field in a corresponding portion of the power transfer region. A plurality of transmitter transducers collectively provides an extended region of wireless power transfer for charging one or more devices.

In an example, the transmitter transducer assembly 210 may include 10 loops of electrical conductors which form a large area of power transfer and result in increase in wireless power transmission efficiency. Each of the plurality of loops of electrical conductor is electrically connected to the signal generator 208. In an embodiment, each of the plurality of transmitter transducers may be connected to a single signal generator 208. Signal generator 208 may include a plurality of terminals connected to respective transmitter transducers or respective groups of transmitter transducers. The signal generator 208 may transmit the transmission signal to each of the plurality of transmitter transducers simultaneously or selectively. Alternatively, the signal generator 208 may transmit the transmission signal to each of the plurality of loops of electrical conductors serially or in a predefined pattern. The signal generator 208 transmits the transmission signal to each of the plurality of loops of electrical conductors at the same transmission frequency. In an embodiment, the signal generator 208 may transmit the transmission signal to each of the plurality of loops of electrical conductors at a variable transmission frequency.

Further, the loops of a plurality of loops of electrical conductors may be arranged in a planar array. Moreover, phases of the transmission signal conducted by each loop may be shifted to provide an array of phases that reduce overall electromagnetic radiation. In addition, each loop may have a respective first width in the plane of the planar array. Also, each loop may be positioned at a distance from each adjacent loop in the planar array that is within five times the respective first width. Moreover, each loop of the plurality of loops of electrical conductors may be positioned at a distance from each adjacent loop in the planar array in a range of one to four times the respective first width.

In an embodiment, the planar array configuration of the plurality of loops of electrical conductors is configured as a phased array antenna. In another embodiment, the planar array configuration of the plurality of loops of electrical conductors is configured as a line. In yet another embodiment, the planar array configuration of the plurality of loops of electrical conductors is a two dimensional array. In yet another embodiment, a plurality of loops of electrical conductors may be configured in a three dimensional array. The plurality of loops of electrical conductors have respective pre-determined phases that are sufficiently different that at least a portion of the respective electromagnetic fields jointly produce a common electromagnetic field.

In an embodiment, a first loop may conduct the transmission signal with a first pre-determined phase that is 180 degrees from a pre-determined phase of an adjacent second loop.

Each of the plurality of loops of electrical conductor produces a respective electromagnetic field and a respective near reactive field. The near reactive field is in an immediate vicinity of each respective loop of electrical conductor, such as within five wavelengths at the signal frequency. The phase shift design of the loops enables the near reactive fields to exist while cancelling out each other's electromagnetic fields at large distances. The electromagnetic fields dump each other and provide reduction in overall electromagnetic radiation due to appropriate phase shift of the phase of each loop.

Adjacent loops in a planar array may conduct transmission signals that are 180 degrees out of phase. The respective electromagnetic fields cancel out each other in the far field zone. The phase shift design provides a strong near field which can be utilized for wireless energy transmission. In an embodiment, the phased array antenna configuration is equal to a quadrupole which has a significantly low electromagnetic radiation. Further, the number and design of transmitter transducers can be increased in order to reduce further the electromagnetic radiation.

The transmitter assembly 202 may include the signal generator 208 and at least a first loop of flexible planar electrical conductor. In addition, the first loop of flexible planar electrical conductor may be supported on a flexible dielectric substrate. The first loop of flexible planar electrical conductor produces an electromagnetic field in a power transfer region around the loop.

Continuing the description of FIG. 2, the wireless power receiver 204 includes the receiver transducer assembly 214. The receiver transducer assembly 214 is an assembly of one or more receiver transducers 216. The receiver transducer assembly 214 receives power when positioned in the power transfer region 203 formed by the transmitter transducer assembly 210. The receiver transducer assembly 214 is configured to receive a time varying electromagnetic flux in the power transfer region 203 of the electromagnetic field transmitted from the transmitter transducer assembly 210. In addition, the receiver transducer assembly 214 converts the time varying electromagnetic flux to a time-varying first power signal. The first power signal has a transmission frequency of at least 500 Hz.

Each receiver may be associated with a receiver ID. The receiver ID may be a numeric ID, an alphanumeric ID and the like. The receiver ID may be a hardware ID or software ID.

In another embodiment, the receiver transducer assembly 214 may include a dipole antenna electrically coupled with the signal generator 208 (explained with reference to FIG. 19). In an example, the receiver transducer assembly 214 includes the receiver transducer 216. The plurality of receiver transducers may include a plurality of loops of electrical conductors. In an embodiment, each loop of the plurality of loops is in a form of a metal ribbon. The metal ribbon may be a multi-layered laminated ribbon.

The plurality of receiver transducers may be attached to a device having a rechargeable energy storage device. The receiver transducers may be loops of a plurality of loops of electrical arranged in a planar array. In an embodiment, the planar array of loops may be configured as a phased array. In an embodiment, at least one of the transmitter transducer 212 and the receiver transducer 216 includes a dipole antenna having two oppositely extending conductive elements.

Each receiver transducer of the plurality of receiver transducers 216 is configured to conduct a respective first power signal. The first power signal flowing from each of receiver transducers 216 may have respective pre-determined phases that are sufficiently different to cause the loops to have a common electromagnetic field. The power processor 218 receives the plurality of first power signals. The power processor 218 converts the first power signal to a second power signal appropriate for the load 206.

FIG. 3 illustrates a block diagram of a transmitter transducer assembly 302. Transmitter transducer assembly 302 may be an example of a transmitter transducer assembly 210. The block diagram depicts a plurality of examples of possible configurations for the transmitter transducer assembly 302. The transmitter transducer assembly 302 includes at least a first transmitter transducer 304, and may include only one transmitter transducer 304 or a plurality of transmitter transducers including transducer 304. Each transmitter transducer may be configured in one or more configurations. For example, transmitter transducer 304 can be configured as an electrical conductor loop 306, a dipole antenna 308, or an electrical conductor segment 310. Other suitable configurations may also be used as appropriate for a particular application. The electrical conductor loop 306 may be one of a plurality of loops forming transmitter transducer assembly 302. The dipole antenna 308 has two oppositely extending elongate electrically conductive elements, and may be one of a plurality of transmitter transducers. The electrical conductor segment 310 may be a segment of an electrical conductor divided into multiple segments. In an embodiment, transmitter transducers in transmitter transducer assembly 302 may all be of the same type or may be combinations of types of transmitter transducers.

FIG. 4 illustrates a block diagram 400 of a receiver transducer assembly 402. Receiver transducer assembly 402 may be an example of a receiver transducer assembly 214. The block diagram depicts a plurality of possible examples of configurations of receiver transducers making up the receiver transducer assembly 402. The receiver transducer assembly 402 may include only one receiver transducer 404 or a plurality of receiver transducers including receiver transducer 404.

Each receiver transducer can be configured in one or more configurations. For example, the receiver transducer 404 can be configured as an electrical conductor loop 406, a dipole antenna 408, or an electrical conductor segment 410. Other suitable configurations may also be used as appropriate for a particular application. The electrical conductor loop 406 may be one of a plurality of loops forming receiver transducer assembly 402. The dipole antenna 408 may have two oppositely extending elongate electrically conductive elements (explained below with reference to FIG. 19). The electrical conductor segment 410 may be a segment of an electrical conductor divided into multiple segments. In an embodiment, receiver transducers in receiver transducer assembly 402 may all be of the same type or may be combinations of types of receiver transducers.

FIG. 5 illustrates different components of a further example of a wireless power transfer system, shown generally at 500. The wireless power transfer system 500 is an example of the wireless power transfer system 200. The wireless power transfer system 500 includes a transmitter assembly 501 and a wireless power receiver 503. The transmitter assembly 501 includes a wireless power transmitter 502 and a transmitter transducer assembly 505. The transmitter transducer assembly 505 includes one or a plurality of transmitter transducers as described for transmitter transducer assembly 302. In an embodiment, the transmitter transducer assembly 505 includes a transmitter transducer 506.

Each transmitter transducer may be an antenna, such as an electrical transmission conductor configured to produce an electromagnetic field during conduction of the transmission signal along a length of the conductor. Each transmitter transducer may be formed as described with reference to transmitter transducer 304, such as an inductive loop, coil, dipole, or conductor segment.

The wireless power transmitter 502 includes a signal generator 508 and a communication circuit 511. A part or some parts of the wireless power transmitter 502 may lie within a power transfer region 510, or no parts of the wireless power transmitter 502 may lie within the power transfer region 510.

The signal generator 508 is electrically connected to the transmitter transducer assembly 505 and is configured to be connected to the power source 201. The power source 201 supplies the first power signal to the signal generator 508. The signal generator 508 utilizes the first power signal to generate the transmission signal. Accordingly, the signal generator 508 transmits the transmission signal to the transmitter transducer assembly 505. The transmission signal is transmitted at the transmission frequency of at least 500 Hz (as explained above with reference to signal generator 208 shown in FIG. 2).

The signal generator 508 includes a controller 504. The controller 504 is operatively coupled to transmission signal generating circuits in the signal generator 508. The controller 504 controls one or more operations of the transmission signal generating circuits of the signal generator 508 during generation of the transmission signal. The controller 504 acts as an adaptive control unit configured to control one or more parameters of the transmission signal, such as the transmission frequency and/or power level. The controller 504 controls the one or more parameters of each of the plurality of transmission signals generated by the signal generator 508.

In an embodiment, the controller 504 may be electrically connected to a plurality of signal generators transmitting a respective transmission signal to each respective loop of electrical conductor. In another embodiment, each of the plurality of signal generators may include a respective controller for controlling the one or more parameters of the respective transmission signal. In yet another embodiment, each of the plurality of signal generators may be electrically connected to at least two loops of electrical conductors. The controller 504 may control the one or more parameters of the respective transmission signals flowing through the at least two loops of electrical conductors.

The controller 504 may monitor the transmission frequency and the power level of the plurality of transmission signals transmitted by the signal generator 508. In an embodiment, the controller 504 controls and varies the transmission frequency and/or the power level of the plurality of transmission signals.

The wireless power receiver 503 includes a receiver transducer assembly 512, a communication circuit 514, and a power processor 515. The receiver transducer assembly 512 includes one receiver transducer or a plurality of receiver transducers, as described for receiver transducer assembly 402. In an embodiment, the receiver transducer assembly 512 includes a receiver transducer 513.

In an embodiment, each receiver transducer receives power in power transfer region 510 at a power level dependent on the distance of the receiver transducer from the transmitter transducer assembly 505 and the strength of the electromagnetic field. More specifically, the power level produced by the transmitter transducer assembly 505 is inversely proportional to the second power of the distance of the receiver transducer assembly 512 from the transmitter transducer assembly 505. This is in contrast to wireless power transmitters having a small sized transmitter transducer relative to the receiver transducer, in which case the power level of the receiver transducer is inversely proportional to the sixth power of the distance of the receiver transducer from the transmitter transducer.

Further, the controller 504 identifies a presence of one or more power receivers in the power transfer region 510. Accordingly, the controller 504 activates the one or more transmitter transducer. If there are a plurality of transmitter transducers, controller 504 may be configured to selectively activate at least one transmitter transducer in response to detection of the presence of the one or more power receivers. The controller 504 may be configured to identify a transmitter transducer that is near at least one power receiver, and activate that transmitter transducer.

In an embodiment, the controller 504 detects a change in load on the electromagnetic field produced by the transmitter transducer assembly 505. Accordingly, the signal generator 508 generates the alternating current transmission signal in response to detection of the at least one power receiver in the power transfer region 510. Further, the change in load on a transmitter transducer may be detected by scanning each transmitter transducer and determining for each scanned transmitter transducer whether or not there is a load on the associated electromagnetic field. The scanning is done for detecting the presence of the at least one power receiver which is proximate to at least one of a plurality of transmitter transducers. The controller 504 identifies the loop of electrical conductor that is proximate to the at least one power receiver and activates the identified transmitter transducer. The transmitter transducer assembly may be controlled to limit transmission signal flow only through a transmission transducer that is determined to be near a power receiver.

The controller 504 may continuously scan the transmitter transducers to detect the presence of one or more power receiver, such as at discrete or regular intervals of time. The signal generator 508 may generate the transmission signal at a reduced power level when no power receiver is detected in the power transfer region 510.

The controller 504 may detect the presence of the at least one power receiver at a time when the signal generator 508 is producing the transmission signal at the reduced power level. The signal generator 508 increases the power level of the transmission signal to a power level greater than the reduced power level when the at least one power receiver is detected in the power transfer region 510. In an embodiment, the signal generator 508 increases the power level to a power level proportional to a number of power receivers detected in the power transfer region 510.

In an embodiment having a plurality of signal generators, each signal generator may generate a respective transmission signal at a power level proportional a number of power receivers detected in the associated transmitter transducer (s). Further, the wireless power transmitter 502 preferably determines that the at least one power receiver in the power transfer region 510 is authorized to receive power. The at least one power receiver is preferably authorized after the detection of the at least one power receiver and prior to increasing the power level of the associated transmission signal.

As mentioned, the controller 504 generates a control signal for varying the one or more parameters of the plurality of transmission signals. The controller 504 may be electrically coupled with a communication circuit 511, such as a wireless communication unit. The communication circuit 511 may receive receiver information from a communication circuit 514, such as a wireless communication unit, included in the wireless power receiver 503. The controller 504 may in turn receive receiver information from the communication circuit 511, and in response to the received receiver information, generate a control signal to adjust the one or more parameters of the transmission signal, such as the frequency or the voltage level.

In an embodiment, the communication circuit 511 may be coupled with a respective controller of each respective signal generator of a plurality of signal generators generating a respective transmission signal. The controller 504 receives the receiver information of the at least one power receiver which are detected in the power transfer region 510. In an embodiment, the communication circuit 514 transmits the receiver ID associated with the wireless power receiver 503 to the communication circuit 511 through a data communication channel. The receiver information is received by a wireless communication unit (the communication circuit 511) through the data communication channel. The data communication channel is established between the at least one power receiver when the receiver information is transmitted and received.

The wireless power transmitter 502 verifies the receiver information associated with the at least one power receiver. The wireless communication unit verifies the receiver information. Accordingly, the signal generator 508 generates the alternating current transmission signal with a power level sufficient for charging a battery of the at least one power receiver in response to verification of the receiver information. The receiver information includes indicia identifying the at least one power receiver. In addition, the verification of the receiver information includes comparison of the identifying indicia to a list of identifying indicia for power receivers authorized to receive power in the power transfer region 510. For example, the wireless communication unit may be connected to the Internet for accessing information on authorized power receivers. In an example, the wireless communication unit checks for a valid subscription plan with a corresponding wireless power network operator. The wireless communication unit may utilize the receiver ID to check for the subscription information and if the power receiver has enough balance or a post payment plan, the wireless communication unit will allow charging the battery of the power receiver. The wireless communication unit may send a signal to the controller 504 to initiate charging the battery of the at least one power receiver.

Further, the wireless communication unit determines a period of time during which power was transferred to the at least one power receiver. Furthermore, the wireless communication unit calculates an amount of power transferred to the authorized power receiver of the one or more power receivers. In an embodiment, the wireless communication unit communicates the information to a billing system for billing each owner of a power receiver that received power. The billing system may be an internal billing system of the owner of the wireless power transmitter or a third party billing system. The user may be charged as per a corresponding subscription plan. In an embodiment, the authorization for the number of power receivers is performed concurrently. In another embodiment, the authorization for the number of power receivers is performed serially.

The power processor 515 may be configured to communicate the receiver information to the communication circuit 514 regarding power demand and/or frequency of power suitable for efficiently receiving power on the receiver transducer 513. In an embodiment, the receiver information may include information related to an amount of charge present in or power level required by the load 519 connected to the wireless power receiver 503, and/or a frequency to which the power processor 515 is tuned for receiving power with the receiver transducer 513. The power processor 515 may communicate the receiver information for the power receiver 503. The receiver information provided by the power processor 515 is communicated by receiver communication circuit 514 to transmitter communication circuit 511. The controller 504 may utilize such receiver information to control the amount of power to be transmitted to the wireless power receiver 503 or the frequency of the transmission signal.

In some embodiments, the transmitter communication circuit 511 transmits transmitter information to the receiver communication circuit 514 of the wireless power receiver 503. In an embodiment, the transmitter information may include an amount of power available for transferring to the wireless power receiver 503, or the frequency of the transmission signal. Accordingly, the power processor 515 may be configured to control an operation of the power processor 515 in response to the received transmitter information. For example, in response to the transmitter information obtained via communication circuit 514, the power processor 515 may adjust one or more parameters of the receiver, such as frequency, inductance, or other parameter. The transmitter information is received through the data communication channel.

In an embodiment, communication between the transmitter communication circuit 511 and the receiver communication circuit 514 may be by a communication technology appropriate for the distance between the communication circuit 511 and a range of possible positions of the receiver communication circuit 514 in the power transfer region 510. Examples of potentially useful communication technologies include Bluetooth, Zigbee, wireless local area network (WLAN), Wi-Fi, or any other suitable communication technology for exchanging information over the required distance.

In an embodiment, the controller 504 may include a microcontroller or Application Specific Integrated Circuit for processing receiver information received from the at least one wireless power receiver 503. In an embodiment, the power processor 515 may include a microcontroller for processing transmission information received from the wireless power transmitter 502.

The transmitter assembly 501 may be configured to include a resonant circuit 507. The resonant circuit 507 may include a combination of a reactance 509 and the transmitter transducer assembly 505. In an embodiment, the resonant circuit 507 is a combination of a plurality of reactance and the transmitter transducer assembly 505. Each respective reactance may be coupled to a respective transmitter transducer of the plurality of transmitter transducers. The reactance 509 includes one or more of capacitors and may include one or more inductors. In this example, the reactance 509 is a part of the signal generator 508 and the transmitter transducer assembly 505 is a part of the transmitter assembly 501. The resonant circuit 507 has a resonant frequency that is the transmission frequency of the transmission signal. The reactance 509 may be adjustable to vary the resonant frequency. For example, the capacitance of a capacitor or the inductance of an inductor of the reactance 509 may be adjustable to vary the resonant frequency.

In some embodiments, the wireless power receiver 503 also includes a resonant circuit 516. The resonant circuit 516 includes a reactance 517 in the power processor 515 and the receiver transducer 513. The resonant circuit 516 may include a combination of a reactance 517 and the receiver transducer assembly 512. In an embodiment, the resonant circuit 516 is a combination of a plural reactances and transmitter transducers 513 of the receiver transducer assembly 512. Each respective reactance may be coupled to a respective receiver transducer. The reactance 517 may include a variable capacitor and/or a variable inductor. The reactance of the resonant circuit 516 may be adjusted, such as by adjusting an inductance tuning circuit or a variable capacitor of the resonant circuit 516. The reactance of the resonant circuit 516 may be controlled to vary the resonant frequency of resonant circuit 516 to match the transmission frequency based on transmission information received from communication circuit 511. The transmitter assembly 501 and the wireless power receiver 503 are preferably resonantly coupled with each other. The transmitter assembly 501 and the wireless power receiver 503 have a high quality factor Q between each other. The high quality factor Q enables higher transmission efficiency. In addition, the transmission efficiency depends on a product of a coupling coefficient k and the quality factor Q of the resonant circuit, k*Q.

In some embodiments, the power processor 515 includes a supercapacitor 518. The supercapacitor 518 can store electric charge rapidly as it is received from the electromagnetic field in the power transfer region 510. A charge stored on the supercapacitor 518 can then be used to power the load 519 of a device connected to the wireless power receiver 503 and/or to charge a battery 521 of the load 519. Such charging or operating can occur after the wireless power receiver 503 leaves the power transfer region 510. In an example, the supercapacitor 518 can be part of a wireless power receiver 503 attached to a drone (mentioned below with reference to FIG. 18). The supercapacitor 518 can store electric energy received by the receiver transducer 513 of the wireless power receiver 503 when the drone flies through the power transfer region 510. The supercapacitor 518 can then gradually charge the battery 521 of the drone, such as when the drone is traveling out of the power transfer region 510.

In yet another example, each of the plurality of transmitter transducers can be in form of a system of wires which can be supported in the air at some distance above the ground or on elevated structures to serve as an energy channel for operating devices, such as drones or other aerial vehicles. The transmitter conductor can be several kilometers long, forming a power line for the drones. The drones can fly along the power line and be charged without having to land on the ground or other surface. The energy channel can be used for powering drones used for heavy cargo lifting, such as lifting as much as 10-20 Kg. The system of wires may produce a tube-like power transfer region 510 surrounding and extending along the long conductor wire. With appropriate power applied to the transmission signal, the wireless power receivers 503 may be able to receive power at a distance of 10-20 meters from the transmitter conductor. Drones may be able to operate or move within this extended power transfer region 510 for an indefinite period of time. The transmitter assembly 501 can provide a wireless high power energy source capable of delivering several kilowatts per drone.

In some embodiments, the power processor 515 includes a transformer 520. The transformer 520 is electrically connected between the receiver transducer assembly 512 and the load 519. The transformer 520 may convert a voltage level of the second power signal to a pre-determined voltage level of the third power signal applied to the load 519. Other circuits or circuit components may also be used to convert the voltage level of the second power signal to the pre-determined voltage level of the third power signal.

In an embodiment, the wireless power receiver 503 is electrically connected directly to the load 519. The wireless power receiver 503 can be directly connected to the load 519 with or without a voltage transformer or a current transformer. In an embodiment, the wireless power receiver 503 routes excessive power received from the transmitter assembly 501 to the battery 521. The power stored in the battery 521 can be applied directly to the load 519 when the power level received from the transmitter assembly 501 is low. The battery 521 can thus be used as a power buffer.

FIG. 6 shows an example of a wireless power transfer system 600 including a wireless power transmitter 602 for powering a drone 604 flying in a power transfer region 606. The wireless power transmitter 602 receives the first power signal from a power source 608. The wireless power transmitter 602 is electrically connected to the power source 608 and a transmitter transducer 610. The transmitter transducer 610 is in the form of an inductive loop. The position and size of the inductive loop defines the power transfer region 606. The transmitter transducer 610 may be a selectively activated loop based on detection and authorization of a wireless power receiver 614. The wireless power transmitter 602 generates and transmits a transmission signal to the transmitter transducer 610. The transmitter transducer 610 produces a varying magnetic field, represented by magnetic-field lines 612, of the power transfer region 606. The magnetic field is used to power the drone 604 when the drone 604 is disposed in the power transfer region 606. The drone 604 includes the wireless power receiver 614. The power receiver 614 includes a receiver transducer 616 in the form of a conductive coil. The magnetic field lines 612 pass through the conductive coil. The varying magnetic field induces a voltage across terminals of the conductive coil that corresponds to the second power signal. Accordingly, the second power signal in the coil is converted to a third power signal and supplied to a battery of the drone 604 or directly to motors and other power consuming elements of the drone 604.

FIG. 7 shows a cross-section view of a transmitter conductor 700 with a magnetic field 702 around the conductor and a wireless power receiver 704 receiving power from the magnetic field 702. The transmitter conductor 700 is an example of a transmitter transducer 114, 212, 304, 506, or 610. The wireless power receiver 704 is an example of a wireless power receiver 108, 204, 503 or 614. The cross-section view shows a power transfer region 705 inside which the wireless power transfer takes place. The transmitter conductor 700 may be an electrical conductor electrically connected to a wireless power transmitter, such as the wireless power transmitter 502 or 602, or to a signal generator 112 or 208. The transmitter conductor 700 receives a transmission signal from the signal generator of the power transmitter and produces the varying magnetic field 702 around the transmitter conductor 700.

The receiver 704 is a wireless power receiver electrically connected to a load or battery of a device which consumes electrical power. In an example, the receiver 704 is connected to a battery of a smart phone. The receiver 704 includes a receiver coil 706. When the receiver 704 is disposed in the power transfer region 705, the magnetic field lines pass through the receiver coil 706, inducing a voltage across terminals of the receiver coil 706. The voltage corresponds to the second power signal. Accordingly, the second power signal in the coil is converted to the third power signal and supplied to a battery or other load of the device containing the receiver 704.

FIG. 8 is an illustration of an example of a multi loop configuration for a transmitter assembly, shown generally at 800. Transmitter assembly 800 includes a transmitter transducer assembly 801 and a wireless power transmitter 804. Transmitter transducer assembly 801 includes a plurality of transmitter transducers 806. The plurality of transmitter transducers 806 includes loops of electrical conductor 806a-806i. The plurality of loops 806a-806i are electrically coupled with wireless power transmitter 804. The wireless power transmitter 804 includes a signal generator assembly 808. The signal generator assembly 808 includes one signal generator 810 or a plurality of signal generators including signal generator 810.

The signal generator 810 includes a controller 812 and a load identifier 814. The load identifier 814 is electrically coupled with a communication unit 816 similar to communication circuit 511. The signal generator assembly 808 is configured to receive a first power signal from a power source 802. Each of the plurality of loops 806a-806i is a separate loop of electrical conductor. The loops 806a-806i are positioned in a planar array configuration. The directions of the transmission signals in each pair of adjacent loops is different. They are preferably 180 degrees out of phase. In an embodiment, each loop 806a-806i is electrically connected to a respective signal generator in the signal generator assembly 808 or to different transmission signals from signal generator 810. In another embodiment, the loops conducting a first transmission signal are connected to a first signal generator. The loops conducting a second transmission signal 180 degrees out of phase from the first transmission signal are connected to a second signal generator.

The controller 812 detects the presence of one power receiver or more than one power receiver in the power transfer region of one or more of loops 806a-806i. The load identifier 814 identifies the detected power receiver(s) based on the receiver information received through the communication unit 816. Accordingly, the signal generator 810 may activate at least one loop of the plurality of loops 806a-806i by increasing the power level of the transmission signal in the loop from a reduced, stand-by power level. In an example, the signal generator 810 initially activates the loop 806a in response to a receiver being positioned above that loop. As the receiver moves across the array of loops, loops 806e and 806h may then sequentially be activated. After the receiver moves away from an activated loop, controller 812 may deactivate the loop by reducing the power level of the transmission signal in the loop to the stand-by power level.

FIG. 9 is an illustration of another example of a multi loop configuration for a transmitter assembly, shown generally at 900. Transmitter assembly 900 includes a transmitter transducer assembly 901 and a wireless power transmitter 904. The transmitter transducer assembly 901 includes a master electrical conductor loop 905. A plurality of transmitter transducers 906 in the form of transmitter loops of electrical conductor 906a-906l distributed about master loop 905. Transmitter loops 906a-906l are connected to the master loop so as to form a continuous current path from signal generator 912 in wireless power transmitter 904 along master loop 905 and through each transmitter loop 906a-906l. The wireless power transmitter 904 includes a signal generator assembly 910. The signal generator assembly 910 includes one or more signal generators, including signal generator 912.

The transmission loops 906a-906l are positioned at spaced locations along the master loop 905. The master loop extends around a master axis (not shown) extending vertically in the view of FIG. 9, and each of the plurality of loops of electrical conductor 906a-906l faces the master axis inside of master loop 905. The master axis is an imaginary axis passing vertically through a center of the master loop 905 and normal to a plane of the master conductor 905 in the example shown. Master loop 905 may not be planar but does form a loop around a center area. In addition, the plurality of transmission loops 906a-906l are also disposed in vertical planes that are preferably parallel to the master axis and normal to master loop 905.

The signal generator 912 includes a controller 914 and a load identifier 916. The load identifier 916 is electrically coupled with a communication unit 918. The signal generator assembly 910 is configured to receive a first power signal from a power source 902.

Further, the transmitter transducer assembly 901 includes a plurality of phase shift circuits 908a-908l. Each loop of electrical conductor is connected with a respective phase shift circuit. Each of the plurality of phase shift circuit changes the phase of the transmission signal conducted by each respective loop of the transmission loops 906a-906l. Each respective phase shift circuit is connected on a respective input line of the respective loop of electrical conductor. In an embodiment, each phase shift circuit 908a-908l may be in the form of an analog delay line circuit that delays the transmission signal conducted by each respective transmission loop 906a-906l.

The controller 914 detects the presence of one or more receiver in a power transfer region within the band of transmission loops. The load identifier 916 identifies the detected power receiver(s) based on receiver information received through the communication unit 918. Accordingly, the signal generator 912 may activate the plurality of transmission loops 906a-906l.

In another embodiment, signal generator assembly 910 may be configured to connect selectively with individual transmission loops 906a-906l, as described above for transmitter transducer assembly 800. In yet another embodiment, signal generator assembly 910 may be configured to connect selectively with pairs of opposing transmission loops, with the transmission loops in each pair of opposing transmission loops being positioned on opposite sides of master loop 905. The transmission loops in each pair of opposing transmission loops also preferably face each other, and also are preferably parallel to each other and aligned. For example, transmission loop 906d is opposite from, facing, and parallel to transmission loop 906j.

In yet another embodiment, one or more loops may not be connected to a signal generator and may form an isolated continuous loop of electrical conductor. For example, one of the transmission loops of a pair of opposing transmission loops may not be connect to a signal generator. As a further example, alternate loops of transmission loops 906a-906l may be unconnected loops. The one or more unconnected loops act as a mirror to electromagnetic radiation produced by one or more active loops that are conducting the transmission signal. The respective electromagnetic field produced by each active transmission loop induces a current in the one or more unconnected loops of electrical conductors that are in the electromagnetic field of the active loop. The current induced in the one or more unconnected loops decreases overall external electromagnetic radiation produced by the transmission transducer assembly.

FIG. 10 is an illustration of an example of a transmitter assembly 1000 that includes a transmitter transducer assembly 1001 and a wireless power transmitter 1004. Transmitter transducer assembly 1001 in this example has a segmented conductor design formed by a master loop 1005 of electrical conductor. The transmitter transducer assembly 1001 includes a transmitter transducers 1006 that are segments of master loop 1005. The transmitter transducers 1006 includes individual, electrically spaced-apart conductor segments 1006a-1006k.

The transmitter transducer assembly 1001 includes a plurality of phase shift circuits 1008. The transmission segments 1006 are separated by a corresponding respective phase shift circuit 1008 that changes the phase of the transmission signal conducted by the following transmission segment. The plurality of phase shift circuits are connected along master loop 1005 in series and alternating with respective transmission segments 1006.

Phase shift circuits 1008 may be any suitable circuit for changing the phase of the transmission signal. In this example, the phase shift circuits 1008 includes delay lines 1008a-1008k. Each delay line of the plurality of delay lines 1008a-1008k is electrically connected to a corresponding transmission segment 1006. In an embodiment, at least one of the phase-shift circuits includes an insulated segment of the master loop 1005.

Each of the plurality of phase shift circuits is configured to change the phase of the transmission signal conducted by the following transmission conductor segment. For example, delay line 1008a changes the phase of the transmission signal in transmission segment 1006a. Delay line 1008b then further changes the phase of the transmission signal in transmission segment 1006b. The phase shifts are selected so that the transmission segments form a phased array of transmission transducers that produce jointly a common electromagnetic field. In an embodiment, each of the plurality of phase shift circuits may be positioned at an equal distance along the length of the electrical conductor from each other.

Master loop 1005 is electrically connected to wireless power transmitter 1004. The wireless power transmitter 1004 includes a signal generator 1010. The signal generator 1010 generates the transmission signal by receiving a first power signal from a power source 1002.

FIGS. 11-13 illustrate yet another example of a multi-loop configuration for a transmitter transducer assembly. FIG. 11 shows a transmitter assembly, shown generally at 1100. Transmitter assembly 1100 includes a transmitter transducer assembly 1101 and a wireless power transmitter 1104 connected to wireless power transmitter 1104. The wireless power transmitter 1104 includes a signal generator 1110. The signal generator 1110 generates the transmission signal by receiving a first power signal from a power source 1102.

The transmitter transducer assembly 1101 is configured as a three dimensional array of configurable transmission transducers. The three dimensional array configuration includes a framework 1103 configurable selectively to form transmission transducers as loops of electrical conductor 1106a-1106g. In this example and as illustrated in FIG. 11, framework 1103 includes an upper closed conductor loop 1105, a lower closed conductor loop 1107, and a series of spaced-apart conductive vertical ribs 1109 extending from upper loop 1105 to lower loop 1107, and extending in a band around the space within upper and lower loops 1105, 1107. Loops 1106a-1106g are each formed selectively by a frame including a pair of ribs and the intervening sections of upper and lower loops 1105, 1107. Ribs 1109 include ribs 1109a-1109g.

When each frame in framework 1103 is selectively configurable as a loop 1106. Each frame forms a single loop 1106. Each frame provides an individual charging zone. Each of the plurality of loops of electrical conductor 1106a-1106g are distributed in a band around and oriented parallel to a common axis. The common axis is an imaginary axis passing through a center of framework 1103 and parallel to each of the loops 1106a-1106g. In addition, each loop 1106a-1106g faces into the space surrounded by framework 1103 and the common axis.

It is seen that each pair of adjacent loops 1106a-1106g shares a rib 1109. For example, loop 1106a is formed from ribs 1109a and 1109b. Loop 1106b is formed from ribs 1109b and 1109c. Loops 1106a and 1106b thus share a common rib 1109b.

Further, the transmitter transducer assembly 1101 includes a plurality of switching circuits 1108a-1108g. In an embodiment, each of the plurality of switching circuits 1108a-1108g is a double pole double throw switch circuit or other suitable switching circuit. Each of switching circuits 1108a-1108g is coupled to at least a respective rib of ribs 1109a-1109g. The switching circuits 1108 are operable to selectively connect each loop to signal generator 1110 and disconnect each loop from the signal generator 1110.

FIG. 12 is an illustration of an example of switching of framework 1103 to form loop 1106a. In this example lower loop 1107 is formed from two conductor assemblies 1111 and 1112. Each conductor assembly includes a conductor segment extending between adjacent ribs. For example, conductor segments 1111a and 1112a extend between ribs 1109a and 1109b, conductor segments 1111b and 1112b extend between ribs 1109b and 1109c (not shown), conductor segments 1111g and 1112g extend between ribs 1109g (not shown) and 1109a.

The switching circuits 1108 provide selective switching between conductor segments 1111 and 1112. Each switch circuit 1108 includes four poles, S1-S4. A first switch connector SA is controllable to connect pole S1 selectively to pole S2, pole S4, or to no pole, and a second switch connector SB is controllable to connect pole S3 selectively to either pole S2 or pole S4. In the example shown, switching circuit 1108a has pole S1 isolated from the other poles and pole S3 connected to pole S4. Switching circuit 1108b is switched to connect pole S1 to pole S4 and pole S2 to pole S3. This combination of switch settings connects loop 1106a to a transmission signal on conductor assembly 1112, making loop 1106a an active transmitter transducer.

It is seen that alternate loops can be made active transmitter transducers by appropriate switching. Also, a loop can be made a passive continuous loop without connection to the transmission signal, such as by connecting pole S1 to pole S2 and connecting pole S3 to S4 of switching circuit 1108b. Also, loop 1106a can be bypassed by also disconnecting pole S1 from pole S2 of switching circuit 1108b.

In an embodiment, the signal generator 1110 is configured to activate selectively each loop or a combination of loops in the plurality of configurable loops 1106. In another embodiment, the signal generator 1110 is configured to isolate loops adjacent to an activated loop from the transmission signal, as described. In addition, the plurality of loops includes a plurality of pairs of opposing loops disposed facing each other and located on opposite sides of the band of loops. These opposing loops may both be activated or one may be activated and the other made to be a passive, non-activated loop. When a loop is not connected to a signal generator, it acts as a mirror to electromagnetic radiation produced by the active loops. The respective electromagnetic field produced by each active conductor loop induces a current in the passive loop when it is in the electromagnetic field of the active loop. The current induced in the one or more loops of conductor helps to form an extended common electromagnetic field as well as to decrease electromagnetic radiation in the far zone.

Further, the signal generator 1110 may be configured to activate concurrently the loops in at least one pair of opposing loops based on detection of one or more power receivers in the power transfer region as described previously. The signal generator 1110 may be configured to turn on a specific combination of loops based on detection of one or more power receiver. In an embodiment, the signal generator 1110 is configured to activate the loops in each pair of opposing loops with transmission signals that are 180 degrees out of phase with the respective electromagnetic fields of the two loops. The two loops jointly produce a common electromagnetic field, as shown in FIG. 13. In another embodiment, the signal generator 1110 is configured to activate one of the loops in at least one pair of opposing loops and concurrently electrically isolate the other loop from the transmission signal in the at least one pair of opposing loops. In an example, the signal generator 1110 may activate the opposing loops 1106a and 1106e. In another example, the signal generator 1110 may activate the opposing loop 1106a and isolate the loop 1106e.

The signal generator 1110 includes a controller. The controller is operatively coupled to the switching circuit and configured to generate a control signal for selectively switching each of the plurality of switching circuits 1108a-1108g. The electromagnetic field produced by loops 1106 provides efficient energy transfer with a receiver loop that is also vertically oriented.

FIG. 13 illustrates a top angled view of an example of transmitter transducer assembly 1101 conducting a transmission signal producing a magnetic field 1113, shown partially for simplicity of illustration. The signal generator 1110 may selectively activate loop 1106a and opposing loop 1106e. For example, these loops may be activated based on detection of at least one power receiver between these loops. The transmission signal flowing through loop 1106a and 1106e produces respective common electromagnetic field including magnetic field 1113 extending across the space between the loops and shared by the two loops. The respective electromagnetic fields collectively create an extended region of power transfer. This extended field makes more of the respective fields available for power transfer.

FIG. 14 is an illustration of yet another example of a transmitter assembly 1400 including a transmitter transducer assembly 1401 and a wireless power transmitter 1404. The transmitter transducer assembly 1401 is electrically connected to wireless power transmitter 1404. The wireless power transmitter 1404 includes a signal generator 1408. The signal generator 1408 generates the transmission signal by receiving a first power signal from a power source 1402.

In this embodiment, transmitter transducer assembly 1401 includes a plurality of transmitter transducers 1403 in the form of loops 1406 of electrical conductor. In this example, Loops 1406 include concentric loops 1406a-1406d.

In an example, the plurality of concentric loops 1406a-1406d are formed from a single electrical conductor, as shown. In the embodiment shown in solid lines, the concentric loops are connected so that the loops conduct the transmission signal in the same direction around the concentric loops, forming thereby a combined common electromagnetic field. In another embodiment, the plurality of concentric loops 1406a-1406d are connected as represented by the dashed lines so that adjacent concentric loops conduct the transmission signal in opposite directions around the concentric loops. This results in localized electromagnetic fields around each conductor and may be suitable for installations covering an extended area.

As has been described for other transmitter transducer assemblies, concentric loops 1406 may be configured in a phased array. In such a case, the transmission signal flowing through each of loops 1406a-1406d has a respective predetermined phase. In addition, using phase shift circuits as has been described, the phases may be shifted to be sufficiently different that at least a portion of the respective electromagnetic fields of adjacent loops produce jointly a common electromagnetic field.

In an embodiment, the signal generator 1408 produces a plurality of transmission signals. A transmission signal is generated for each respective concentric loop of electrical conductor. In an embodiment, at least one of the transmission signals is connected to at least two of the loops.

FIG. 15 is an illustration of an example of a transmitter assembly 1500 including a transmitter transducer assembly 1501 and a wireless power transmitter 1504. Transmitter transducer assembly 1501 includes a planar array 1503 of loops 1506a and 1506b of electrical conductor. Loop 1506a has a loop width WA and loop 1506b has a loop width WB. Loops 1506a and 1506b are preferably separated by a distance D1 that is less than five times width WA or WB. In some examples, distance D1 is between one and four times width WA or WB.

The loops are each electrically connected to wireless power transmitter 1504. The wireless power transmitter 1504 includes a signal generator 1508. The signal generator 1508 generates the transmission signal by receiving a first power signal from a power source 1502. The signal generator 1508 generates a first transmission signal for the first loop 1506a and a second transmission signal for the second loop 1506b.

The first transmission signal flowing in the first loop 1506a has a phase opposite a phase of the second transmission signal flowing through the second loop 1506b. Current thus flows through the two loops in opposite directions, creating a common electromagnetic field 1505 between them. Field 1505 is more contained than if the two loops had conflicting electromagnetic fields.

FIG. 16 is an illustration a plan view of yet another example of a multi-loop configuration of a transmitter transducer assembly, shown generally at 1600. FIG. 17 shows an end view of transmitter transducer assembly 1600 along with a proximate receiver 1706. The transmitter transducer assembly 1600 includes at least a first loop of electrical conductor 1602. The first loop extends back and forth along a sinuous path 1604. In an embodiment, the first loop 1602 is configured as a serpentine shaped loop. The first loop 1602 includes plural parallel segments 1606, such as segments 1606a-1606c that are equally spaced apart.

Further, the transmitter transducer assembly 1600 preferably includes a second loop of electrical conductor 1607, shown in dashed lines. The second loop 1607 is spaced apart from the first loop 1602. The second loop 1607 extends back and forth along a sinuous path 1608 following at least a portion of the sinuous path of the first loop. The first loop 1602 and the second loop 1607 are disposed in spaced-apart parallel planes 1610 and 1612 that are parallel to the plane of view of FIG. 16, as shown in FIG. 17. The second loop 1607 is offset laterally a distance D2 from the first loop 1602 when viewed normal to the planes of the loops, as shown in FIG. 16.

In an embodiment, the offset D2 is half of the spacing between parallel segments 1606 as viewed normal to the planes of the loops. It will be understood that loops 1602 and 1607 are each electrically connected to a signal generator, not shown but as has been described for other transmitter assemblies. The signal generator is configured to select the first loop of electrical conductor 1602 or the second loop of electrical conductor 1607 for activation. The selection is done in response to a determination of the location of a receiver proximate to the first loop of electrical conductor 1602*a* and the second loop of electrical conductor 1602*b*. The signal generator is configured to activate selectively the first loop of electrical conductor 1602*a* or the second loop of electrical conductor 1602*b*.

FIG. 17 is an illustration of a side view of transmitter transducer assembly 1600 of FIG. 16 and showing cross sections of parallel segments. FIG. 17 shows portions of loops 1602*a* and 1602*b*, in particular, parallel segments including segments 1606*a*-1606*c*. The side view in FIG. 17 shows the direction of current in the respective parallel segments. FIG. 17 includes a receiver 1706 not shown in FIG. 16. The receiver 1706 is located proximate to and spaced above the first loop 1602 and the second loop 1607.

FIG. 18 is an illustration showing different components of wireless power transfer system 1800 for an application of wireless power transfer to an aerial vehicle 1802 in the form of a drone. The aerial vehicle 1802 has an electrical energy storage device in the form of a battery 1804 for powering one or more propulsion mechanisms 1806 enabling aerial operation. The aerial vehicle 1802 includes a body 1808 having an exterior 1810, fixed wings 1812, 1814, and a fuselage 1816. Propulsion mechanism 1806 is mounted to body 1808. The propulsion mechanism receives propulsion energy from battery 1804 and enables the aerial vehicle 1802 for aerial operation by producing a thrust. The aerial vehicle 1802 is designed for vertical take-offs and landings. Battery 1804 is operatively coupled to the propulsion mechanism 1806.

In an embodiment, the orientation of the receiver loop is parallel to the transmitting loop.

Further, the aerial vehicle 1800 includes a wireless receiver 1818 that includes a receiver transducer 1820 coupled to a power processor 1822. The receiver transducer 1820 is positioned or installed along a perimeter of the wings 1812, 1814, or fuselage 1816 of the body 1808 of the aerial vehicle 1802. The receiver transducer 1820 receives a time varying electromagnetic flux in a power transfer region 1824 of an electromagnetic field transmitted from a transmitter transducer assembly 1826 when the receiver transducer 1820 is disposed in the power transfer region 1824. Transmitter transducer assembly 1826 receives a transmission signal from a wireless power transmitter 1828. The vertical orientation of the transmitter transducers in transmitter transducer assemblies 901 of FIG. 9 and 1101 of FIG. 11 would be suitable for transferring power to receiver transducer 1820 when the wings are oriented vertically. Depending on the construction of the aerial vehicle and the placement of the receiver transducer on the aerial vehicle, vertical orientation might occur when either aerial vehicle 1802 has landed or is hovering.

The receiver transducer 1820 converts the time varying electromagnetic flux of the electromagnetic field to a time-varying first power signal. The first power signal has a transmission frequency of at least 500 Hz. The transmitter transducer includes at least a first loop of electrical conductor mounted along the exterior of the body of the aerial vehicle 1802. In an embodiment, the at least first loop of electrical conductor is mounted along the exterior of the fuselage. Accordingly, power processor 1822 converts the first power signal to a second power signal appropriate for charging the electrical energy storage device, battery 1804, of the aerial vehicle 1802.

In an embodiment, the transmitter transducer assembly 901, 1101 includes a first loop 906, 1106 of a first electrical conductor and the receiver transducer assembly includes a second loop 1820 of a second electrical conductor. The first loop 906, 1106 of the first electrical conductor is supported in a vertical orientation while producing the first electromagnetic field. The second loop 1820 of the second electrical conductor is supported in a vertical orientation while receiving the time-varying electromagnetic flux of the first electromagnetic field.

FIG. 19 illustrates a plan view of an example of a wireless power transfer system 1900 including a transmitter transducer 1902 for powering wireless power receiver 1906 having a receiver transducer in the form of a dipole antenna 1907. The transmitter transducer 1902 is a loop of electrical conductor that is electrically connected to a signal generator 1904. The transmitter transducer 1902 conducts a transmission signal generated by the signal generator 1904, producing an electromagnetic field including an electric field 1912. Dipole antenna 1907 receives power wirelessly from the transmitter transducer 1902. The wireless power transfer system 1900 enables asymmetric coupling between the transmitter transducer 1902 and the dipole antenna 1907.

The dipole antenna 1907 utilizes the energy provided by the electric field 1912 produced by the transmitter transducer 1902. The dipole antenna has two oppositely extending conductive elements 1908-1910. The dipole antenna receives a time varying electromagnetic flux in a power transfer region of the electromagnetic field transmitted from the transmitter transducer 1902 when the dipole antenna is disposed in the power transfer region. Accordingly, the dipole antenna converts the time varying electromagnetic flux to a time-varying first power signal having a transmission frequency of at least 500 Hz. The dipole antenna is electrically connected to a power processor included in wireless power receiver 1906 as described previously for power receivers. The power processor converts the first power signal to a second power signal appropriate for the electrical load.

The dipole antenna may include an electrically conductive expanse 1914, 1916 attached to a distal end of each of the two oppositely extending conductive elements 1908, 1910. Each electrically conductive expanse has a respective outer surface 1914*a*, 1916*a*. The outer surfaces extend transversely from the distal ends of respective conductive elements 1908, 1910. Each of the electrical expanses 1914, 1916 may be a plate extending normal to the respective conductive element. In an embodiment, the outer surface of each electrical expanse is a curved surface, such as a spherical surface. In an embodiment, each conductive element 1908, 1910 is less than one-half meter in length.

The electric field produced by the transmitter transducer 1902 acts on the dipole antenna. The electric field produced by the transmitter transducer 1902 charges the two conductive expanses 1914, 1916 alternately. The electric field induces a voltage across the two oppositely extending conductive elements 1908-1910, utilizing the electric field density of the electric field produced by the transmitter transducer 1902. The dipole antenna transfers power from electric field 1912 efficiently and power level at the point of reception. In addition, the dipole antenna configuration may have an extended range of power transfer compared to a loop receiver transducer.

FIG. 20 illustrates a cross-section view of an example of a wireless power transfer system 2000 including a transmitter assembly 2001 and a wireless power receiver 2006. Transmitter assembly 2001 includes a signal generator 2002 connected to a transmitter transducer assembly in the form of a dipole antenna 2004 for powering wireless power receiver 2006. The wireless power receiver 2006 includes a receiver transducer 2008 in the form of a loop of electrical conductor. The dipole antenna 2004 conducts a transmission signal generated by the signal generator 2002 that generates an electromagnetic field 2010 represented by arcs. The wireless power transfer system 2000 enables asymmetric coupling between the dipole antenna 2004 and the wireless power receiver 2006.

The dipole antenna 2004 has two oppositely extending conductive elements 2012, 2014. The dipole antenna 2004 may include an electrically conductive expanse (not shown) attached to a distal end of each of the two oppositely extending conductive elements as was described for conductive expanses 1914, 1916. Each electrically conductive expanse has an outer surface that extends transverse to the distal end of the respective conductive element. Each of the electrical expanses may be a plate extending in a plane normal to the respective conductive element, or a curved surface, such as a sphere. In an embodiment, each conductive element of the two oppositely extending conductive elements is more than one-half meter in length.

The electromagnetic field produced by the dipole antenna 2004 acts on the receiver transducer 2008 of wireless power receiver 2006. In addition, the electromagnetic field produced by the dipole antenna 2004 induces a voltage across terminal of the wireless power receiver 2006.

FIG. 21 illustrates an application of a wireless power transfer system 2100 for powering one or more power receivers 2108. The wireless power transfer system 2100 includes a transmitter assembly 2101 having a signal generator 2106 connected to a transmitter transducer 2104. Signal generator 2106 includes a power cord 2103 that is connectable to a suitable power source for powering the signal generator. In an embodiment, the transmitter transducer 2104 is a loop of flexible conductor that is mounted on a flexible substrate 2102. The transmitter transducer 2104 may be made in form of a flat flexible thin conductive layer.

The wireless power transfer system 2100 is configured to charge a load of one or more devices having a receiver 2108 with a receiver transducer 2110 in a power transfer region produced by transmitter transducer 2104. For example, the transmitter assembly 2101, including substrate 2101 may be placed on a table, mounted on a hidden surface of a table, or on another convenient structure.

FIG. 22 illustrates an example of a method 2200 for the wireless transfer of power to a battery-powered aerial vehicle such as a drone. The method 2200 may be performed by the wireless power transfer systems 100, 200, 500, 600, 800, 900, 1000, 1100, 1400, 1500, 1800, 1900, 2000, or 2100, or a power transfer system having a transmitter transducer assembly 1600.

The method 2200 starts at step 2202. Referencing the power transfer system 200, at step 2204, the signal generator 208 generates the alternating current transmission signal. The transmission signal has a transmission frequency of at least 500 Hz. At step 2206, the signal generator 208 produces a first electromagnetic field in a first power transfer region by transmitting the transmission signal to the transmitter transducer assembly 210 at the transmission frequency. At step 2208, the receiver transducer assembly 214 in one or more power receivers of the battery-powered aerial vehicle receives the time varying electromagnetic flux of the first electromagnetic field transmitted from the transmitter transducer assembly 210. The time varying electromagnetic flux is received when the receiver transducer assembly 214 is disposed in the power transfer region 203. At step 2210, the receiver transducer assembly 214 converts the time varying electromagnetic flux to the second power signal. The second power signal has the transmission frequency of the transmission signal. At step 2212, the power processor 218 configured to be connected to the battery of the aerial vehicle, converts the second power signal to a third power signal appropriate for charging the aerial-vehicle battery. The method 2200 terminates at step 2214.

FIG. 23 illustrates an example of a method 2300 for the wireless transfer of power. The method 2300 may be performed by the wireless power transfer systems 100, 200, 500, 600, 800, 900, 1000, 1100, 1400, 1500, 1800, 1900, 2000, or 2100, or a power transfer system having a transmitter transducer assembly 1600.

The method 2300 starts at step 2302. Referencing the power transfer system 500, at step 2304, the signal generator 508 detects the presence of at least one power receiver of the one or more power receivers in the power transfer region 510. At step 2306, the signal generator 508 generates the alternating current transmission signal in response to detecting the presence of the at least one power receiver of the one or more power receivers in the power transfer region 510. The transmission signal has a transmission frequency of at least 500 Hz. At step 2308, the transmitter transducer assembly 505 produces the electromagnetic field in the power transfer region 510. The electromagnetic field is produced by transmitting the transmission signal to the transmitter transducer assembly 505 at the transmission frequency. The electromagnetic field is produced for transferring power to the receiver transducer assembly 512 of the at least one power receiver of the one or more power receivers located in the electromagnetic field in the power transfer region 510. The method 2300 terminates at step 2310.

FIG. 24 illustrates an example of a distributed power transfer system 2400 through which an aerial vehicle, such as a drone 2402, may travel. In this example, distributed power transfer system 2400 includes a plurality of cells 2404, such as cells 2404A, 2404B, 2404C, and 2404D. Each cell corresponds to a wireless power transfer system as described above, and includes one or more power transfer regions 2406 produced by an associated transmitter assembly 2408. For example, power transfer regions 2406 of the respective cells include power transfer regions 2406A, 2406B, 2406C, and 2406D. A transmitter assembly 2408 may produce one or more associated power transfer regions 2406. In this example, a transmitter assembly 2408A produces power transfer regions 2406A and 2406B. Transmitter assemblies 2408B and 2408C produce respective power transfer regions 2406C and 2406D. Drone 2402, having a wireless power receiver 2410, may fly from cell to cell, such as along a flight path 2412. When the drone 2402 is in each power transfer region 2406, the drone stores enough power to fly to the next power transfer region. It is thus seen that the cells 2404 form a wireless power network 2414 across which drones can travel. The cells can be as far apart as the drones are able to fly on the power received at each cell.

In an embodiment, the drone 2402, or other aerial vehicle, is maintained in a first power transfer region 2406A. The drone 2402 does not need to be charged fully. The drone 2402 may fly from one power transfer region 2406A to another power transfer region 2406B. In an embodiment, the distance between each power transfer region 2406 is 1-5 miles. The drone 2402 can be maintained in the first power transfer region 2406A while at least partially charging the battery of the drone 2402. In an embodiment, the drone 2402 is maintained in the first power transfer region for less than one minute while at least partially charging the battery of the drone 2402. In an embodiment, the transmitter transducer produces a second electromagnetic field in a second power transfer region 2406B physically spaced from the first power transfer region 2406A. Accordingly, the drone 2402 is flown to the second power transfer region 2406B after at least partially charging the battery of the drone 2402 in the first power transfer region 2406A. The battery of the drone 2402 is then charged from the second electromagnetic field. In an example, the first power transfer region 2406A and the second power transfer region 2406B are located at a distance of 1-5 miles from each other.

In an embodiment, the partial charging of the battery of the drone 2402 includes increasing a charge on the battery of the drone 2402 by less than 20 percent of a full charge. In another embodiment, the partial charging of the battery of the drone 2402 includes charging at least partially the battery of the drone 2402 at a rate faster than a pre-determined charging rate of the battery of the drone 2402. The pre-determined charging rate corresponds to a standard charging rate of the drone 2402. The battery of the drone 2402 has a pre-determined charging rate of at least ten full charges per hour. In an embodiment, charging at least partially the battery of the drone 2402 at the rate faster than the pre-determined charging rate of the battery of the drone 2402 includes charging at least partially the battery of the aerial vehicle 1800 at a rate that is at least 1.5 times faster than the pre-determined charging rate of the battery of the drone 2402.

Batteries with a high charge rate are generally much heavier than batteries with a lower charge rate. The transfer system 2400 allows the use of batteries with high charge rates—due to the fact that there is no need to have a long flight time because the drone may charge rapidly at the nearest charge spot. Thus, the usage of batteries with high charge rates became reasonable even though they are much heavier. This is in contrast with conventional drones in which the flight time of the drone is critical. In this case, lightweight batteries with high energy densities and low charge rates are used. So system 2400 allows a shift in focus from maximum energy per gram of a battery, albeit with low charge rate, to maximum charge rate of batteries even though they weigh more.

The receiver transducer and the transmitter transducer in the drone 2402 are resonantly coupled with each other. In an embodiment, the resonant coupling enables a high quality factor of about 1000 and above for frequencies in the range of 20-200 kHz. In addition, the efficiency of energy transmission to the receiver circuit is proportional to a second power of the Q factor. In an embodiment, the receiver transducer 2410 has a diameter of 1 meter which enables a high quality factor at a frequency of 150 kHz. In an embodiment, the receiver transducer 2410 is made of aluminum. In an embodiment, the receiver transducer 2410 includes three loops of aluminum strip of 1 mm thickness and 10 mm width. In an example, the receiver transducer 2410 is made of a band of 1 cm width and 1 mm thickness and has an inductance of approximately equal to 30 pH. In an example, the receiver transducer 2410 has a resistance of 24 milliohms at a weight of 250 grams. In an example, the quality factor is 1200 at the operating frequency of 150 kHz. In addition, the receiver transducer 2410 has a form factor which enables high quality factor in a range of 1000-3000 for a frequency bandwidth of 100-300 kHz.

In an embodiment, the transmitter transducer in the drone 2402 has a diameter of 10 meters. The receiver transducer 2410 and the transmitter transducer are in a same plane. In an embodiment, the receiver transducer 2410 and the transmitter transducer are in parallel planes at a distance of 2 meter between planes. In another embodiment, the receiver transducer 2410 and the transmitter transducer are in parallel planes at a distance of 4 meter between planes.

The wireless power transfer system and its components as described above have many advantages over the existing art. In preferred configurations, the wireless power transfer systems may be configured to allow wireless charging and powering of devices a distance of 10 meters or more from the transmitter assembly in a closed environment, and distances of 20 meters or more from the transmitter assembly in an open environment. Moreover, the wireless power transfer system may be configured to perform wireless charging and powering at high operating frequencies.

From the above description, it will be appreciated that many variations are possible in a wireless power transfer system. The following numbered paragraphs describe aspects and features of embodiments. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

1. A wireless power assembly comprising:
    a signal generator configured to generate an alternating current transmission signal having a transmission frequency of at least 500 Hz; and
    a transmitter transducer assembly operatively coupled to the signal generator for producing an electromagnetic field in a power transfer region by conducting the transmission signal, the electromagnetic field for transferring power wirelessly to a power receiver when the power receiver is located in the power transfer region, the transmitter transducer assembly comprising a plurality of transmitter transducers that each produce a respective electromagnetic field.

2. The wireless power assembly of paragraph 1, wherein the plurality of transmitter transducers include a plurality of loops of electrical conductors.

3. The wireless power assembly of paragraph 2, wherein the loops of the plurality of loops are arranged in a planar array.

4. The wireless power assembly of paragraph 3, wherein the planar array configuration of the plurality of loops is configured as a phased array antenna, wherein the transmission signal flowing through each of the plurality of loops of electrical conductors has a predetermined phase, with the transmission signals of at least two loops of the plurality of loops having respective predetermined phases that are sufficiently different that at least a portion of the respective electromagnetic fields of the at least two loops to produce jointly a common electromagnetic field.

5. The wireless power assembly of paragraph 4, wherein the at least two loops include a first loop conducting the transmission signal with a first predetermined phase and a second loop conducting the transmission signal with a second predetermined phase that is 180 degrees from the first predetermined phase.

6. The wireless power assembly of paragraph 4, wherein each loop has at least a respective first width in the plane of the array and is positioned a distance from each adjacent loop in the array that is within five times the first width.

7. The wireless power assembly of paragraph 4, wherein the transmitter transducer assembly further comprises a master conductor coupled to the signal generator for conducting the generated transmission signal with each of the plurality of loops positioned at spaced locations along the master conductor and configured to receive the transmission signal from the master conductor.

8. The wireless power assembly of paragraph 7, wherein the master conductor is configured as a master loop extending around a master axis and each loop of the first plurality of loops faces the master axis.

9. The wireless power assembly of paragraph 8, wherein the master loop is disposed in a master plane and each loop of the plurality of loops is disposed in a respective plane normal to the master plane.

10. The wireless power assembly of paragraph 4, wherein the transmitter transducer assembly further includes at least a first phase-shift circuit, each phase-shift circuit being connected to a respective one of the plurality of loops for changing the phase of the transmission signal conducted by the respective loop 11. The wireless power assembly of paragraph 3, wherein at least one of the transmission signals is connected to at least two of the loops of the plurality of loops.

12. The wireless power assembly of paragraph 3, wherein the array is configured as a line.

13. The wireless power assembly of paragraph 3, wherein the array is a two dimensional array.

14. The wireless power assembly of paragraph 3, wherein each loop has at least a respective first width in the plane of the array and is positioned at a distance from each adjacent loop in the array that is within five times the respective first width.

15. The wireless power assembly of paragraph 14, wherein each loop of the plurality of loops is positioned at a distance from each adjacent loop in the array that is in a range of one to four times the respective first width.

16. The wireless power assembly of paragraph 2, wherein the signal generator is configured to generate a plurality of the transmission signals with each loop of the plurality of loops being configured to conduct a respective one of the plurality of transmission signals.

17. The wireless power assembly of paragraph 16, wherein the signal generator includes a controller configured to:
identify a presence of one or more of the power receivers in the power transfer region; and
selectively activate at least one loop of the plurality of loops in response to detecting the presence of the one or more power receivers.

18. The wireless power assembly of paragraph 17, wherein the controller is configured to identify a loop of the plurality of loops that is near at least one power receiver of the one or more power receivers, and activate the identified loop.

19. The wireless power assembly of paragraph 17, further comprising a first communication circuit coupled to the controller, the first communication circuit configured to communicate with a second communication circuit of the one or more power receivers disposed in the power transfer region for receiving power from the wireless power transmitter, and communicate to the controller receiver information received from the second communication circuit, the controller configured to control operation of the signal generator in response to the received receiver information.

20. The wireless power assembly of paragraph 2, wherein the plurality of loops comprises a plurality of concentric loops of electrical conductors, the plurality of concentric loops including loops of different sizes.

21. The wireless power assembly of paragraph 20, wherein the plurality of concentric loops is configured to conduct the transmission signal in the same direction around the concentric loops.

22. The wireless power assembly of paragraph 20, wherein the plurality of concentric loops is configured so that adjacent concentric loops conduct the transmission signal in opposite directions around the concentric loops.

23. The wireless power assembly of paragraph 20, wherein the concentric loops of electrical conductors comprises a phased array of loops, wherein a transmission signal flowing through each of the plurality of concentric loops of electrical conductors has a respective pre-determined phase, which phases are sufficiently different that at least a portion of the respective electromagnetic fields of adjacent loops produce jointly a common electromagnetic field.

24. The wireless power assembly of paragraph 23, wherein the pre-determined phases result in a phase difference between adjacent loops of 180 degrees.

25. The wireless power assembly of paragraph 23, wherein the transmitter transducer assembly further includes a delay line electrically connected in series with at least one loop of the plurality of concentric loops, wherein the delay line is configured to induce a phase shift in the transmission signal flowing through the at least one loop.

26. The wireless power assembly of paragraph 20, wherein the signal generator is configured to generate a plurality of the transmission signals with each loop of the plurality of concentric loops being configured to conduct a respective one of the plurality of transmission signals.

27. The wireless power assembly of paragraph 20, wherein at least one of the transmission signals is connected to at least two of the loops of the plurality of concentric loops.

28. The wireless power assembly of paragraph 1, further comprising a plurality of switching circuits, each switching circuit coupled to at least a respective loop of a plurality of loops, the switching circuit being operable to selectively connect and disconnect the at least the respective loop from the signal generator, and wherein the signal generator includes a controller operatively coupled to the switching circuit and configured to generate a control signal for selectively switching each of the plurality of switching circuits.

29. The wireless power assembly of paragraph 28, wherein the plurality of switching circuits includes a switching circuit for each loop of the plurality of loops.

30. The wireless power assembly of paragraph 1, wherein the array is a three-dimensional array.

31. The wireless power assembly of paragraph 30, wherein the plurality of loops is distributed in a band around and oriented parallel to a common axis, with each loop of the plurality of loops facing the common axis.

32. The wireless power assembly of paragraph 31, wherein loops in the plurality of loops are uninsulated electrical loop conductors, and adjacent loops in the plurality of loops share a length of electrical conductor.

33. The wireless power assembly of paragraph 32, wherein the signal generator is configured to activate selectively each loop in the plurality of loops.

34. The wireless power assembly of paragraph 33, wherein the signal generator is configured to isolate loops adjacent to an activated loop from the transmission signal.

35. The wireless power assembly of paragraph 32, wherein the plurality of loops includes a plurality of pairs of opposing loops disposed facing each other and located on opposite sides of the band of loops.

36. The wireless power assembly of paragraph 35, wherein the signal generator is configured to activate concurrently the loops in at least one pair of opposing loops based on detection of one or more power receivers in the power transfer region.

37. The wireless power assembly of paragraph 36, wherein the signal generator is configured to activate the loops in each pair of opposing loops with transmission signals that are 180 degrees out of phase with the respective electromagnetic fields of the at least two loops producing jointly a common electromagnetic field.

38. The wireless power assembly of paragraph 35, wherein the signal generator is configured to activate one of the loops in at least one pair of opposing loops and concurrently electrically isolate the other loop from the transmission signal in the at least one pair of opposing loops.

39. The wireless power assembly of paragraph 1, wherein the transmitter transducer assembly comprises a loop of electrical conductor electrically connected to the signal generator, the plurality of the transmission transducers comprising a corresponding plurality of electrically spaced-apart transmission segments of the loop of electrical conductor.

40. The wireless power assembly of paragraph 39 wherein the transmitter transducer assembly further includes a phase-shift circuit electrically between each pair of transmission segments, the phase-shift circuits being configured to change the phases of the transmission signal conducted by the transmission segments with the transmission segments forming a phased array of the transmission segments that produce jointly a common electromagnetic field.

41. The wireless power assembly of paragraph 40, wherein at least one of the phase-shift circuits includes an insulated segment of the loop of electrical conductor.

The wireless power transfer assembly of paragraph 40, wherein the at least one of the phase-shift circuits includes a delay line electrically connected between each two adjacent transmission segments.

43. The wireless power transfer assembly of paragraph 39, wherein each transmission segment includes a respective length of uninsulated conductor.

44. A wireless power assembly comprising:
a signal generator configured to generate an alternating current transmission signal having a transmission frequency of at least 500 Hz; and
a dipole antenna operatively coupled to the signal generator for producing an electromagnetic field in a power transfer region by conducting the transmission signal, the dipole antenna having two oppositely extending elongate electrically conductive elements.

45. The wireless power assembly of paragraph 44, wherein each conductive element of the two oppositely extending conductive elements is at least one-half meter in length.

46. The wireless power assembly of paragraph 44, wherein the dipole antenna further includes an electrically conductive expanse attached to a distal end of each of the two oppositely extending conductive elements, each electrically conductive expanse having an outer surface extending from the respective conductive element transverse to the respective conductive element.

47. The wireless power assembly of paragraph 46, wherein each of the electrical expanses is a plate extending normal to the respective conductive element.

48. The wireless power assembly of paragraph 46, wherein the outer surface of each electrical expanse is a curved surface.

49. The wireless power assembly of paragraph 48, wherein the outer surface of each electrical expanse is spherical.

50. A wireless power assembly comprising:
a signal generator configured to generate an alternating current transmission signal having a transmission frequency of at least 500 Hz; and
a transmitter transducer assembly operatively coupled to the signal generator for producing an electromagnetic field in a power transfer region by conducting the transmission signal, the transmitter transducer assembly comprising at least a first loop of electrical conductor extending back and forth along a sinuous path.

51. The wireless power assembly of paragraph 50, wherein the first loop includes plural parallel segments that are equally spaced apart.

52. The wireless power assembly of paragraph 50, further comprising a second loop of electrical conductor spaced from the first loop, the second loop also extending back and forth along a sinuous path following at least a portion of the sinuous path of the first loop.

53. The wireless power assembly of paragraph 52, wherein the first loop and second loop are disposed in spaced-apart parallel planes, and the second loop is offset from the first loop when viewed normal to the planes of the loops.

54. The wireless power assembly of paragraph 53, wherein the offset is half of spacing between each of a plurality of conductor sections of the at least first loop as viewed normal to the planes of the loops.

55. The wireless power transfer assembly of paragraph 53, wherein the signal generator is configured to select the first loop or the second loop for activation in response to a determination of the location of a receiver proximate the first and second loops.

56. The wireless power transfer assembly of paragraph 52, wherein the signal generator is configured to activate selectively the first loop or the second loop.

57. A wireless power assembly comprising:
a signal generator configured to generate an alternating current transmission signal having a transmission frequency of at least 500 Hz;
a flexible dielectric substrate; and
at least a first loop of flexible planar electrical conductor supported on the flexible dielectric substrate and operatively coupled to the signal generator for producing an electromagnetic field in a power transfer region by conducting the transmission signal.

58. A wireless power receiver configured to be electrically connected to an electrical load, the wireless power receiver comprising:
a dipole antenna having two oppositely extending conductive elements, the dipole antenna being configured to receive a time varying electromagnetic flux in a power transfer region of an electromagnetic field transmitted from a transmitter transducer when the dipole antenna is disposed in the power transfer region, and convert the time varying electromagnetic flux to a time-varying first power signal having a transmission frequency of at least 500 Hz; and
a power processor electrically connected to the dipole antenna, and configured to convert the first power signal to a second power signal appropriate for the electrical load.

59. The wireless power receiver of paragraph 58, wherein the dipole antenna further includes an electrically conductive expanse attached to a distal end of each of the two oppositely extending conductive elements, each electrically conductive expanse having an outer surface extending from the respective conductive element transverse to the respective conductive element.

60. The wireless power assembly of paragraph 59, wherein each of the electrical expanses is a plate extending normal to the respective conductive element.

61. The wireless power assembly of paragraph 59, wherein the outer surface of each electrical expanse is a curved surface.

62. The wireless power assembly of paragraph 61, wherein the outer surface of each electrical expanse is spherical.

63. The wireless power receiver of paragraph 58, wherein each conductive element of the two oppositely extending conductive elements is less than one-half meter in length.

64. A wireless power receiver configured to be electrically connected to an electrical load, the wireless power receiver comprising:
    a receiver transducer assembly configured to receive a time varying electromagnetic flux in a power transfer region of an electromagnetic field transmitted from a transmitter transducer assembly when the receiver transducer assembly is disposed in the power transfer region, and convert the time varying electromagnetic flux to a time-varying first power signal having a transmission frequency of at least 500 Hz, the receiver transducer assembly comprising a plurality of receiver transducers; and
    a power processor electrically connected to the receiver transducer assembly, and configured to convert the first power signal to a second power signal appropriate for the electrical load.

65. The wireless power receiver of paragraph 64, wherein the plurality of receiver transducers includes a plurality of loops of electrical conductors.

66. The wireless power receiver of paragraph 65, wherein the loops of the plurality of loops are arranged in a planar array.

67. The wireless power receiver of paragraph 66, wherein the planar array configuration of the plurality of loops is configured as a phased array antenna, wherein a first power signal flowing through each of the plurality of loops has a predetermined phase, with the first power signals of at least two loops of the plurality of loops having respective predetermined phases that are sufficiently different that at least a portion of the respective electromagnetic fields received by the at least two loops.

68. The wireless power receiver of paragraph 65, wherein each loop of the plurality of loops is in a form of a metal ribbon.

69. The wireless power receiver of paragraph 68, wherein the metal ribbon is a multi-layered laminated ribbon.

70. The wireless power receiver of paragraph 64, wherein the power processor is configured to receive a plurality of the first power signals with each receiver transducer of the plurality of receiver transducers being configured to conduct a respective one of the plurality of first power signals.

71. An aerial vehicle comprising
    a body having an exterior;
    a propulsion mechanism mounted to the body;
    an electrical energy storage device operatively coupled to the propulsion mechanism for providing propulsion energy to the propulsion mechanism for enabling aerial operation of the aerial vehicle;
    a receiver transducer configured to receive a time varying electromagnetic flux in a power transfer region of an electromagnetic field transmitted from a transmitter transducer when the receiver transducer is disposed in the power transfer region, and convert the time varying electromagnetic flux to a time-varying first power signal having a transmission frequency of at least 500 Hz, the transmitter transducer comprising at least a first loop of electrical conductor mounted along the exterior of the body of the aerial vehicle; and
    a power processor electrically connected to the receiver transducer, and configured to convert the first power signal to a second power signal appropriate for charging the electrical energy storage device.

72. The aerial vehicle of paragraph 71, wherein the body includes a wing, and the at least the first loop of electrical conductor is mounted along the exterior of the wing.

73. The aerial vehicle of paragraph 71, wherein the body includes a fuselage and the at least first loop is mounted along the exterior of the fuselage.

74. A wireless power transfer system comprising:
    a transmitter transducer assembly including at least one transmitter transducer, each transmitter transducer of the at least one transmitter transducer being configured to produce an electromagnetic field in a power transfer region during conduction of a transmission signal;
    a signal generator electrically configured to be connected to the transmitter transducer assembly, the signal generator being operationally configured to:
        generate an alternating current transmission signal having a transmission frequency of at least 500 Hz; and
        transmit the transmission signal to the transmitter transducer assembly at the transmission frequency; and
    one or more power receivers, each of the one or more power receivers being configured to be electrically connected to respective one or more loads, wherein each of the one or more power receivers comprises:
        a receiver transducer assembly including at least one receiver transducer, each receiver transducer of the at least one receiver transducer being configured to receive a time varying electromagnetic flux of the electromagnetic field transmitted from the transmitter transducer assembly when the receiver transducer assembly is disposed in the power transfer region, and convert the time varying electromagnetic flux to a second power signal, the second power signal being a time varying power signal having the transmission frequency of the transmission signal; and
        a power processor electrically connected to the receiver transducer assembly, and configured to convert the second power signal to a third power signal appropriate for the respective one or more loads;
    wherein at least one of the transmitter transducer and the receiver transducer comprises a dipole antenna having two oppositely extending conductive elements.

75. The wireless power transfer system of paragraph 74, wherein one of the at least one transmitter transducer is the dipole antenna and each of the two conductive elements extends at least one-half meter in length.

76. The wireless power transfer system of paragraph 74, wherein one of the at least one receiver transducer is the dipole antenna and each of the two conductive elements extends less than one-half meter in length.

77. The wireless power transfer system of paragraph 74, wherein the dipole antenna further includes an electrically conductive expanse attached to a distal end of each of the two oppositely extending conductive elements, each electrically conductive expanse having an outer surface extending from the respective conductive element transverse to the respective conductive element.

78. The wireless power transfer system of paragraph 77, wherein each of the electrically conductive expanses is a plate extending normal to the respective conductive element.

79. The wireless power transfer system of paragraph 77, wherein the outer surface of each electrically conductive expanse is a curved surface.

80. The wireless power transfer system of paragraph 79, wherein the outer surface of each electrically conductive expanse is spherical.

81. The wireless power transfer system of paragraph 74, wherein one of the at least one receiver transducer comprises a dipole antenna and the at least one transmitter transducer includes a plurality of loops of electrical conductors.
a transmission frequency of at least 500 Hz;
    producing, by the signal generator, a first electromagnetic field in a first power transfer region by transmitting the transmission signal to a transmitter transducer assembly at the transmission frequency;
    receiving, by a receiver transducer assembly in one or more power receivers of a battery-powered aerial vehicle, a time varying electromagnetic flux of the first electromagnetic field transmitted from the transmitter transducer assembly when the receiver transducer assembly is disposed in the power transfer region;
    converting, by the receiver transducer assembly, the time varying electromagnetic flux to a second power signal having the transmission frequency of the transmission signal; and
    converting, by a power processor configured to be connected to a battery of the aerial vehicle, the second power signal to a third power signal appropriate for charging a battery of the aerial-vehicle.

83. The method of paragraph 82, further comprising maintaining the aerial vehicle in the first power transfer region while at least partially charging the battery of the aerial vehicle.

84. The method of paragraph 83, further comprising producing a second electromagnetic field in a second power transfer region physically spaced from the first power transfer region, and after at least partially charging the battery of the aerial vehicle in the first power transfer region, flying the aerial vehicle to the second power transfer region, and charging at least partially the battery of the aerial vehicle from the second electromagnetic field.

85. The method of paragraph 84, wherein the first and second power transfer regions are located at a distance of 1-5 miles from each other.

86. The method of paragraph 83, wherein charging at least partially the battery of the aerial vehicle includes increasing a charge on the battery of the aerial vehicle by less than 20 percent of a full charge.

87. The method of paragraph 83, wherein charging at least partially the battery of the aerial vehicle includes charging at least partially the battery of the aerial vehicle at a rate faster than a predetermined charging rate of the battery of the aerial vehicle.

88. The method of paragraph 87, wherein the battery of the aerial vehicle has the predetermined charging rate of at least ten full charges per hour.

89. The method of paragraph 87, wherein charging at least partially the battery of the aerial vehicle at the rate faster than the predetermined charging rate of the battery of the aerial vehicle includes charging at least partially the battery of the aerial vehicle at a rate that is at least 1.5 times faster than the predetermined charging rate of the battery of the aerial vehicle.

90. The method of paragraph 89, wherein maintaining the aerial vehicle in the first power transfer region includes maintaining the aerial vehicle in the first power transfer region for less than one minute while at least partially charging the battery of the aerial vehicle.

91. The method of paragraph 82, where the transmitter transducer assembly includes a first loop of a first electrical conductor and the receiver transducer assembly includes a second loop of a second electrical conductor, the method further comprising supporting the first loop in a vertical orientation while producing the first electromagnetic field, and supporting the second loop in a vertical orientation while receiving the time-varying electromagnetic flux of the first electromagnetic field.

92. A method for wireless power transmission comprising:
    detecting, by a signal generator, a presence of at least one power receiver of one or more power receivers in a power transfer region;
    generating, by the signal generator, an alternating current transmission signal having a transmission frequency of at least 500 Hz in response to detecting the presence of the at least one power receiver of the one or more power receivers in the power transfer region; and
    producing an electromagnetic field in the power transfer region by transmitting the transmission signal to a transmitter transducer assembly at the transmission frequency for transferring power to a receiver transducer assembly of the at least one power receiver of the one or more power receivers located in the electromagnetic field in the power transfer region.

93. The method for wireless power transmission of paragraph 92, wherein detecting a presence of at least one power receiver includes detecting a change in load on the electromagnetic field produced by the transmitter transducer assembly.

94. The method for wireless power transmission of paragraph 93, wherein the transmitter transducer assembly includes a plurality of individually activatable transducers, and wherein detecting a change in load includes scanning the plurality of transmitter transducers, detecting a presence of at least one power receiver proximate one of the transmitter transducers, and activating the one transmitter transducer.

95. The method for wireless power transmission of paragraph 94, wherein the plurality of individual transducers are loops of electrical conductors.

96. The method for wireless power transmission of paragraph 95, wherein the loops of electrical conductors are distributed in a band around and oriented parallel to a common axis, with each loop of the plurality of loops facing the common axis, adjacent loops in the plurality of loops share a length of electrical conductor, and the method further comprises selectively configuring each loop with the lengths of electrical conductor shared with adjacent loops.

97. The method for wireless power transmission of paragraph 92, wherein generating the alternating current transmission signal includes generating the alternating current transmission signal at a reduced power level when no power receiver is detected in the power transfer region.

98. The method for wireless power transmission of paragraph 97, further comprising increasing, by the signal generator, the power level of the transmission signal to a power level greater than the reduced power level when the at least one power receiver of the one or more power receivers is detected in the power transfer region.

99. The method for wireless power transmission of paragraph 98, further comprising prior to increasing the power level, determining that the at least one power receiver is authorized to receive power in the power transfer region.

100. The method for wireless power transmission of paragraph 98, wherein detecting the presence of at least one power receiver includes detecting the presence of a number of power receivers in the power transfer region, and increasing the power level of the transmission signal includes increasing the power level of the transmission signal to a power level proportional to the number of power receivers detected.

101. The method for wireless power transmission of paragraph 92, wherein detecting the presence of at least one power receiver includes receiving receiver information through a data communication channel between the at least one power receiver of the one or more power receivers and a wireless communication unit operatively coupled to the signal generator.

102. The method for wireless power transmission of paragraph 101, further comprising
verifying, by the wireless communication unit, the receiver information associated with the at least one power receiver; and wherein generating the alternating current transmission signal includes generating the alternating current transmission signal with a power level sufficient for charging a battery of the at least one power receiver in response to verification of the receiver information.

103. The method for wireless power transmission of paragraph 102, wherein the receiver information includes indicia identifying the at least one power receiver and verifying the receiver information includes comparing the identifying indicia to a list of identifying indicia for power receivers authorized to receive power in the power transfer region.

104. The method for wireless power transmission of paragraph 102, further comprising determining, by the wireless communication unit, a period of time during which power was transferred to the at least one power receiver of the one or more power receivers.

105. A wireless power transfer system comprising:
a transmitter transducer configured to produce a magnetic field in a power transfer region during conduction of a transmission signal;
a signal generator electrically configured to be connected to the transmitter transducer, the signal generator being operationally configured to:
receive a first power signal from a power source;
generate from the first power signal an alternating current transmission signal having a transmission frequency of at least 500 Hz; and
transmit the transmission signal to the transmitter transducer at the transmission frequency; and
one or more power receivers, each of the one or more power receivers being configured to be electrically connected to respective one or more loads, wherein each of the one or more power receivers comprises:
a receiver transducer configured to inductively receive a time varying magnetic flux of the magnetic field transmitted from the transmitter transducer when the receiver transducer is disposed in the power transfer region, and convert the time varying magnetic flux to a second power signal, the second power signal being a time varying power signal having the transmission frequency of the transmission signal; and
a power processor electrically connected to the receiver transducer, and configured to convert the second power signal to a third power signal appropriate for the respective one or more loads.

106. The wireless power transfer system of paragraph 105, further comprising a controller operatively coupled to the signal generator and configured to generate a control signal for varying one or more parameters of the transmission signal.

107. The wireless power transfer system of paragraph 106, wherein one parameter of the one or more parameters comprises the transmission frequency of the transmission signal.

108. The wireless power transfer system of paragraph 106, wherein one parameter of the one or more parameters comprises a power level of the transmission signal.

109. The wireless power transfer system of paragraph 106, wherein the one or more parameters comprises the transmission frequency and a power level of the transmission signal.

110. The wireless power transfer system of paragraph 106, further comprising a first communication circuit coupled to the controller and wherein at least one receiver of the one or more power receivers includes a second communication circuit, the first communication circuit configured to communicate with the second communication circuit and communicate to the controller receiver information received from the second communication circuit, the controller configured to control operation of the signal generator in response to the received receiver information.

111. The wireless power transfer system of paragraph 110, wherein the second communication circuit is configured to communicate to the power processor transmitter information received from the first communication circuit, and the power processor is configured to control an operation of the power processor in response to the received transmitter information.

112. The wireless power transfer system of paragraph 106, further comprising a first communication circuit coupled to the controller, and wherein at least one receiver of the one or more power receivers includes a second communication circuit, the second communication circuit configured to communicate with the first communication circuit and communicate to the power processor transmitter information received from the first communication circuit, wherein the power processor is configured to control an operation of the power processor in response to the received transmitter information.

113. The wireless power transfer system of paragraph 105, wherein the transmitter transducer is an elongate transmitter conductor extending along the power transfer region.

114. The wireless power transfer system of paragraph 113, wherein the transmitter transducer is made of a plurality of individually insulated wires.

115. The wireless power transfer system of paragraph 105, wherein the signal generator in combination with the transmitter transducer includes a resonant circuit, the resonant circuit including a variable reactance electrically connected to the transmitter transducer, and the resonant circuit is configured to resonate at the transmission frequency.

116. The wireless power transfer system of paragraph 105, wherein the power processor in combination with the receiver transducer includes a resonant circuit configured to resonate at a reception frequency, the resonant circuit including a variable reactance electrically connected to the receiver transducer, the variable reactance being controllable to make the reception frequency correspond to the transmission frequency.

117. The wireless power transfer system of paragraph 105, wherein the power processor includes a super-capacitor.

118. The wireless power transfer system of paragraph 105, wherein the signal generator is configured to detect a presence of the one or more power receivers in the power transfer region; and automatically initiate the generation of the transmission signal in response to detecting the presence of the one or more power receivers in the power transfer region.

119. The wireless power transfer system of paragraph 105, wherein the one or more power receivers is configured to detect a presence of the magnetic field produced by the transmitter transducer; and automatically initiate converting the second power signal to the third power signal in response to detecting the presence of the magnetic field.

120. The wireless power transfer system of paragraph 119, wherein the presence of the magnetic field is detected when the receiver transducer produces a threshold amount of electromotive force.

121. The wireless power transfer system of paragraph 105, wherein the transmitter transducer is a loop of a non-shielded electrical conductor.

122. The wireless power transfer system of paragraph 105, wherein the transmitter transducer comprises a plurality of concentric loops of electrical conductors, the plurality of concentric loops including loops of different sizes.

123. The wireless power transfer system of paragraph 105, where the load uses power having a pre-determined voltage level, and wherein the power processor is further configured to convert a voltage level of the second power signal to the third power signal with the pre-determined voltage level.

124. The wireless power transfer system of paragraph 123, wherein the power processor further comprises a transformer electrically connected between the receiver transducer and the load, the transformer being configured to convert the voltage level of the second power signal to the pre-determined voltage level.

125. The wireless power transfer system of paragraph 105, wherein the signal generator is configured to generate the transmission signal with a frequency in a range of 10 kHz-500 kHz.

126. The wireless power transfer system of paragraph 105, wherein the signal generator is configured to generate the transmission signal with a frequency in a range of 5 kHz-1000 kHz.

127. The wireless power transfer system of paragraph 105, wherein the signal generator is configured to generate the transmission signal with a frequency in a range of 500 kHz-100 MHz.

128. The wireless power transfer system of paragraph 105, wherein a largest dimension of the receiver transducer is between 1 and 0.00001 times a largest dimension of the transmitter transducer.

129. The wireless power transfer system of paragraph 128, wherein the largest dimension of the receiver transducer is between 0.1 and 0.00001 times the largest dimension of the transmitter transducer.

130. A method comprising:
receiving, by a signal generator, a first power signal from a power source;
generating from the first power signal, by the signal generator, an alternating current transmission signal having a transmission frequency of at least 500 Hz;
producing, by the signal generator, a magnetic field in a power transfer region by transmitting the transmission signal to a transmitter transducer at the transmission frequency;
inductively receiving, by a receiver transducer in one or more power receivers, a time varying magnetic flux of the magnetic field transmitted from the transmitter transducer when the receiver transducer is disposed in the power transfer region;
converting, by the receiver transducer, the time varying magnetic flux to a second power signal having the transmission frequency of the transmission signal; and
converting, by a power processor configured to be connected to one or more loads, the second power signal to a third power signal appropriate for a respective one load of the one or more loads.

131. The method of paragraph 130, varying, by a controller of the signal generator, one or more parameters of the transmission signal in response to a control signal.

132. The method of paragraph 131, wherein one parameter of the one or more parameters comprises the transmission frequency of the transmission signal.

133. The method of paragraph 131, wherein one parameter of the one or more parameters comprises a power level of the transmission signal.

134. The method of paragraph 131, wherein the one or more parameters comprises the transmission frequency and a power level of the transmission signal.

135. The method of paragraph 131, further comprising communicating, by a first communication circuit coupled to the controller of the signal generator, with a second communication circuit of one of the one or more power receivers; communicating, by the first communication circuit to the controller receiver information received from the second communication circuit, and controlling, by the controller, operation of the signal generator in response to the received receiver information.

136. The method of paragraph 135, further comprising communicating, by the second communication circuit to the power processor, transmitter information received from the first communication circuit, and controlling, by the power processor, an operation of the power processor in response to the received transmitter information.

137. The method of paragraph 131, further comprising communicating, by a second communication circuit of at least one receiver of the one or more power receivers to a first communication circuit coupled to the controller, transmitter information received from the first communication circuit to the power processor, and control, by the power processor, an operation of the power processor in response to received transmitter information.

138. The method of paragraph 130, wherein the transmitter transducer is an elongate transmitter conductor extending along the power transfer region.

139. The method of paragraph 130, further comprising detecting, by the signal generator, a presence of the one or more power receivers in the power transfer region; and automatically initiating the generation of the transmission signal in response to detecting the presence of the one or more power receivers in the power transfer region.

140. The method of paragraph 130, further comprising detecting, by the one or more power receivers, a presence of the magnetic field produced by the transmitter transducer; and automatically initiating conversion of the second power signal to the third power signal in response to detecting the presence of the magnetic field.

141. The method of paragraph 140, wherein the detecting of the presence of the magnetic field includes detecting when the receiver transducer produces a threshold amount of electromotive force.

142. The method of paragraph 130, where the load uses power having a pre-determined voltage, and wherein the converting of the second power signal to the third power signal includes converting a voltage level of the second power signal to the third power signal with the pre-determined voltage level.

143. The method of paragraph 142, wherein the converting of the voltage level of the second power signal to the third power signal with the pre-determined voltage level includes transforming, by a transformer, the voltage level of the second power signal to the pre-determined voltage level.

144. The method of paragraph 130, wherein the generating includes generating the transmission signal with a frequency in a range of 5 kHz-1000 kHz.

145. A wireless power transmitter comprising:
a signal generator; wherein the signal generator is configured to:
receive a power signal from a power source;
generate an alternating current transmission signal from the power signal, the transmission signal is characterized by a transmission frequency of at least 500 Hz; and
transmit the transmission signal to a transmitter transducer configured to produce a magnetic field in a power transfer region during conduction of the transmission signal.

146. A wireless power assembly including the wireless power transmitter of paragraph 145 and the transmitter transducer.

147. The wireless power transmitter of paragraph 145, further comprising a controller operatively coupled to the signal generator and configured to generate a control signal for varying one or more parameters of the transmission signal.

148. The wireless power transmitter of paragraph 147, wherein one parameter of the one or more parameters comprises the transmission frequency of the transmission signal.

149. The wireless power transmitter of paragraph 147, wherein one parameter of the one or more parameters comprises a power level of the transmission signal.

150. The wireless power transmitter of paragraph 147, wherein the one or more parameters comprises the transmission frequency and a power level of the transmission signal.

151. The wireless power transmitter of paragraph 147, further comprising a first communication circuit coupled to the controller, the first communication circuit configured to communicate with a second communication circuit of one or more power receivers disposed in the power transfer region for receiving power from the wireless power transmitter, and communicate to the controller receiver information received from the second communication circuit, the controller configured to control operation of the signal generator in response to the received receiver information.

152. The wireless power transmitter of paragraph 151, wherein the controller is configured to send to the first communication circuit, transmitter information relating to one or more parameters of the transmission signal, and the first communication circuit is configured to communicate to the second communication circuit the transmitter information.

153. The wireless power transmitter of paragraph 145, wherein the signal generator in combination with the transmitter transducer includes a resonant circuit, the resonant circuit including a variable reactance electrically connected to the transmitter transducer, and the resonant circuit is configured to resonate at the transmission frequency.

154. The wireless power transmitter of paragraph 145, wherein the signal generator is configured to:
detect the presence of one or more power receivers in the power transfer region; and
automatically initiate the generation of the transmission signal.

155. The wireless power transmitter of paragraph 145, wherein the transmitter transducer is a loop of a non-shielded electrical conductor.

156. The wireless power transmitter of paragraph 145, wherein the transmitter transducer comprises a plurality of concentric loops of electrical conductors, the plurality of concentric loops including loops of different sizes.

157. The wireless power transmitter of paragraph 145, wherein the transmitter transducer is an elongate transmitter conductor extending along the power transfer region.

158. The wireless power transmitter of paragraph 157, wherein the transmitter conductor is made of a plurality of individually insulated wires.

159. The wireless power transmitter of paragraph 145, wherein the signal generator is configured to generate the transmission signal with a frequency in a range of 10 kHz-500 kHz.

160. The wireless power transmitter of paragraph 145, wherein the signal generator is configured to generate the transmission signal with a frequency in a range of 5 kHz-1000 kHz.

161. The wireless power transmitter of paragraph 145, wherein the signal generator is configured to generate the transmission signal with a frequency in a range of 500 kHz-100 MHz.

162. A method for wireless power transmission comprising:
receiving, by a signal generator, a first power signal from a power source;
generating from the first power signal, by the signal generator, an alternating current transmission signal having a transmission frequency of at least 500 Hz;
producing, by the signal generator, a magnetic field in a power transfer region by transmitting the transmission signal to a transmitter transducer at the transmission frequency for transferring power to a receiver having a receiver transducer disposed in the magnetic field.

163. The method of paragraph 162, varying, by a controller of the signal generator, one or more parameters of the transmission signal in response to a control signal.

164. The method of paragraph 163, wherein one parameter of the one or more parameters comprises the transmission frequency of the transmission signal.

165. The method of paragraph 163, wherein one parameter of the one or more parameters comprises a power level of the transmission signal.

166. The method of paragraph 163, wherein the one or more parameters comprises the transmission frequency and a power level of the transmission signal.

167. The method of paragraph 163, further comprising communicating, by a first communication circuit coupled to a controller of the signal generator, with a second communication circuit of the receiver and communicating by the first communication circuit to the controller receiver information received from the second communication circuit, and controlling, by the controller, operation of the signal generator in response to the received receiver information.

168. The method of paragraph 167, further comprising sending by the controller to the first communication circuit, transmitter information relating to one or more parameters of the transmission signal, and communicating, by the first communication circuit to the second communication circuit, the transmitter information.

169. The method of paragraph 162, wherein the transmitter transducer is an elongate transmitter conductor extending along the power transfer region.

170. The method of paragraph 162, further comprising detecting, by the signal generator, a presence of the receiver in the power transfer region; and automatically initiating the generation of the transmission signal in response to detecting the presence of one or more power receivers in the power transfer region.

171. The method of paragraph 162, wherein the generating includes generating the transmission signal with a frequency in a range of 5 kHz-1000 kHz.

172. A wireless power receiver configured to be electrically connected to an electrical load, the wireless power receiver comprising:
 a receiver transducer configured to inductively receive a time varying magnetic flux in a power transfer region of a magnetic field transmitted from a transmitter transducer when the receiver transducer is disposed in the power transfer region, and convert the time varying magnetic flux to a time-varying first power signal having a transmission frequency of at least 500 Hz; and
 a power processor electrically connected to the receiver transducer, and configured to convert the first power signal to a second power signal appropriate for the electrical load.

173. The wireless power receiver of paragraph 172, further comprising a first communication circuit electrically connected to the wireless power receiver, the first communication circuit configured to communicate with a second communication circuit of a signal generator transmitting a transmission signal having the transmission frequency to the transmitter transducer, and communicate to the power processor transmitter information received from the second communication circuit, and wherein the power processor is configured to control an operation of the power processor in response to the received transmitter information.

174. The wireless power receiver of paragraph 172, wherein the power processor in combination with the receiver transducer includes a resonant circuit configured to resonate at a reception frequency, the resonant circuit including a variable reactance electrically connected to the receiver transducer, and, the variable reactance being controllable to make the reception frequency correspond to the transmission frequency.

175. The wireless power receiver of paragraph 172, wherein the power processor includes a super-capacitor.

176. The wireless power receiver of paragraph 172, wherein the power receiver is configured to detect a presence of the magnetic field produced by the transmitter transducer; and automatically initiate conversion of the first power signal to the second power signal in response to detecting the presence of the magnetic field.

177. The wireless power receiver of paragraph 176, wherein the presence of the magnetic field is detected when the receiver transducer produces a threshold amount of electromotive force.

178. The wireless power transmission system of paragraph 172, where the electrical load uses power having a pre-determined voltage level, and wherein the power processor is further configured to convert a voltage level of the first power signal to the second power signal with the pre-determined voltage level.

179. The wireless power receiver of paragraph 178, wherein the power processor further comprises a transformer electrically connected between the receiver transducer and the load, the transformer being configured to convert the voltage level of the first power signal to the pre-determined voltage level.

180. A method for wireless power reception by a receiver configured to be electrically connected to an electrical load, the method comprising:
 inductively receiving, by a receiver transducer of one or more power receivers, a time varying magnetic flux in a power transfer region of a magnetic field transmitted from a transmitter transducer when the receiver transducer is disposed in the power transfer region;
 converting, by the receiver transducer, the time varying magnetic flux to a time varying first power signal having a transmission frequency of at least 500 Hz; and
 converting, by a power processor, the first power signal to a second power signal appropriate for the electrical load.

181. The method of paragraph 180, further comprising receiving, by a first communication circuit of the receiver transmitter information from a second communication circuit of a signal generator transmitting a transmission signal having the transmission frequency to the transmitter transducer, and sending, by the first communication circuit to the power processor, the received transmitter information, and controlling by the power processor an operation of the power processor in response to the transmitter information.

182. The method of paragraph 180, further comprising detecting, by the power receiver, presence of the magnetic field produced by the transmitter transducer; and automatically initiating conversion of the first power signal to the second power signal in response to detecting the presence of the one or more power receivers in the power transfer region.

183. The method of paragraph 182, wherein the detecting the presence of the magnetic field includes detecting when the receiver transducer produces a threshold amount of electromotive force.

184. The method of paragraph 180, where the electrical load uses power having a pre-determined voltage, and wherein converting the first power signal to the second power signal includes converting a voltage level of the first power signal to the second power signal with the pre-determined voltage level.

185. The method of paragraph 184, wherein the converting of the voltage level of the first power signal to the second power signal with the pre-determined voltage level includes transforming, by a transformer, the voltage level of the first power signal to the pre-determined voltage level.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second, or third, for identified elements are used to distinguish between the elements, and do not indicate a required or limited number of such elements, and do not indicate a particular position or order of such elements unless otherwise specifically stated.

What is claimed is:

1. A wireless power assembly comprising:
    a signal generator configured to generate an alternating current transmission signal having a transmission frequency of at least 500 Hz;
    a transmitter transducer assembly operatively coupled to the signal generator for producing an electromagnetic field in a power transfer region by conducting the alternating current transmission signal, the electromagnetic field for transferring power wirelessly to a power receiver when the power receiver is located in the power transfer region, the transmitter transducer assembly comprising a plurality of loops of electrical conductors that each produce a respective electromagnetic field, wherein the plurality of loops includes a first loop conducting the alternating current transmission signal with a first predetermined phase and a second loop positioned adjacent the first loop and conducting the transmission signal with a second predetermined phase that is 180 degrees from the first predetermined phase;
    wherein the transmitter transducer assembly further comprises a master conductor coupled to the signal generator for conducting the alternating current transmission signal with the plurality of loops positioned at spaced locations along and connected electrically serially to the master conductor for receiving the alternating current transmission signal from the master conductor; and
    wherein the master conductor is configured as a master loop extending around a master axis and each loop of the first plurality of loops extends in a plane transverse to a plane of the master loop and facing the master axis.

2. The wireless power assembly of claim 1, wherein each loop of the plurality of loops is disposed in a respective plane normal to the plane of the master loop.

\* \* \* \* \*